United States Patent
Davis et al.

(10) Patent No.: US 9,729,549 B2
(45) Date of Patent: Aug. 8, 2017

(54) BEHAVIORAL FINGERPRINTING WITH ADAPTIVE DEVELOPMENT

(71) Applicant: Elwha LLC, a limited liability corporation of the state of Delaware, Bellevue, WA (US)

(72) Inventors: Marc E. Davis, San Francisco, CA (US); Matthew G. Dyor, Bellevue, WA (US); Daniel A. Gerrity, Seattle, WA (US); Xeudong Huang, Bellevue, WA (US); Roderick A. Hyde, Redmond, WA (US); Royce A. Levien, Lexington, MA (US); Richard T. Lord, Tacoma, WA (US); Robert W. Lord, Seattle, WA (US); Mark A. Malamud, Seattle, WA (US); Nathan P. Myhrvold, Bellevue, WA (US); Clarence T Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/678,380

(22) Filed: Nov. 15, 2012

(65) Prior Publication Data
US 2013/0160087 A1    Jun. 20, 2013

Related U.S. Application Data

(63) Continuation-in-part of application No. 13/673,506, filed on Nov. 9, 2012, which is a continuation-in-part
(Continued)

(51) Int. Cl.
*G06F 21/00* (2013.01)
*H04L 29/06* (2006.01)
*H04L 29/08* (2006.01)

(52) U.S. Cl.
CPC .............. *H04L 63/10* (2013.01); *H04L 67/22* (2013.01); *H04L 63/105* (2013.01)

(58) Field of Classification Search
None
See application file for complete search history.

(56) References Cited

U.S. PATENT DOCUMENTS 6,084,953 A    7/2000  Bardenheuer et al.
6,829,596 B1  12/2004  Frazee
(Continued)

FOREIGN PATENT DOCUMENTS

WO    WO 2011/119273 A3    9/2011

OTHER PUBLICATIONS

Jermyn et al., "The Design and Analysis of Graphical Passwords", 1999, Usenix, 15 pgs.*
(Continued)

*Primary Examiner* — Jeffery Williams

(57) ABSTRACT

Disclosed herein are example embodiments for behavioral fingerprinting with adaptive development. For certain example embodiments, one or more devices may: (i) determine at least one indication of utilization for at least one authorized user via at least one user-device interaction; and (ii) incorporate at least one indication of utilization into at least one behavioral fingerprint that is associated with at least one authorized user, with the at least one behavioral fingerprint including one or more indicators of utilization of one or more user devices by the at least one authorized user. However, claimed subject matter is not limited to any particular described embodiments, implementations, examples, or so forth.

34 Claims, 22 Drawing Sheets

Related U.S. Application Data of application No. 13/665,841, filed on Oct. 31, 2012, which is a continuation-in-part of application No. 13/665,830, filed on Oct. 31, 2012, now Pat. No. 9,298,900, which is a continuation-in-part of application No. 13/631,667, filed on Sep. 28, 2012, now Pat. No. 9,015,860, which is a continuation-in-part of application No. 13/602,061, filed on Aug. 31, 2012, which is a continuation-in-part of application No. 13/563,599, filed on Jul. 31, 2012, now Pat. No. 9,083,687, which is a continuation-in-part of application No. 13/552,502, filed on Jul. 18, 2012, which is a continuation-in-part of application No. 13/538,385, filed on Jun. 29, 2012, now Pat. No. 8,869,241, which is a continuation-in-part of application No. 13/475,564, filed on May 18, 2012, now Pat. No. 8,713,704, which is a continuation-in-part of application No. 13/373,682, filed on Nov. 23, 2011, which is a continuation-in-part of application No. 13/373,677, filed on Nov. 23, 2011, now Pat. No. 8,688,980, which is a continuation-in-part of application No. 13/373,680, filed on Nov. 23, 2011, now Pat. No. 8,689,350, which is a continuation-in-part of application No. 13/373,684, filed on Nov. 23, 2011, now Pat. No. 9,348,985, which is a continuation-in-part of application No. 13/373,685, filed on Nov. 23, 2011, now Pat. No. 8,555,077.

(60) Provisional application No. 61/572,309, filed on Oct. 13, 2011, provisional application No. 61/632,836, filed on Sep. 24, 2011.

(56) References Cited

U.S. PATENT DOCUMENTS

| | | |
|---|---|---|
| 6,957,199 B1 | 10/2005 | Fisher |
| 7,305,360 B1 | 12/2007 | Lamoureux et al. |
| 7,433,960 B1 * | 10/2008 | Dube .................. G06F 21/552 709/201 |
| 7,533,155 B2 | 5/2009 | Kitada |
| 7,577,987 B2 | 8/2009 | Mizrah |
| 7,689,418 B2 | 3/2010 | Ramaswamy et al. |
| 7,794,769 B2 | 9/2010 | Cox et al. |
| 7,827,592 B2 | 11/2010 | Fifer et al. |
| 7,908,237 B2 | 3/2011 | Angell et al. |
| 7,929,733 B1 | 4/2011 | Lehnert et al. |
| 7,975,150 B1 | 7/2011 | Lillibridge et al. |
| 8,020,005 B2 | 9/2011 | Mani et al. |
| 8,051,468 B2 * | 11/2011 | Davis et al. ................. 726/5 |
| 8,078,515 B2 | 12/2011 | John |
| 8,155,999 B2 | 4/2012 | de Boer et al. |
| 8,160,943 B2 | 4/2012 | Smith et al. |
| 8,161,530 B2 * | 4/2012 | Meehan et al. .............. 726/4 |
| 8,169,916 B1 | 5/2012 | Pai et al. |
| 8,175,959 B2 | 5/2012 | Mylet et al. |
| 8,185,646 B2 | 5/2012 | Headley |
| 8,205,245 B2 | 6/2012 | Tam et al. |
| 8,285,639 B2 | 10/2012 | Eden et al. |
| 8,290,908 B2 | 10/2012 | McCarthy et al. |
| 8,316,237 B1 | 11/2012 | Felsher et al. |
| 8,358,579 B1 | 1/2013 | Walsh et al. |
| 8,364,713 B2 | 1/2013 | Pollard |
| 8,388,446 B1 | 3/2013 | Craine et al. |
| 8,392,969 B1 | 3/2013 | Park et al. |
| 8,522,147 B2 | 8/2013 | Bladel et al. |
| 8,533,266 B2 | 9/2013 | Koulomzin et al. |
| 8,582,829 B2 | 11/2013 | Shuster |
| 8,689,350 B2 | 4/2014 | Davis et al. |
| 8,694,401 B2 | 4/2014 | Stewart |
| 8,713,704 B2 | 4/2014 | Davis et al. |
| 8,725,569 B2 | 5/2014 | Liang et al. |
| 8,725,672 B2 | 5/2014 | Rostampour et al. |
| 8,726,036 B2 | 5/2014 | Kornafeld et al. |
| 8,732,089 B1 | 5/2014 | Fang et al. |
| 8,776,168 B1 | 7/2014 | Gibson et al. |
| 8,806,598 B2 | 8/2014 | Assam |
| 8,819,789 B2 | 8/2014 | Orttung et al. |
| 8,832,788 B1 | 9/2014 | Gibson et al. |
| 8,869,241 B2 | 10/2014 | Davis et al. |
| 8,892,461 B2 | 11/2014 | Lau et al. |
| 8,918,904 B2 | 12/2014 | Sanin et al. |
| 9,015,860 B2 | 4/2015 | Davis et al. |
| 9,053,307 B1 | 6/2015 | Johansson et al. |
| 9,137,247 B2 | 9/2015 | Smith et al. |
| 9,154,466 B2 | 10/2015 | Sobel et al. |
| 9,185,101 B2 | 11/2015 | Grigg et al. |
| 2002/0025803 A1 | 2/2002 | Park |
| 2002/0046105 A1 | 4/2002 | Gardenswartz et al. |
| 2002/0073046 A1 | 6/2002 | David |
| 2003/0063730 A1 | 4/2003 | Woodring |
| 2003/0220980 A1 | 11/2003 | Crane |
| 2004/0002329 A1 | 1/2004 | Bhatia et al. |
| 2004/0005051 A1 | 1/2004 | Wheeler et al. |
| 2004/0193892 A1 | 9/2004 | Tamura et al. |
| 2005/0071643 A1 | 3/2005 | Moghe |
| 2005/0100198 A1 | 5/2005 | Nakano et al. |
| 2005/0171832 A1 | 8/2005 | Hull et al. |
| 2005/0246771 A1 | 11/2005 | Hunt et al. |
| 2005/0268107 A1 | 12/2005 | Harris et al. |
| 2006/0020814 A1 | 1/2006 | Lieblich et al. |
| 2006/0020816 A1 | 1/2006 | Campbell |
| 2006/0020876 A1 | 1/2006 | Chang |
| 2006/0074769 A1 | 4/2006 | Looney et al. |
| 2006/0133651 A1 | 6/2006 | Polcha et al. |
| 2006/0161553 A1 | 7/2006 | Woo |
| 2006/0218153 A1 | 9/2006 | Voon et al. |
| 2006/0224898 A1 | 10/2006 | Ahmed |
| 2006/0250578 A1 | 11/2006 | Pohl et al. |
| 2006/0288234 A1 | 12/2006 | Azar et al. |
| 2007/0067853 A1 | 3/2007 | Ramsey |
| 2007/0084913 A1 | 4/2007 | Weston |
| 2007/0218900 A1 | 9/2007 | Abhyanker |
| 2007/0226248 A1 | 9/2007 | Darr |
| 2007/0240203 A1 | 10/2007 | Beck |
| 2007/0245157 A1 * | 10/2007 | Giobbi .................. G06F 21/31 713/186 |
| 2007/0245158 A1 * | 10/2007 | Giobbi .................. G06F 21/31 713/186 |
| 2007/0250550 A1 | 10/2007 | Berninger |
| 2008/0033941 A1 | 2/2008 | Parrish |
| 2008/0091453 A1 * | 4/2008 | Meehan .............. G06Q 20/341 705/317 |
| 2008/0092209 A1 * | 4/2008 | Davis et al. ................. 726/2 |
| 2008/0098456 A1 * | 4/2008 | Alward et al. .............. 726/1 |
| 2008/0102766 A1 | 5/2008 | Schultz |
| 2008/0138472 A1 | 6/2008 | Alexandre |
| 2008/0146193 A1 | 6/2008 | Bentley et al. |
| 2008/0167002 A1 | 7/2008 | Kim et al. |
| 2008/0172461 A1 | 7/2008 | Thattai et al. |
| 2008/0235614 A1 | 9/2008 | Ricklefs et al. |
| 2008/0281668 A1 | 11/2008 | Nurminen |
| 2009/0006846 A1 | 1/2009 | Rosenblatt |
| 2009/0025081 A1 | 1/2009 | Quigley et al. |
| 2009/0030985 A1 | 1/2009 | Yuan |
| 2009/0037285 A1 | 2/2009 | Murphy |
| 2009/0070435 A1 | 3/2009 | Abhyanker |
| 2009/0093235 A1 | 4/2009 | Grealish et al. |
| 2009/0111491 A1 | 4/2009 | Lemberg |
| 2009/0113040 A1 | 4/2009 | Zalewski |
| 2009/0150507 A1 | 6/2009 | Davis et al. |
| 2009/0152343 A1 | 6/2009 | Carter et al. |
| 2009/0169062 A1 | 7/2009 | Cheung et al. |
| 2009/0210494 A1 | 8/2009 | Fisher et al. |
| 2009/0220653 A1 | 9/2009 | Doucet |
| 2009/0228509 A1 | 9/2009 | McCarthy et al. |
| 2009/0292010 A1 | 11/2009 | Shigemura et al. |
| 2009/0298514 A1 * | 12/2009 | Ullah .................. 455/456.5 |
| 2010/0073202 A1 * | 3/2010 | Mazed .................. 340/999 |
| 2010/0088157 A1 | 4/2010 | Wilson |
| 2010/0115592 A1 | 5/2010 | Belz et al. |

(56) References Cited

U.S. PATENT DOCUMENTS

| | | |
|---|---|---|
| 2010/0115610 A1 | 5/2010 | Tredoux et al. |
| 2010/0130165 A1 | 5/2010 | Snyder et al. |
| 2010/0161544 A1 | 6/2010 | Song et al. |
| 2010/0169343 A1 | 7/2010 | Kenedy et al. |
| 2010/0174709 A1 | 7/2010 | Hansen et al. |
| 2010/0177938 A1 | 7/2010 | Martinez et al. |
| 2010/0179856 A1 | 7/2010 | Paretti et al. |
| 2010/0179857 A1 | 7/2010 | Kalaboukis et al. |
| 2010/0185518 A1 | 7/2010 | Higgins et al. |
| 2010/0186066 A1 | 7/2010 | Pollard |
| 2010/0241964 A1 | 9/2010 | Belinsky et al. |
| 2010/0250676 A1 | 9/2010 | Ufford et al. |
| 2010/0255172 A1 | 10/2010 | Maningat et al. |
| 2010/0274815 A1 | 10/2010 | Vanasco |
| 2010/0293094 A1 | 11/2010 | Kolkowitz et al. |
| 2010/0299292 A1 | 11/2010 | Collazo |
| 2010/0299757 A1 | 11/2010 | Lee |
| 2010/0306099 A1 | 12/2010 | Hirson et al. |
| 2010/0306828 A1 | 12/2010 | Grob et al. |
| 2010/0319053 A1 | 12/2010 | Gharabally |
| 2010/0323730 A1 | 12/2010 | Karmarkar |
| 2011/0016534 A1* | 1/2011 | Jakobsson et al. ............ 726/28 |
| 2011/0029887 A1 | 2/2011 | Pearson et al. |
| 2011/0066615 A1* | 3/2011 | Pradhan ............ G06F 17/30699 707/737 |
| 2011/0070898 A1 | 3/2011 | Sanjeev et al. |
| 2011/0072487 A1 | 3/2011 | Hadar et al. |
| 2011/0112898 A1 | 5/2011 | White |
| 2011/0131122 A1 | 6/2011 | Griffin et al. |
| 2011/0131131 A1* | 6/2011 | Griffin .................. G06Q 40/00 705/38 |
| 2011/0137789 A1 | 6/2011 | Kortina et al. |
| 2011/0145927 A1 | 6/2011 | Hubner et al. |
| 2011/0161085 A1 | 6/2011 | Boda et al. |
| 2011/0162034 A1 | 6/2011 | Nagaratnam et al. |
| 2011/0166922 A1 | 7/2011 | Fuerstenberg |
| 2011/0185401 A1 | 7/2011 | Bak et al. |
| 2011/0191200 A1 | 8/2011 | Bayer et al. |
| 2011/0196926 A1 | 8/2011 | Crawford |
| 2011/0209196 A1 | 8/2011 | Kennedy |
| 2011/0218948 A1* | 9/2011 | De Souza ............... G06F 15/16 706/12 |
| 2011/0225048 A1 | 9/2011 | Nair |
| 2011/0231223 A1 | 9/2011 | Winters |
| 2011/0238482 A1 | 9/2011 | Carney et al. |
| 2011/0239276 A1 | 9/2011 | Garcia Garcia et al. |
| 2011/0251823 A1 | 10/2011 | Davis et al. |
| 2011/0264528 A1* | 10/2011 | Whale ................... G06Q 30/02 705/14.58 |
| 2011/0276486 A1* | 11/2011 | Kuba ............................ 705/44 |
| 2011/0302640 A1 | 12/2011 | Liu et al. |
| 2011/0314017 A1 | 12/2011 | Yariv et al. |
| 2011/0314559 A1 | 12/2011 | Jakobsson |
| 2011/0321157 A1* | 12/2011 | Davis et al. .................... 726/19 |
| 2012/0005230 A1* | 1/2012 | Jhanji ................ G06Q 30/0259 707/769 |
| 2012/0009943 A1 | 1/2012 | Greenberg |
| 2012/0030764 A1 | 2/2012 | White et al. |
| 2012/0041822 A1 | 2/2012 | Landry et al. |
| 2012/0054691 A1 | 3/2012 | Nurmi |
| 2012/0060214 A1 | 3/2012 | Nahari |
| 2012/0066065 A1* | 3/2012 | Switzer ............. G06Q 30/0255 705/14.53 |
| 2012/0089732 A1* | 4/2012 | Clark .................... G06Q 10/10 709/225 |
| 2012/0100869 A1 | 4/2012 | Liang et al. |
| 2012/0131034 A1 | 5/2012 | Kenedy et al. |
| 2012/0136936 A1 | 5/2012 | Quintuna |
| 2012/0137340 A1* | 5/2012 | Jakobsson et al. ................ 726/1 |
| 2012/0144468 A1 | 6/2012 | Pratt et al. |
| 2012/0159647 A1 | 6/2012 | Sanin et al. |
| 2012/0197754 A1 | 8/2012 | Kalin |
| 2012/0198491 A1 | 8/2012 | O'Connell et al. |
| 2012/0198532 A1 | 8/2012 | Headley |
| 2012/0209768 A1 | 8/2012 | Nuzzi |
| 2012/0214442 A1 | 8/2012 | Crawford et al. |
| 2012/0226701 A1 | 9/2012 | Singh |
| 2012/0272156 A1* | 10/2012 | Kerger .................. H04M 3/487 715/747 |
| 2012/0284602 A1 | 11/2012 | Seed et al. |
| 2012/0284779 A1 | 11/2012 | Ingrassia, Jr. et al. |
| 2012/0323685 A1* | 12/2012 | Ullah ......................... 705/14.53 |
| 2013/0013404 A1* | 1/2013 | Suprock et al. ........... 705/14.53 |
| 2013/0019289 A1 | 1/2013 | Gonser et al. |
| 2013/0024916 A1 | 1/2013 | Evans |
| 2013/0036458 A1 | 2/2013 | Liberman et al. |
| 2013/0036459 A1 | 2/2013 | Liberman et al. |
| 2013/0042327 A1* | 2/2013 | Chow ............................. 726/28 |
| 2013/0054433 A1* | 2/2013 | Giard et al. ..................... 705/34 |
| 2013/0054470 A1 | 2/2013 | Campos et al. |
| 2013/0055367 A1* | 2/2013 | Kshirsagar et al. .............. 726/6 |
| 2013/0061285 A1* | 3/2013 | Donfried et al. .................. 726/3 |
| 2013/0066962 A1 | 3/2013 | Scherzinger et al. |
| 2013/0067546 A1 | 3/2013 | Thavasi et al. |
| 2013/0091262 A1 | 4/2013 | Rajakarunanayake et al. |
| 2013/0096980 A1 | 4/2013 | Basavapatna et al. |
| 2013/0097669 A1 | 4/2013 | Davis et al. |
| 2013/0097673 A1* | 4/2013 | Meehan et al. ................... 726/4 |
| 2013/0097683 A1 | 4/2013 | Davis et al. |
| 2013/0102283 A1* | 4/2013 | Lau et al. ...................... 455/411 |
| 2013/0133052 A1 | 5/2013 | Davis et al. |
| 2013/0133054 A1 | 5/2013 | Davis et al. |
| 2013/0159413 A1 | 6/2013 | Davis et al. |
| 2013/0167207 A1 | 6/2013 | Davis et al. |
| 2013/0173457 A1 | 7/2013 | Chrapko et al. |
| 2013/0191887 A1 | 7/2013 | Davis et al. |
| 2013/0198811 A1 | 8/2013 | Yu et al. |
| 2013/0227700 A1 | 8/2013 | Dhillon et al. |
| 2013/0288647 A1* | 10/2013 | Turgeman ............. H04W 12/06 455/411 |
| 2013/0291099 A1 | 10/2013 | Donfried et al. |
| 2013/0305325 A1 | 11/2013 | Headley |
| 2013/0305336 A1 | 11/2013 | Konertz et al. |
| 2013/0332337 A1 | 12/2013 | Tran |
| 2014/0158760 A1 | 6/2014 | Seker |

OTHER PUBLICATIONS

U.S. Appl. No. 13/373,682, Davis et al.

Trejo et al.; "Using Cloud Computing MapReduce operations to Detect DDoS Attacks on DNS servers"; Proceedings of the 4th Iberian Grid Infrastructure Conference; pdf created Mar. 1, 2013; pp. 1-13.

Xie et al.; "Privacy-Preserving Matchmaking for Mobile Social Networking Secure Against Malicious Users"; 2011 Ninth Annual International Conference on Privacy, Security and Trust; bearing a date of Jul. 11, 2011; pp. 1-8; IEEE.

Germanakos et al.; "Personalization Systems and Processes Review based on a Predetermined User Interface Categorization"; Proceedings of the III International conference on communication and reality, digital utopia in the media: From discourses to facts; May 2005; 12 pages.

Mobasher et al.; "Creatinig Adaptive Web Sites Through Usage-Based Clustering of URLs"; IEEE; 1999 (created on May 9, 2014); 7 pages.

Monrose et al.; "Keystroke dynamics as a biometric for authentication"; Future Generation Computer Systems; Mar. 3, 1999; pp. 351-359; vol. 16; © 2000 Elsevier Science B.V.

Nauman et al.; "TOKEN: Trustable Keystroke-Based Authentication for Web-Based Applications on Smartphones"; ISA 2010, CCIS 76; 2010 (created on May 9, 2014); pp. 286-297; © Springer-Verlap Berlin Heidelberg 2010.

Melton, R.G.; "Details of the GPS position calculation"; located at: https://www.courses.psu.edu/aersp/aersp055_r81/satellites/pgs_details.html; accessed on Jul. 11, 2016; pp. 1-2.

European Patent Office; Communication pursuant to Article 94(3) EPC; European App. No. EP 13 809 279.6; Dec. 12, 2016; pp. 1-7.

PCT International Search Report; International App. No. PCT/US13/48664; dated Dec. 3, 2013; pp. 1-3.

(56) References Cited

OTHER PUBLICATIONS

Venkataram et al.; "An authentication scheme for ubiquitous commerce: A cognitive agents based approach"; Network Operations and Management Symposium Workshops; dated Apr. 7-11, 2008; pp. 248-256; IEEE.
Brainard, John; Juels, Ari; Rivest, Ronald L.; Szydlo, Michael; Yung, Moti; "Fourth-Factor Authentication: Somebody You Know"; ACM CCS; 2006; pp. 168-178; Alexandria, Virginia.
Diep, Francie; "Your finger swipe could become your password"; NBC News Future Tech; Oct. 2, 2012; http://www.nbcnews.com/technology/futureoftech/your-finger-swipe-could-become-your-password-6215845.
Gianchandani, Erwin; "DARPA Seeking to Develop a 'Cognitive Fingerprint'"; Computing Community Consortium Blog; Jan. 27, 2012; http://www.cccblog.org/2012/01/27/darpa-seeking-to-develop-a-cognitive-fingerprint/.
Jacobs, Tom; "Identity Protection That Really Clicks"; Pacific Standard Magazine; May 3, 2012; http://www.psmag.com/business-economics/identity-protection-that-really-clicks-42048/.
Jorgensen, Zach; Yu, Ting; "On Mouse Dynamics as a Behavioral Biometric for Authentication"; 2011; pp. 476-482; Department of Computer Science, North Carolina State University; Releigh, North Carolina.
Riva, Oriana; Qin, Chuan; Strauss, Karin; Lymberopoulos, Dimitrios; "Progressive authentication: deciding when to authenticate on mobile phones"; Microsoft Research; Aug. 8, 2012; http://research.microsoft.com/apps/pubs/default.aspx?id=168102.

\* cited by examiner

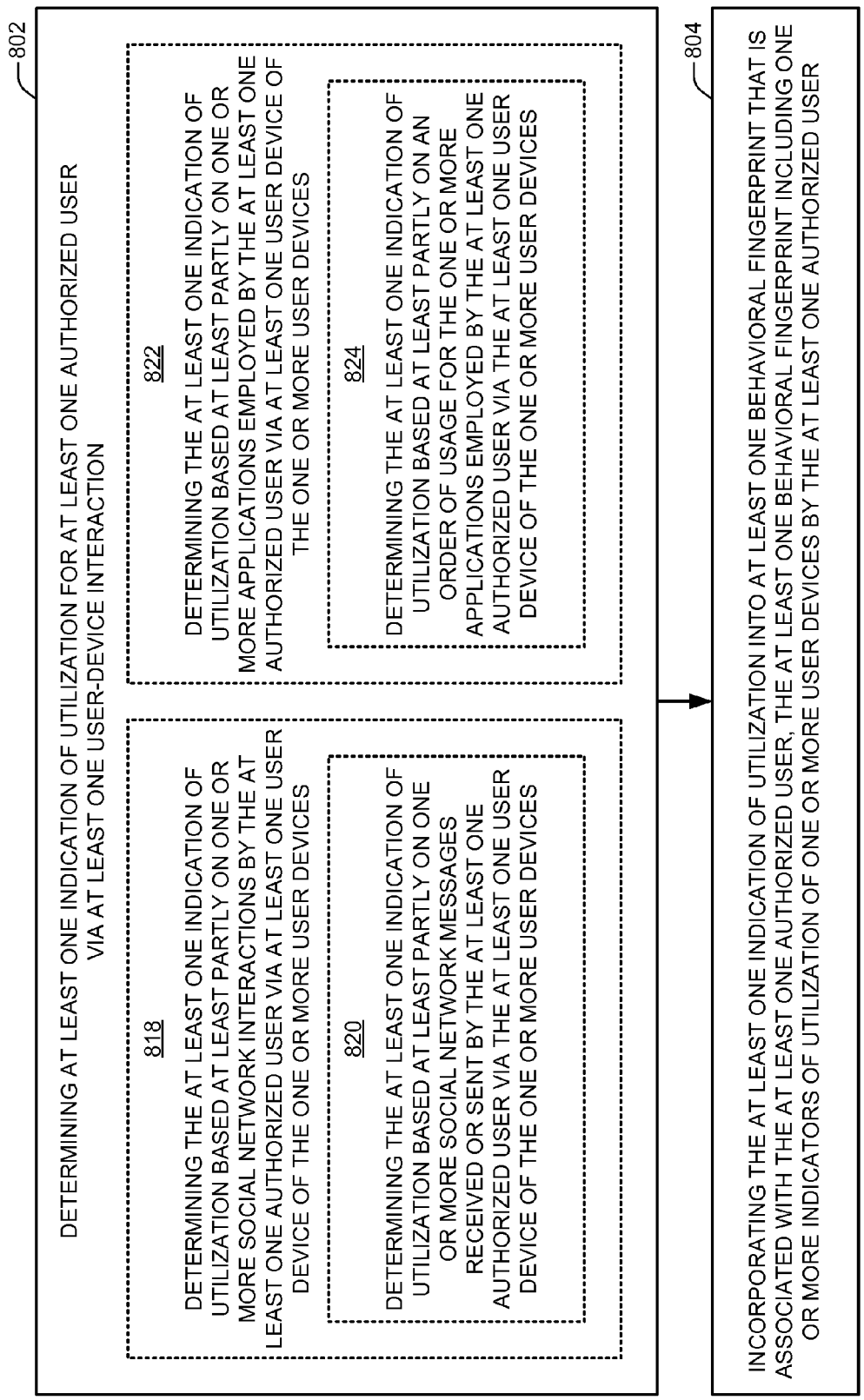

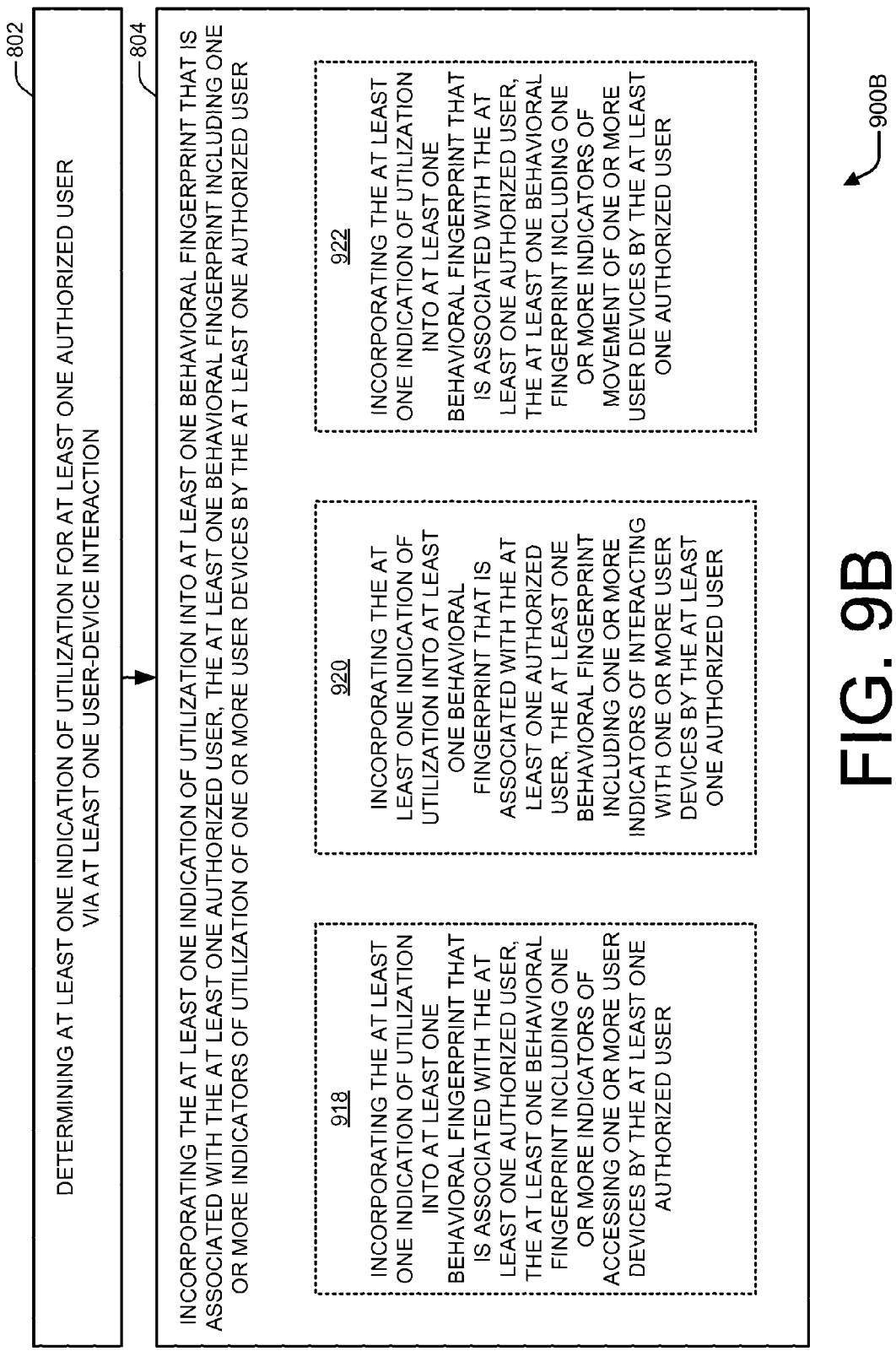

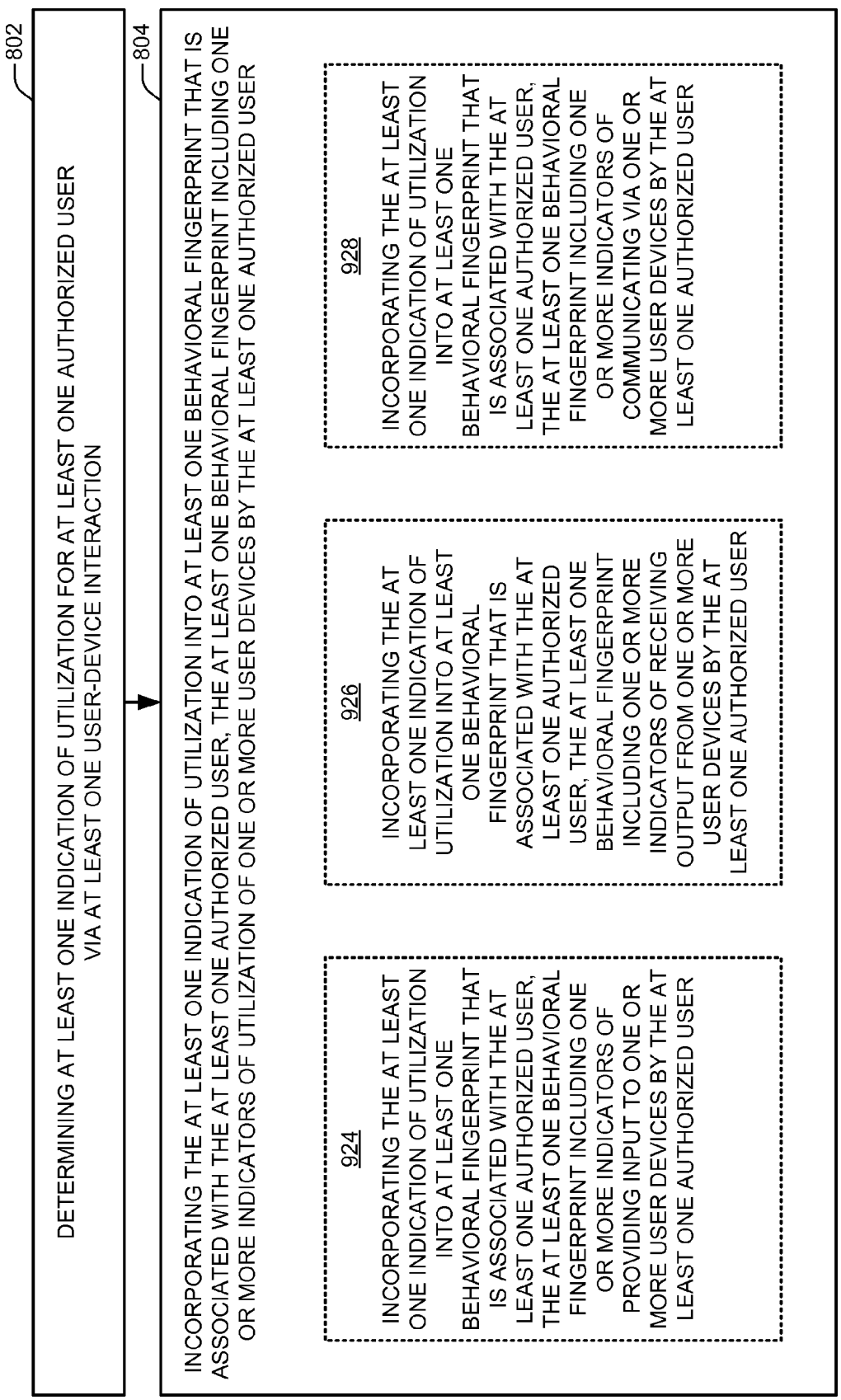

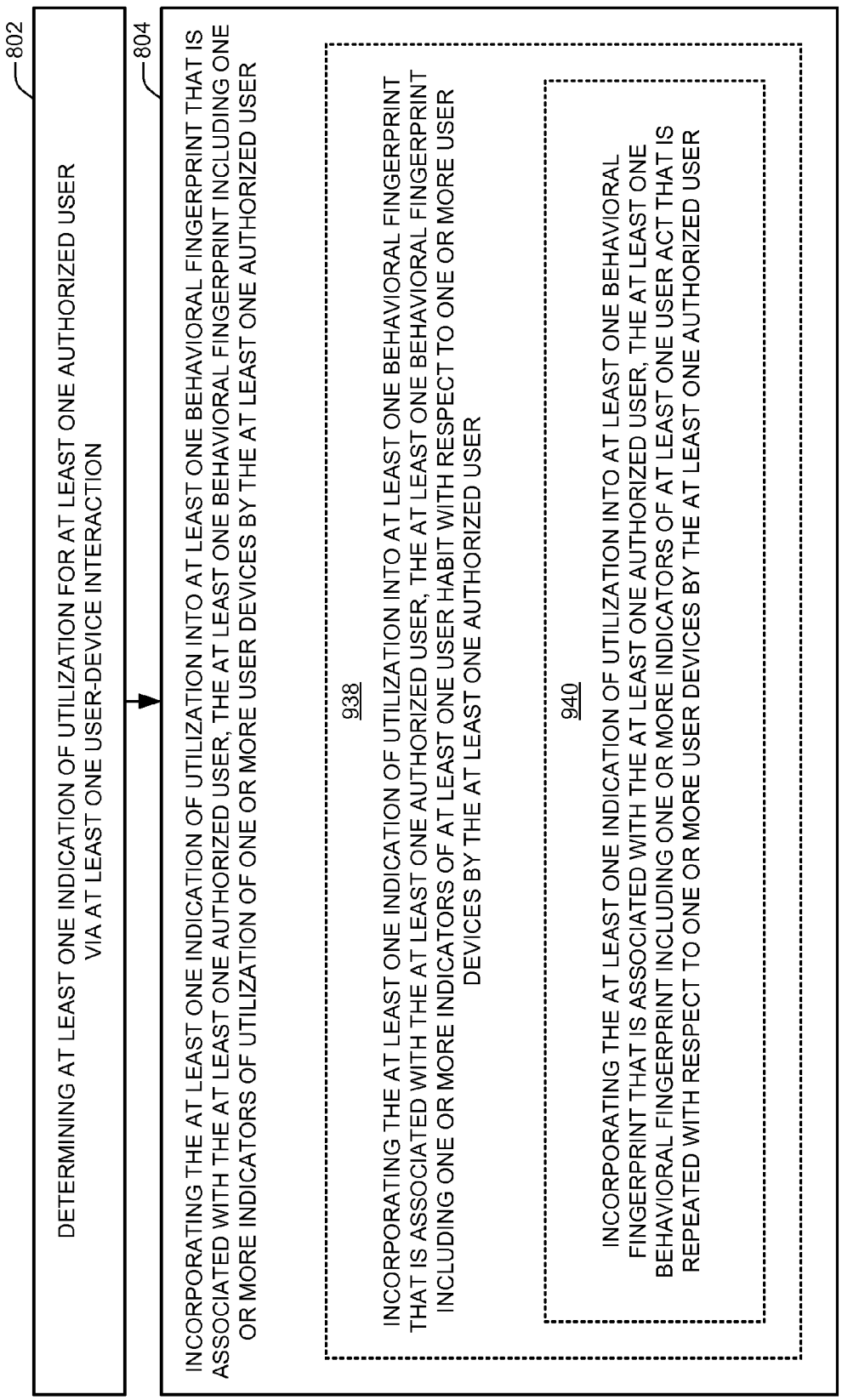

BEHAVIORAL FINGERPRINTING WITH ADAPTIVE DEVELOPMENT

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority application(s)). In addition, the present application is related to the "Related applications," if any, listed below.

Priority Applications:
(1) For purposes of the USPTO extra-statutory requirements, the present application claims benefit of priority of U.S. Provisional Patent Application No. 61/632,836, entitled "Behavioral Fingerprint Based Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 24 Sep. 2011, which was filed within the twelve months preceding the filing date of the present application or is an application of which a currently co-pending application is entitled to the benefit of the filing date.
(2) For purposes of the USPTO extra-statutory requirements, the present application claims benefit of priority of U.S. Provisional Patent Application No. 61/572,309, entitled "Network Acquired Behavioral Fingerprint for Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 13 Oct. 2011, which was filed within the twelve months preceding the filing date of the present application or is an application of which a currently co-pending application is entitled to the benefit of the filing date.
(3) For purposes of the USPTO extra-statutory requirements, the present application constitutes a continuation-in-part of U.S. patent application Ser. No. 13/373, 685, entitled "Behavioral Fingerprint Device Identification", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 23 Nov. 2011, which is currently co-pending or is an application of which a currently co-pending application is entitled to the benefit of the filing date.
(4) For purposes of the USPTO extra-statutory requirements, the present application constitutes a continuation-in-part of U.S. patent application Ser. No. 13/373, 684, entitled "Behavioral Fingerprint Controlled Automatic Task Determination", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 23 Nov. 2011, which is currently co-pending or is an application of which a currently co-pending application is entitled to the benefit of the filing date.
(5) For purposes of the USPTO extra-statutory requirements, the present application constitutes a continuation-in-part of United States patent application Ser. No. 13/373,680, entitled "Behavioral Fingerprint Controlled Theft Detection and Recovery", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 23 Nov. 2011, which is currently co-pending or is an application of which a currently co-pending application is entitled to the benefit of the filing date.
(6) For purposes of the USPTO extra-statutory requirements, the present application constitutes a continuation-in-part of U.S. patent application Ser. No. 13/373, 677, entitled "Trust Verification Schema Based Transaction Authorization", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 23 Nov. 2011, which is currently co-pending or is an application of which a currently co-pending application is entitled to the benefit of the filing date.
(7) For purposes of the USPTO extra-statutory requirements, the present application constitutes a continuation-in-part of U.S. patent application Ser. No. 13/373, 682, entitled "Social Network Based Trust Verification Schema", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 23 Nov. 2011, which is currently co-pending or is an application of which a currently co-pending application is entitled to the benefit of the filing date.
(8) For purposes of the USPTO extra-statutory requirements, the present application constitutes a continuation-in-part of U.S. patent application Ser. No. 13/475, 564, entitled "Behavioral Fingerprint Based Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 18 May 2012, which is currently co-pending or is an application of which a currently co-pending application is entitled to the benefit of the filing date.
(9) For purposes of the USPTO extra-statutory requirements, the present application constitutes a continuation-in-part of U.S. patent application Ser. No. 13/538, 385, entitled "Network Acquired Behavioral Fingerprint for Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 29 Jun. 2012, which is currently co-pending or is an application of which a currently co-pending application is entitled to the benefit of the filing date.

(10) For purposes of the USPTO extra-statutory requirements, the present application constitutes a continuation-in-part of U.S. patent application Ser. No. 13/552,502, entitled "Relationship Based Trust Verification Schema", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 18 Jul. 2012, which is currently co-pending or is an application of which a currently co-pending application is entitled to the benefit of the filing date.

(11) For purposes of the USPTO extra-statutory requirements, the present application constitutes a continuation-in-part of U.S. patent application Ser. No. 13/563,599, entitled "Multi-Device Behavioral Fingerprinting", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 31 Jul. 2012, which is currently co-pending or is an application of which a currently co-pending application is entitled to the benefit of the filing date.

(12) For purposes of the USPTO extra-statutory requirements, the present application constitutes a continuation-in-part of U.S. patent application Ser. No. 13/602,061, entitled "Behavioral Fingerprinting Via Social Networking Interaction", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 31 Aug. 2012, which is currently co-pending or is an application of which a currently co-pending application is entitled to the benefit of the filing date.

(13) For purposes of the USPTO extra-statutory requirements, the present application constitutes a continuation-in-part of U.S. patent application Ser. No. 13/631,667, entitled "Behavioral Fingerprinting Via Derived Personal Relation", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 28 Sep. 2012, which is currently co-pending or is an application of which a currently co-pending application is entitled to the benefit of the filing date.

(14) For purposes of the USPTO extra-statutory requirements, the present application constitutes a continuation-in-part of U.S. patent application Ser. No. 13/665,830, entitled "Behavioral Fingerprinting Via Inferred Personal Relation", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 31 Oct. 2012, which is currently co-pending or is an application of which a currently co-pending application is entitled to the benefit of the filing date.

(15) For purposes of the USPTO extra-statutory requirements, the present application constitutes a continuation-in-part of U.S. patent application Ser. No. 13/665,841, entitled "Behavioral Fingerprinting Via Corroborative User Device", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 31 Oct. 2012, which is currently co-pending or is an application of which a currently co-pending application is entitled to the benefit of the filing date.

(16) For purposes of the USPTO extra-statutory requirements, the present application constitutes a continuation-in-part of U.S. patent application Ser. No. 13/673,506, entitled "Behavioral Fingerprinting Via Social Network Verification", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 9 Nov. 2012, which is currently co-pending or is an application of which a currently co-pending application is entitled to the benefit of the filing date.

Related Applications:
None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority applications section of the ADS and to each application that appears in the Priority applications section of this application.

All subject matter of the Priority applications and the Related applications and of any and all parent, grandparent, great-grandparent, etc. applications of the Priority applications and the Related applications, including any priority claims, is incorporated herein by reference to the extent such subject matter is not inconsistent herewith.

BRIEF DESCRIPTION OF THE FIGURES

FIGS. 8B-8D depict example additions or alternatives for a flow diagram of FIG. 8A in accordance with certain example embodiments.

FIGS. 9A-9G depict example additions or alternatives for a flow diagram of FIG. 8A in accordance with certain example embodiments.

DETAILED DESCRIPTION

Figure 1:
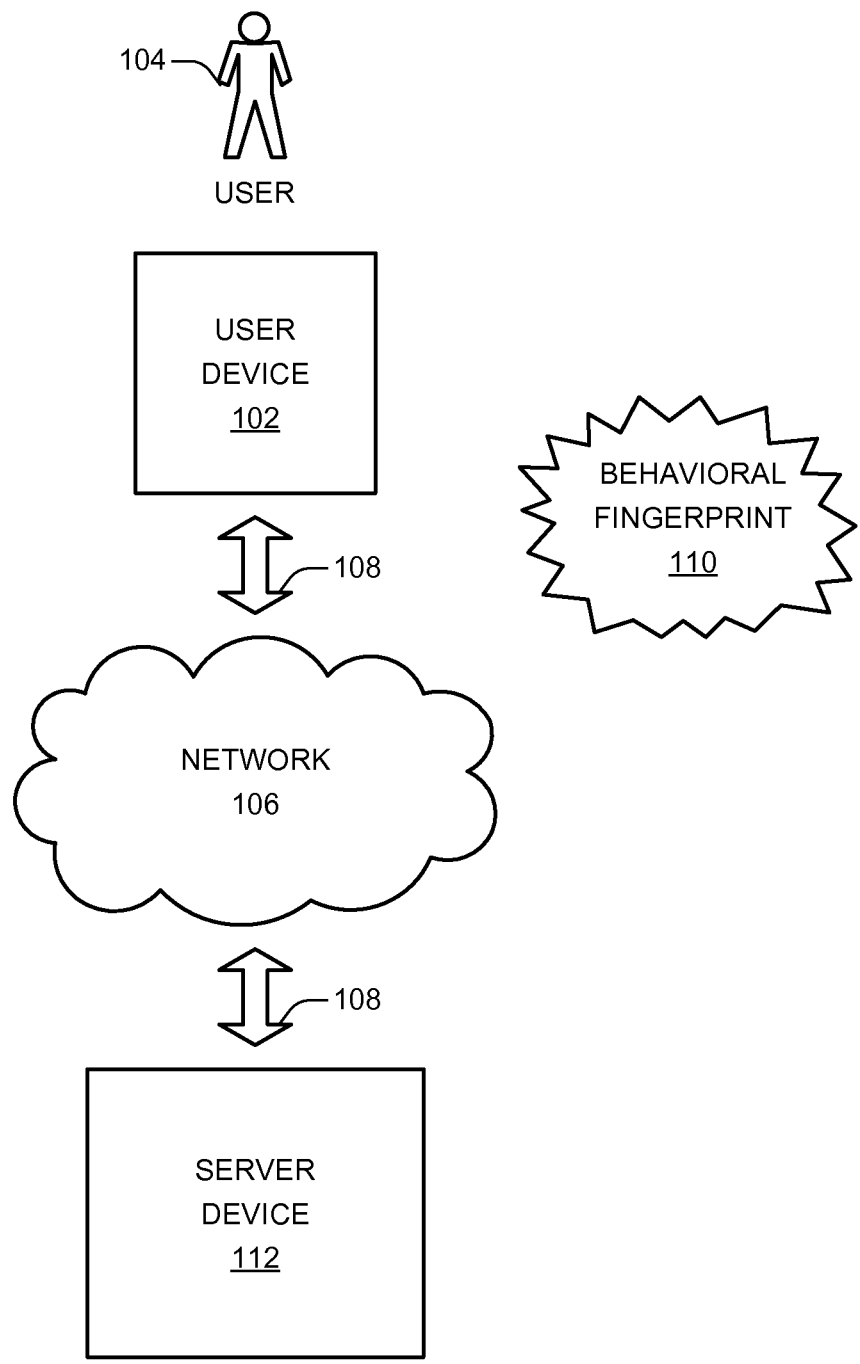
FIG. 1 is a schematic diagram of a user device, a server device, and at least one behavioral fingerprint, any of which may be involved individually or jointly in example authentication scenarios in accordance with certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a schematic diagram 100 of a user device, a server device, and at least one behavioral fingerprint, any of which may be involved individually or jointly in example authentication scenarios in accordance with certain example embodiments. As shown in FIG. 1, by way of example but not limitation, schematic diagram 100 may include at least one user device 102, at least one user 104, at least one network 106, at least one channel 108, at least one behavioral fingerprint 110, or at least one server device 112. More specifically, at least one channel 108 may extend from or lead to a device 102 or 112 to facilitate communication therewith.

For certain example embodiments, a user 104 may correspond to or be utilizing at least one user device 102. A user 104 may utilize a user device 102 in accordance with a usage that may be at least partially represented by, modeled by, incorporated into, stored at, tracked by, summarized in, or a combination thereof, etc. at least one behavioral fingerprint 110. A user device 102 may comprise or include, by way of example but not limitation, a mobile phone, a smart phone, a mobile terminal, a laptop or notebook computer, a personal digital assistant (PDA), a netbook, an entertainment appliance (e.g., a television, a gaming console, a set-top box, a music player, or a combination thereof, etc.), a portable gaming device, a user equipment, a tablet or slate computer, a desktop computer, a personal navigation device (PND), a vehicle with user-accessible computational capabilities, videoconferencing equipment, some combination thereof, or so forth. A user 104 may comprise or include, by way of example only, at least one person, a couple, siblings, a family, a partnership, an organizational group, a company, a robotic user (e.g., a computational entity), an electronic agent, a portion thereof, some combination thereof, or so forth. However, claimed subject matter is not limited to any particular described embodiments, implementations, examples, etc.

For certain example embodiments, a network 106 may comprise or include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may comprise or include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof, or so forth. A node may comprise or include, by way of example but not limitation, a server; a router; an end user device, such as a mobile phone, a tablet computer, a desktop computer, an entertainment appliance, a vehicle, or a combination thereof, etc.; a switch; a base station; a gateway; some combination thereof; or so forth. However, claimed subject matter is not limited to any particular described embodiments, implementations, examples, etc.

For certain example embodiments, a channel 108 may comprise or include, by way of example but not limitation, one or more of: at least one wired link, at least one wireless link, at least part of public network, at least part of a private network, at least part of a packet-switched network, at least part of a circuit-switched network, at least part of an infrastructure network, at least part of an ad hoc network, at least part of a PSTN, at least part of a cable network, at least part of a cellular network connection, at least part of an Internet connection, at least part of a Wi-Fi connection, at least part of a WiMax connection, at least part of an internet backbone, at least part of a satellite network, at least part of a fiber optic network, multiple instances of any of the above, one or more network nodes, some combination of the above, or so forth. A channel 108 may include one or more nodes (e.g., a telecommunication node, an access point, a base station, an internet server, a gateway, an internet or telecommunications switch, or a combination thereof, etc.) through which signals are propagated. A communication may comprise or include, by way of example but not limitation, a transmission of data, a reception of data, an exchange of data, a flow of data (e.g., between or among two or more intermediate nodes or endpoints), some combination thereof, or so forth. A user device 102 may communicate with a server device 112, or vice versa, via one or more signals (not explicitly shown) using one or more channels 108. A couple of examples of channels 108 are illustrated in schematic diagram 100 (as well as in additional figures, such as schematic diagram 200A of FIG. 2A). Signals may propagate via one or more channels 108. Signals, by way of example but not limitation, may comprise or include, electrical signals, magnetic signals, electromagnetic signals, photonic signals, wireless signals, wired signals, multiples ones thereof, some combination thereof, or so forth. However, claimed subject matter is not limited to any particular described embodiments, implementations, examples, etc.

For certain example embodiments, a server device 112 may comprise or include, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof, or so forth. However, claimed subject matter is not limited to any particular described embodiments, implementations, examples, etc.

For certain example embodiments, at least one behavioral fingerprint 110 may comprise or include, by way of example but not limitation, one or more indicators representing one or more behaviors of at least one user with respect to at least one user device. Examples of one or more indicators representing one or more behaviors of at least one user with respect to at least one user device may include, but are not limited to, one or more indicators representing one or more habits of at least one user with respect to at least one user device, one or more indicators representing usage of at least one user device by at least one user, one or more indicators representing one or more actions of at least one user with respect to at least one user device, some combination thereof, or so forth. Additionally or alternatively, at least one behavioral fingerprint 110 may comprise or include, by way of example but not limitation, one or more indicators representing one or more predicted acts (e.g., behaviors, such as habits, usages, actions, or a combination thereof, etc.) of at least one user with respect to at least one device. Additionally or alternatively, at least one behavioral fingerprint 110 may comprise or include, by way of example but not limitation, at least one status of a user that is utilizing or that corresponds to a user device. For certain example implementations, a user whose behavior is being monitored to at least partially establish at least a portion of at least one behavioral fingerprint 110 may comprise or include an authorized user, which is described herein below. However, claimed subject matter is not limited to any particular described embodiments, implementations, examples, etc.

For certain example embodiments, a user may be utilizing a user device, by way of example but not limitation, if the user is accessing the user device, if the user is interacting with the user device, if the user is carrying the user device, if the user is providing input to the user device, if the user is receiving output from the user device, if the user is directing operation of the user device, some combination thereof, or so forth. A user may correspond to a user device, by way of example but not limitation, if the user is an authorized user of the user device. However, claimed subject matter is not limited to any particular described embodiments, implementations, examples, etc.

For certain example embodiments, a user 104 of a user device 102 may comprise or include an authorized user of the user device 102: if the user 104 comprises or includes, by way of example but not limitation, a true owner, a manager, an information technology (IT) specialist, a controller, a purchaser, a lessee, an approved borrower, a primary user, or a combination thereof, etc. of the user device 102; if the user 104 is or has been authorized by a true owner, a manager, an IT specialist, a controller, a purchaser, a lessee, an approved borrower, a primary user, or a combination thereof, etc. of the user device 102; some combination thereof; or so forth. In certain example implementations, a determination that a user 104 comprises or includes (e.g., is, is becoming, is being designated, or a combination thereof, etc.) an authorized user of a user device 102: may be effectuated if or when a user first registers a profile, an account, or a combination thereof, etc. on a device (e.g., after a purchase or a 'hard' reset); may be effectuated if or when one or more 'sign-ins' (e.g., entry of a password, code, PIN, pattern, biometric input, or a combination thereof, etc.) are performed by a user; may be effectuated if or when one or more user ID/secret information combinations (e.g., entry of an account name, email address, individualized identification, or a combination thereof, etc. along with a corresponding password, code, PIN, pattern, biometric input, or a combination thereof, etc.) are entered by a user; may be effectuated if or when a given user is identified as, designated as, or otherwise indicated to comprise or include an authorized user by one who is already an authorized user; some combination of such authorized user determinations; or so forth. An authorized user may add a new authorized user, by way of example only: by providing a name or other identification of another user or his or her biometric information (e.g., a facial photo, a voice sample, a fingerprint image, a retinal scan, or a combination thereof, etc.); by providing a name or other identification of a user or temporary or permanent secret information, such as a password, a code, a PIN, a pattern, biometric input, or a combination thereof, etc. (e.g., that a newly authorized user may be capable of changing or confirming); some combination thereof; or so forth. An authorized user, such as a true owner or IT specialist, may be empowered to remove someone from a list of authorized user(s). In certain example embodiments, different authorized users may have different levels of authorization (e.g., different levels of access, capabilities, rights, privileges, or a combination thereof, etc.) with respect to a given user device 102. For certain example implementations, but by way of example only, one authorized user may comprise or include an administrator with full access rights or privileges, yet another authorized user may comprise or include a regular, non-administrative, or junior user with fewer access rights or privileges. Additionally or alternatively, one authorized user may have full access rights to applications and content stored on a device or associated with a particular account/profile, yet another authorized user may have restricted access rights to applications or content stored on a device such that access is prevented, for instance, to particular device settings or adult content. Other approaches to providing different levels of authorization may also or instead be implemented. By way of example only, an authorized user who is a true owner may add a new authorized user that is permitted to utilize existing applications and content but is prohibited from adding new applications or making particular purchases (e.g., individual purchases above a predetermined dollar amount or multiple purchases beyond a total dollar amount).

Figure 2A:
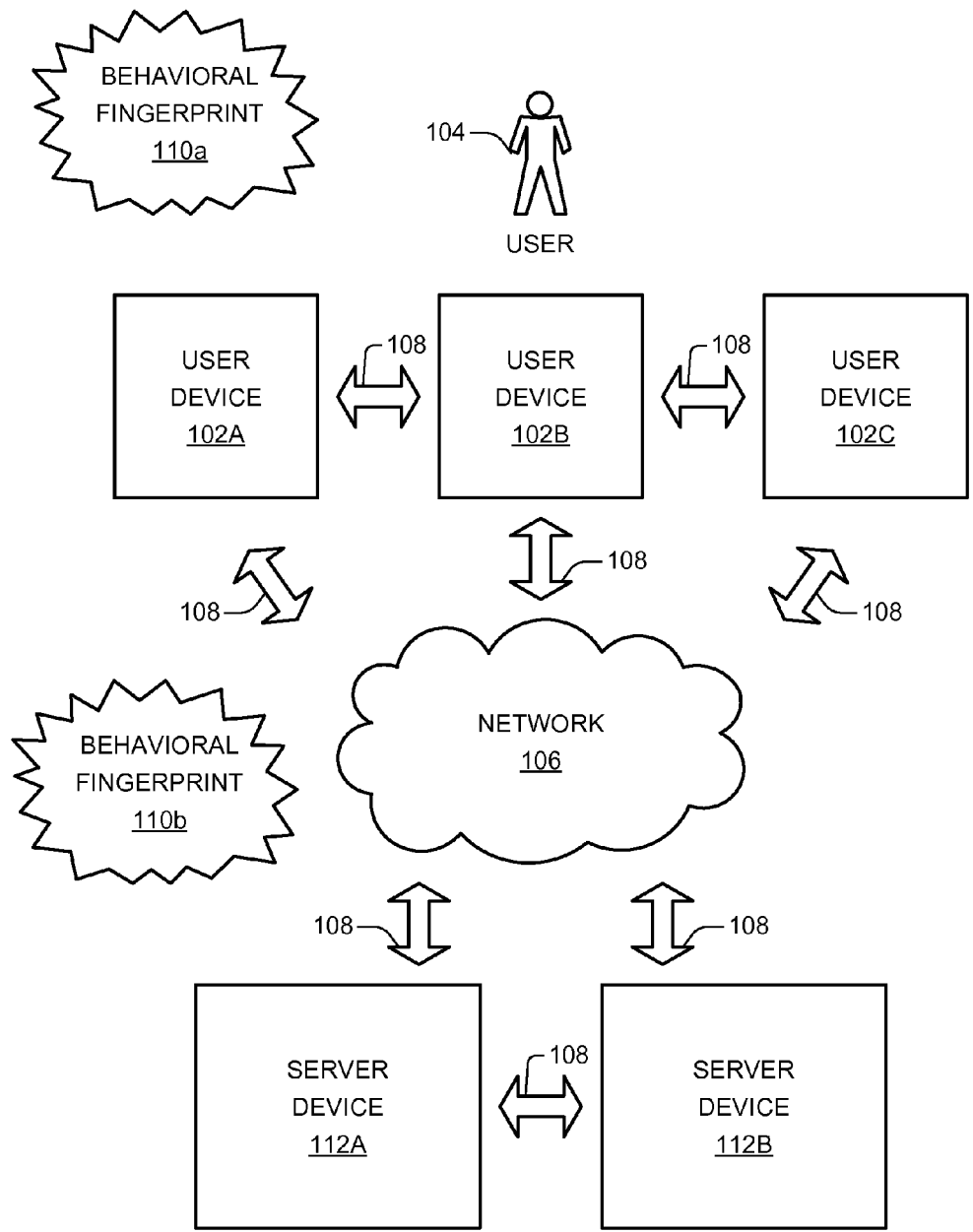
FIG. 2A is a schematic diagram of multiple user devices, multiple server devices, and at least one behavioral fingerprint, any of which may be involved individually or jointly in example authentication scenarios in accordance with certain example embodiments.

FIG. 2A is a schematic diagram 200A of multiple user devices, multiple server devices, and at least one behavioral fingerprint, any of which may be involved individually or jointly in example authentication scenarios in accordance with certain example embodiments. As shown in FIG. 2A, by way of example but not limitation, schematic diagram 200A may include at least one user device 102, at least one user 104, at least one network 106, at least one channel 108, at least one behavioral fingerprint 110, or at least one server device 112. More specifically, schematic diagram 200A may include, by way of example only, three user devices 102 (e.g., a user device 102A, a user device 102B, or a user device 102C, etc.), two server devices 112 (e.g., a server device 112A, or a server device 112B, etc.), or two behavioral fingerprints 110 (e.g., a behavioral fingerprint 110a, or a behavioral fingerprint 110b, etc.).

For certain example embodiments, a user 104 may correspond to or be utilizing multiple user devices 102, such as at least two of user device 102A, user device 102B, or user device 102C, at least partially simultaneously or from time to time. By way of example only, a user 104 may own at least two of: a mobile phone, a tablet computer, a vehicle with an intelligent computing apparatus, a laptop computer, or a desktop computer. For certain example implementations, at least part of a combined behavioral fingerprint 110 (e.g., a behavioral fingerprint 110a/110b) may be associated with a user 104 and each corresponding user device 102. Additionally or alternatively, an individualized behavioral fingerprint 110 (e.g., a behavioral fingerprint 110a or a behavioral fingerprint 110b) may be associated with a user 104 and each corresponding individual or respective user device 102. However, claimed subject matter is not limited to any particular described embodiments, implementations, examples, etc.

For certain example embodiments, a behavioral fingerprint 110, 110a, or 110b; an at least partially combined instantiation of at least two of a behavioral fingerprint 110, 110a, or 110b; a portion of a behavioral fingerprint 110, 110a, or 110b; or a combination thereof; etc. may be distributed across or stored at, by way of example only, one or more of: a user device 102A, a user device 102B, a user device 102C, a network 106 or node thereof, a server device 112A, a server device 112B, some combination thereof, or so forth. Additionally or alternatively, a behavioral fingerprint 110, 110a, or 110b; an at least partially combined instantiation of at least two of a behavioral fingerprint 110, 110a, or 110b; a portion of a behavioral fingerprint 110, 110a, or 110b; or a combination thereof; etc. may be transmitted, received, exchanged, or a combination thereof, etc., by way of example only, via one or more of: at least one network 106, one or more channels 108, some combination thereof, or so forth. A user device 102 or a server device 112 may transmit, receive, exchange, or a combination thereof, etc. at least a portion of a behavioral fingerprint 110, 110a, or 110b directly between or among devices 102 or 112 or indirectly via at least one node (not explicitly shown) of one or more networks 106. However, claimed subject matter is not limited to any particular described embodiments, implementations, examples, etc.

Figure 2B:
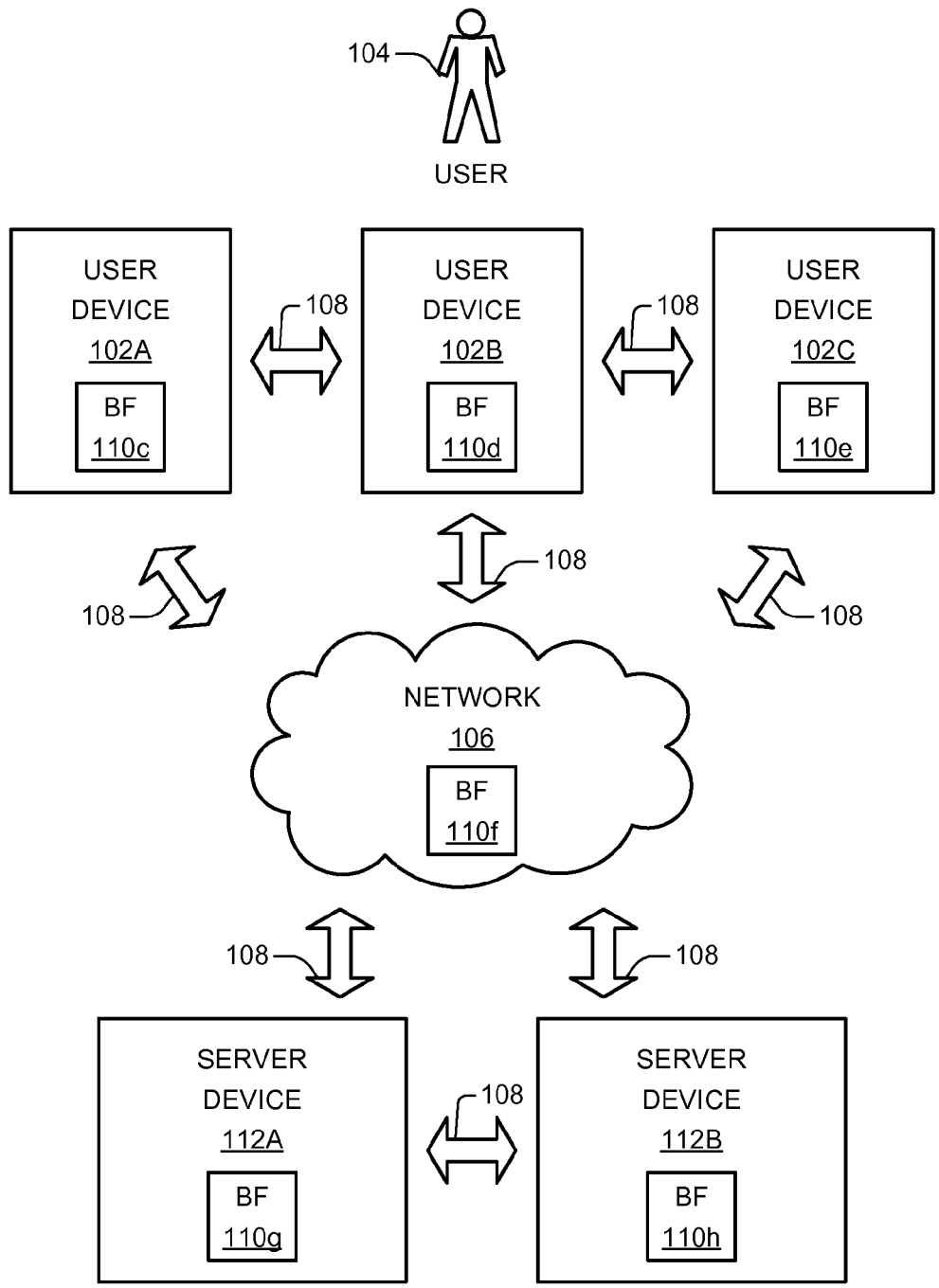
FIG. 2B is a schematic diagram of multiple user devices, multiple server devices, and multiple example locations for at least a portion of at least one behavioral fingerprint in accordance with certain example embodiments.

FIG. 2B is a schematic diagram 200B of multiple user devices, multiple server devices, and multiple example locations for at least a portion of at least one behavioral fingerprint in accordance with certain example embodiments. As shown in FIG. 2B, by way of example but not limitation, schematic diagram 200B may include at least one user device 102, at least one user 104, at least one network 106, at least one channel 108, at least one behavioral fingerprint 110, or at least one server device 112. More specifically, schematic diagram 200B may include, by way of example only, three user devices 102 (e.g., a user device 102A, a user device 102B, or a user device 102C, etc.), two server devices 112 (e.g., a server device 112A, or a server device 112B, etc.), or six behavioral fingerprints 110 (e.g., a behavioral fingerprint 110c, a behavioral fingerprint 110d, a behavioral fingerprint 110e, a behavioral fingerprint 110f, a behavioral fingerprint 110g, or a behavioral fingerprint 110h, etc.).

For certain example embodiments, a given behavioral fingerprint 110 or portion thereof may be located at (stored at, distributed at least partially across, accessible from, associated with, or a combination thereof, etc.) one or more devices 102 or 112. By way of example only, a behavioral fingerprint 110c may be located at a user device 102A, a behavioral fingerprint 110d may be located at a user device 102B, a behavioral fingerprint 110e may be located at a user device 102C, a behavioral fingerprint 110f may be located at a network 106 (e.g., at a cloud service or system), a behavioral fingerprint 110g may be located at a server device 112A, or a behavioral fingerprint 110h may be located at a server device 112B. For certain example implementations, any one or more of behavioral fingerprints 110c-110h may comprise or include one or more separate or individualized behavioral fingerprints 110; may comprise or include one or more combined, amalgamated, distributed, or a combination thereof, etc. behavioral fingerprints 110; may comprise or include at least a portion of at least one behavioral fingerprint 110; some combination thereof; or so forth. However, claimed subject matter is not limited to any particular described embodiments, implementations, examples, etc.

For certain example embodiments, at least one behavioral fingerprint 110 (e.g., of behavioral fingerprints 110c-110h) may be associated with at least one user 104 or one or more of user devices 102A, 102b, or 102C. For certain example implementations, a behavioral fingerprint 110c, which may be stored at a user device 102A, may be associated with a user 104 and user device 102A. For certain example implementations, a behavioral fingerprint 110g, which may be stored at a server device 112A, may be associated with a user 104 and a user device 102A. For certain example implementations, a behavioral fingerprint 110h, which may be stored at a server device 112b, may be associated with a user 104, a user device 102b, and a user device 102C. For certain example implementations, a behavioral fingerprint 110c, which may be stored at a user device 102A and associated therewith, and a behavioral fingerprint 110d, which may be stored at a user device 102b and associated therewith, may be individually or jointly associated with a user 104. A behavioral fingerprint 110c and a behavioral fingerprint 110d may be identical to each other, partially the same, different from one another, updated to keep one at least partially coherent or consistent with the other, some combination thereof, or so forth. For certain example implementations, a behavioral fingerprint 110d, which may be stored at a user device 102B and associated therewith, and a behavioral fingerprint 110g, which may be stored at a server device 112A and associated with a user device 102C, may be individually or jointly associated with a user 104. A behavioral fingerprint 110d and a behavioral fingerprint 110g may be identical to each other, partially the same, different from one another, updated to keep one at least partially coherent or consistent with the other, some combination thereof, or so forth. For certain example implementations, a behavioral fingerprint 110e, which may be stored at a user device 102C and associated therewith, and a behavioral fingerprint 110h, which may be stored at a server device 112b and also associated with user device 102C, may be individually or jointly associated with a user 104. A behavioral fingerprint 110e and a behavioral fingerprint 110h may be identical to each other, partially the same, different from one another, updated to keep one at least partially coherent or consistent with the other, some combination thereof, or so forth. For certain example implementations, a behavioral fingerprint 110e, which may be stored at a user device 102C, may be associated with a user 104 and a user device 102b. Although each user device 102 and server device 112 (and network 106) is shown in schematic diagram 200B as having a behavioral fingerprint 110 located there at, one or more user devices 102 or server devices 112 (or networks 106) may alternatively not have a behavioral fingerprint 110 located there at. Furthermore, other additional or alternative approaches may instead be implemented.

For certain example embodiments, a behavioral fingerprint 110 (including but not limited to any one or more of behavioral fingerprints 110a-110h) may comprise or include a whole behavioral fingerprint, a portion of a behavioral fingerprint, a behavioral fingerprint associated with a single user device, a behavioral fingerprint associated with multiple user devices, a part of a distributed behavioral fingerprint, a whole behavioral fingerprint that is distributed across multiple devices, a portion or a whole behavioral fingerprint that is located at one device, one or more indicators of one or more behavior-related acts, some combination thereof, or so forth. Examples of behavioral fingerprint(s) 110 are described further herein below with particular reference to FIG. 3. However, claimed subject matter is not limited to any particular described embodiments, implementations, examples, etc.

Figure 3:
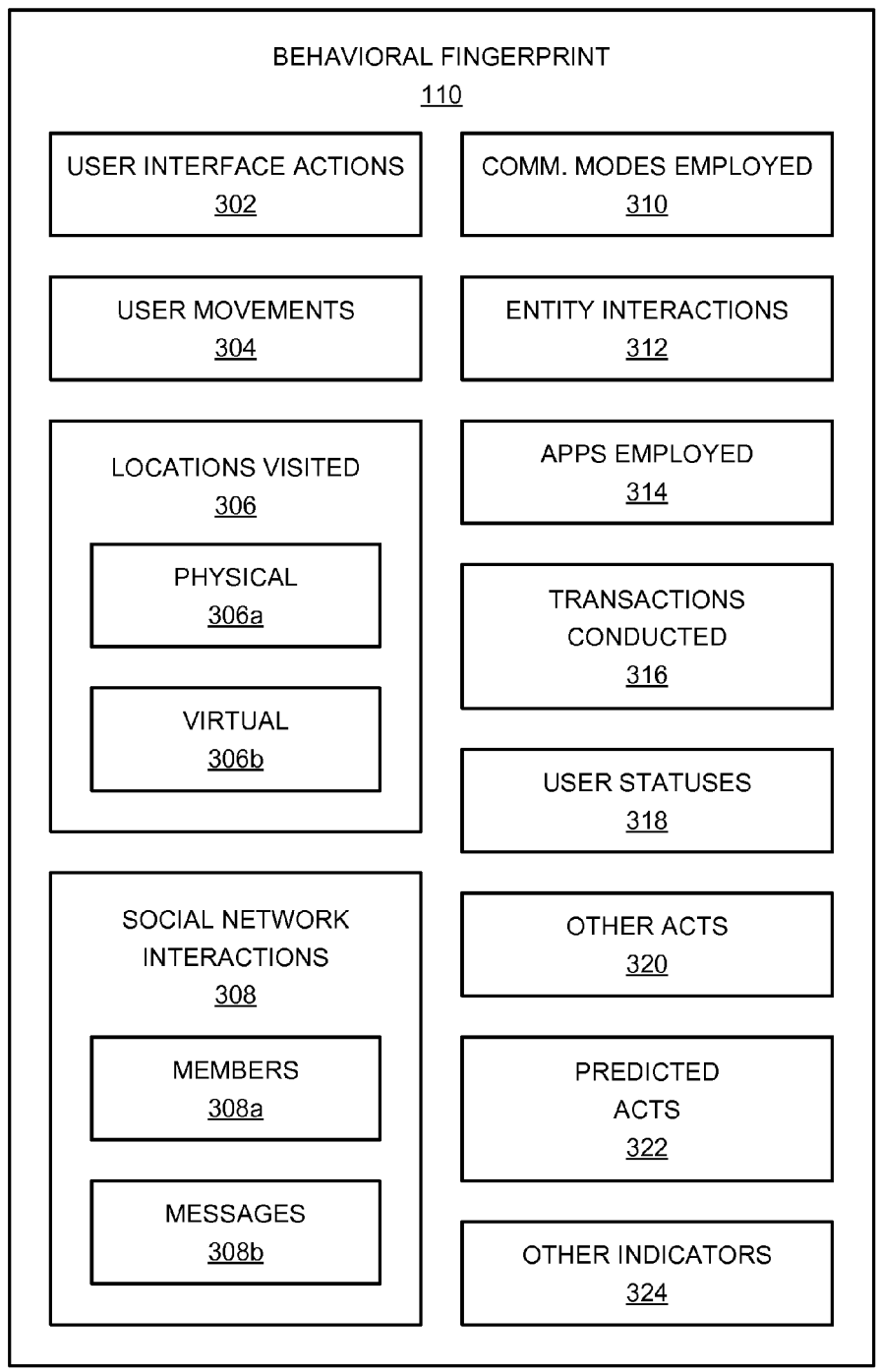
FIG. 3 is a schematic diagram illustrating an example behavioral fingerprint including one or more example indicators of one or more behavior-related acts in accordance with certain example embodiments.
Figure 3:
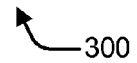

FIG. 3 is a schematic diagram 300 illustrating an example behavioral fingerprint including one or more example indicators of one or more behavior-related acts in accordance with certain example embodiments. As shown in FIG. 3, by way of example but not limitation, schematic diagram 300 may depict a behavioral fingerprint 110, which behavioral fingerprint 110 may include any one or more indicators of various acts 302-322 or other indicators 324. Example indicators 302-324 that are illustrated may include, but are not limited to, user interface actions 302, user movements 304, locations visited 306, social network interactions 308, communication modes employed 310, entity interactions 312, apps employed 314, transactions conducted 316, user statuses 318, other acts 320, predicted acts 322, other indicators 324, some combination thereof, or so forth. More specifically, locations visited 306 may include physical locations visited 306a, virtual locations visited 306b, or a combination thereof, etc., or social network interactions 308 may include social network members 308a, social network messages 308b, or a combination thereof, etc. Additional or alternative implementations to those of schematic diagram 300 for a behavioral fingerprint 110 are described further herein below as well as above. Moreover, a behavioral fingerprint 110 may alternatively include more, fewer, or different indicator(s) from those that are illustrated without departing from claimed subject matter.

For certain example embodiments, one or more user interface actions 302 may include, but are not limited to, a type of user interaction (e.g., buttons, keys, physical keyboard, touch screen, swipes, virtual buttons, virtual keyboard, multi-finger touch, speech, textual, movement sensing input such as a shake or a twist, or a combination thereof, etc.), a speed of user interaction (e.g., speech rate, speech cadence, typing speed, swiping speed, scrolling speed, speed moving between or among windows or apps, duration of a swipe or press of a virtual or physical key or button, or a combination thereof, etc.), a user input apparatus (e.g., a built-in microphone, a wireless microphone, a built-in keyboard, a virtual keyboard, a detachable/attachable keyboard, a wireless keyboard, an input apparatus identifiable such as by name or number, or a combination thereof, etc.), a position of user interaction (e.g., a location of touch for a touch-sensitive screen having a keyboard or button or swipe area, a location of a swipe, a length of a swipe, an offset from a designated key or slide area, or a combination thereof, etc.), a user output apparatus (e.g., a screen, a built-in speaker, a separate speaker, a vibration unit, an integrated output apparatus, a wired output apparatus, a wireless output apparatus, an output apparatus identifiable such as by name or number, or a combination thereof, etc.), some combination thereof, or so forth. However, claimed subject matter is not limited to any particular described embodiments, implementations, examples, etc.

For certain example embodiments, one or more user movements 304 may include, but are not limited to, device orientation (e.g., cardinal direction a device is pointed at, angle a device is held at, or a combination thereof, etc.), device shakes or deformations (e.g., how a device is moved to provide input, how a device is pressed or twisted or curved to provide input, or a combination thereof, etc.), a pattern of vibrations or jostling applied to or experienced by a device during daily use (e.g., as a result of carrying it, commuting with it, placing it in a pack or purse, placing it in a pocket, or a combination thereof, etc.), some combination thereof, or so forth. However, claimed subject matter is not limited to any particular described embodiments, implementations, examples, etc.

For certain example embodiments, one or more locations visited 306 may include, but are not limited to, locations that a user carries, sends, places, or travels with a device; locations that a user directs software to acquire data from or send data to; some combination thereof; or so forth. For certain example implementations, physical locations visited 306a may include, but are not limited to, an address, a room, a store, a building, a neighborhood, a city, a state, a country, one or more satellite positioning system (SPS) coordinates, a check-in location, a business, one or more geographical (e.g., cardinal) coordinates, a geographical zone (e.g., coordinates or approximate position in conjunction with a distance or range), some combination thereof, or so forth. For certain example implementations, virtual locations visited 306b may include, but are not limited to, an internet address, a web page, a web site, a social network, a destination within a social network, a virtual world, a destination within a virtual world, a chat room, a bulletin board, a blog, some combination thereof, or so forth. However, claimed subject matter is not limited to any particular described embodiments, implementations, examples, etc.

For certain example embodiments, one or more social network interactions 308 may include, but are not limited to, accessing a social network, reading a communication from one or more social network members, sending a communication to one or more social network members, changing profile or account information for a social network, viewing publicly-available social network information (e.g., viewing a person's wall, board, stream, pinning, or a combination thereof, etc.), viewing private social network information (e.g., viewing a targeted or personalized message, tweet, picture, or a combination thereof, etc.), searching for entities on a social network, playing games via a social network, experiencing entertainment (e.g., video, audio, clips, pictures, or a combination thereof, etc.) via a social network, a listing of which social network(s) are accessed, an order of which social networks are accessed, a day or time of accessing particular social network(s), some combination thereof, or so forth. For certain example implementations, social network member interactions 308a may include, but are not limited to, identifying or listing members interacted with via receiving, retrieving, sending, replying to or a combination thereof, etc. one or more communications; noting particular social network protocols or modes (e.g., wall writing or viewing, tweet sending or receiving, picture sending or viewing, public versus private communicating, or a combination thereof, etc.) used to communicate with particular members individually or in groups; noting particular social network protocols or modes used to communicate with particular member groups; some combination thereof; or so forth. For certain example implementations, social network message interactions 308b may include, but are not limited to, noting (e.g., recording, memorializing, storing, identifying, or a combination thereof, etc.) messages sent or received, noting an order of message sending or viewing, noting a type (e.g., a social network protocol) of message sent or received, noting a number of messages sent or received, noting a duration between arrival of a message (e.g., generally or from a particular member) and viewing of the message, noting a duration between arrival or viewing of a message (e.g., generally or from a particular member) and responding to the message, some combination thereof, or so forth. However, claimed subject matter is not limited to any particular described embodiments, implementations, examples, etc.

For certain example embodiments, one or more communication modes employed 310 may include, but are not limited to, speech, a phone call, a voice-over-internet-protocol (VoIP) communication, text messaging, instant messaging, a video communication (e.g., a video call, a video conference, or a combination thereof, etc.), a social-network-based communication (e.g., a communication that is effectuated at least partially using a social network app, web site, service, or a combination thereof, etc.), some combination thereof, or so forth. Additionally or alternatively, one or more communication modes employed 310 may include, but are not limited to, indicators of which communication mode is employed if/when responding to a received communication of a given communication mode (e.g., it may be noted that an authorized user may respond to most phone calls or phone calls from particular people with text messages). However, claimed subject matter is not limited to any particular described embodiments, implementations, examples, etc.

For certain example embodiments, one or more entity interactions 312 may include, but are not limited to, identification of at least one entity (e.g., business, service, person, social network member, group, organization, or a combination thereof, etc.) that a user interacts with (e.g., with or without an indicator of a communication mode, such as via a telephone capability, via email, via instant messaging, via a social network communication protocol, via VoIP, via a video capability, via a speech capability, or a combination thereof, etc.), a listing of entities interacted with, an order of entities interacted with, notations of when (e.g., a day, a time, days of week, or a combination thereof, etc.) entities are interacted with, notations of how (e.g., a communication mode used, a duration, or a combination thereof, etc.) entities are interacted with, some combination thereof, or so forth. However, claimed subject matter is not limited to any particular described embodiments, implementations, examples, etc.

For certain example embodiments, one or more apps employed 314 may include, but are not limited to, identification of one or more apps (e.g., applications, native applications, downloaded applications, installed applications, software applications, web applications, or a combination thereof, etc.) employed (e.g., accessed, started, opened, launched, viewed, consulted, manipulated, configured, installed, executed, or a combination thereof, etc.) by a user, a listing of apps employed, an order of apps employed, a notation of a time or a day at which apps are employed, a notation of duration(s) for which apps are employed, some combination thereof, or so forth. However, claimed subject matter is not limited to any particular described embodiments, implementations, examples, etc.

For certain example embodiments, one or more transactions conducted 316 may include, but are not limited to, an identification of transactions (e.g., exchanges of consideration, purchases, orders, downloads, or a combination thereof, etc.) conducted (e.g., initiated, requested, consummated, effectuated, accomplished, monitored, or a combination thereof, etc.), a list of transactions, a notation of times or days of transactions, a notation of transaction amounts, a notation of at least one party to one or more transactions, a notation of items (e.g., physical items such as food or electronics, virtual items such as songs or movies or games or in-game abilities, or a combination thereof, etc.) or services (e.g., physical services such as a massage or a car wash, virtual services such as streaming media or a membership, or a combination thereof, etc.) involved in one or more transactions, some combination thereof, or so forth. However, claimed subject matter is not limited to any particular described embodiments, implementations, examples, etc.

For certain example embodiments, one or more user statuses 318 may include, but are not limited to, a location status update, a health status update, an alert (e.g., as to whether a person has possession or has lost possession of a device; as to whether a device has exceeded some percentage—e.g. 50% or 75% or 100%—of an allotted amount, such as of minutes of talking, bytes of data, messages of texting, dollars of a fund, time of use, etc.; as to where a person is currently located; or a combination thereof; etc.), a current (e.g., most recent, present, or a combination thereof, etc.) activity update, some combination thereof, or so forth. However, claimed subject matter is not limited to any particular described embodiments, implementations, examples, etc.

For certain example embodiments, one or more other acts 320 may include, but are not limited to, other user behaviors, user habits, user actions, user movements, user interactions, user visitations, user transactions, device features (e.g., capabilities, native applications, operating system functions, or a combination thereof, etc.) employed, or a combination thereof, etc. that a device may monitor (e.g., detect, observe, discern, ascertain, or a combination thereof, etc.); other acts reflecting user behavior; other acts described herein; some combination thereof; or so forth. However, claimed subject matter is not limited to any particular described embodiments, implementations, examples, etc.

For certain example embodiments, one or more predicted acts 322 may include, but are not limited to, an act that is predicted based at least partially on any one or more of other indicators 302-320; an act that is predicted to be performed by an authorized user; an act corresponding to a particular likelihood level of re-occurring; an act that is predicted to re-occur in view of one or more observed acts of at least one authorized user of one or more user devices; an act that is predicted to occur based at least partially on a statistical analysis (e.g., a likelihood function, a histogram evaluation, a probabilistic approach, a Bayesian analysis, a stochastic mechanism, a correlation procedure, a probability density function, a normal/Gaussian distribution, a cumulative distribution function, an expected value, or a combination thereof, etc.) of one or more historically-monitored acts; an act that has been repeatedly performed in certain manner(s) or at particular time(s) such that it can be expected to be performed again in such certain manner(s) or at such particular time(s); an act that is derived or results from a conversion of monitored act(s) corresponding to one device to at least one act corresponding to another device; some combination thereof; or so forth. However, claimed subject matter is not limited to any particular described embodiments, implementations, examples, etc.

For certain example embodiments, one or more other indicators 324 may include, but are not limited to, static characteristics of an authorized user, individuals that are related to an authorized user, characteristics of individuals that are related to an authorized user; nature of relationships between or among an authorized user and other individuals, some combination thereof, or so forth. Non-exhaustive examples of other indicators 324 are provided herein below with particular reference to FIGS. 7A-7D, 8A-8D, and 9A-9G. However, claimed subject matter is not limited to any particular described embodiments, implementations, examples, etc.

Figure 4:
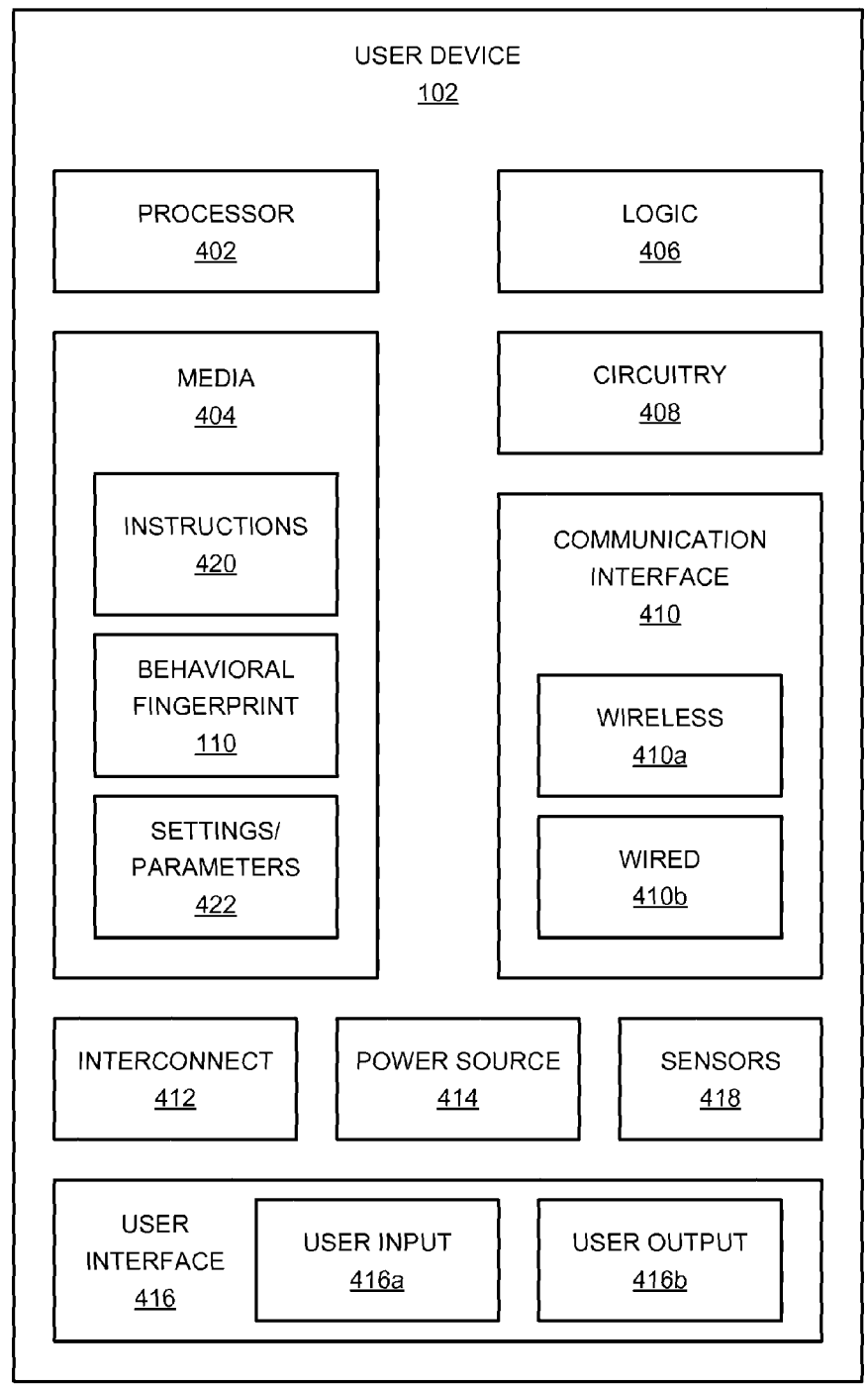
FIG. 4 is a schematic diagram of an example user device including one or more example components in accordance with certain example embodiments.

FIG. 4 is a schematic diagram 400 of an example user device including one or more example components in accordance with certain example embodiments. As shown in FIG. 4, a user device 102 may include one or more components such as: at least one processor 402, one or more media 404, logic 406, circuitry 408, at least one communication interface 410, at least one interconnect 412, at least one power source 414, at least one user interface 416, one or more sensors 418, some combination thereof, or so forth. Furthermore, as shown in schematic diagram 400, one or more media 404 may comprise or include one or more instructions 420, at least one behavioral fingerprint 110, one or more settings or parameters 422, some combination thereof, or so forth; a communication interface 410 may comprise or include at least one wireless communication interface 410a, at least one wired communication interface 410b, some combination thereof, or so forth; or a user interface 416 may comprise or include at least one user input interface 416a, at least one user output interface 416b, some combination thereof, or so forth. However, a user device 102 may alternatively include more, fewer, or different component(s) from those that are illustrated without departing from claimed subject matter.

For certain example embodiments, a user device 102 may include or comprise at least one electronic device. User device 102 may comprise or include, for example, a computing platform or any electronic device having at least one processor or memory. Processor 402 may comprise or include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 404 may bear, store, contain, include, provide access to, or a combination thereof, etc. instructions 420, which may be executable by a processor 402; at least one behavioral fingerprint 110; one or more settings/parameters 422; some combination thereof; or so forth. Instructions 420 may comprise or include, by way of example but not limitation, a program, a module, an application or app (e.g., that is native, that runs in a browser, that runs within a virtual machine, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 404 may comprise or include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, a behavioral fingerprint, settings, parameters, some combination thereof, or so forth.

For certain example embodiments, execution of instructions 420 by one or more processors 402 may transform user device 102 into a special-purpose computing device, apparatus, platform, machine, some combination thereof, or so forth. Instructions 420 may comprise or include, for example, instructions that are capable of realizing at least a portion of one or more flow diagrams, methods, processes, procedures, operations, functionality, technology, mechanisms, or a combination thereof, etc. that are described herein or illustrated in the accompanying drawings. Settings/parameters 422 may comprise or include, by way of example but not limitation, one or more settings or parameters that may be established or determined by a user or other entity, one or more or settings or parameters that may be determined or detected by a user device 102, one or more settings or parameters that may be received from another device that determined or detected them, one or more settings or parameters that may determine at least partly how a user device 102 is to operate or respond to a situation or a behavioral fingerprint, one or more settings or parameters (e.g., values) that may be used to realize flow diagrams, methods, processes, procedures, operations, functionality, technology, mechanisms, or a combination thereof, etc. that are described herein or illustrated in the accompanying drawings. Settings/parameters 422 may control at least partially how at least one behavioral fingerprint 110 is configured, stored, shared, used, applied, some combination thereof, or so forth. Additionally or alternatively, at least a portion of settings/parameters 422 may be at least partially integrated with at least one behavioral fingerprint 110.

For certain example embodiments, logic 406 may comprise or include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 408 may comprise or include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 408 comprises or includes at least one physical or hardware component or aspect.

For certain example embodiments, one or more communication interfaces 410 may provide one or more interfaces between user device 102 and another device or a person/operator. With respect to a person/operator, a communication interface 410 may include, by way of example but not limitation, a screen, a speaker, a keyboard or keys, a microphone, or other person-device input/output apparatuses. A wireless communication interface 410a or a wired communication interface 410b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, or a combination thereof, etc.), a physical or logical network adapter or port, a frequency converter, a baseband processor, or a combination thereof, etc. to communicate wireless signals or wired signals via one or more wireless communication links or wired communication links, respectively, such as over at least one channel 108 (e.g., of FIGS. 1 and 2A). Communications with at least one communication interface 410 may enable transmitting, receiving, or initiating of transmissions, just to name a few examples.

For certain example embodiments, at least one interconnect 412 may enable signal communication between or among components of user device 102. Interconnect 412 may comprise or include, by way of example but not limitation, one or more buses, channels, switching fabrics, some combination thereof, or so forth. Although not explicitly illustrated in FIG. 4, one or more components of user device 102 may be coupled to interconnect 412 via a discrete or integrated interface. By way of example only, one or more interfaces may couple a communication interface 410 or a processor 402 to at least one interconnect 412. For certain example embodiments, at least one power source 414 may provide power to one or more components of user device 102. Power source 414 may comprise or include, by way of example but not limitation, a battery, a power connector, a solar power source or charger, a mechanical power source or charger, a fuel source, some combination thereof, or so forth.

For certain example embodiments, at least one sensor 418 may sense, produce, or otherwise provide at least one sensor value. Sensors 418 may include, by way of example only, a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), some combination thereof, or so forth. Values provided by at least one sensor 418 may comprise or include, by way of example but not limitation, an image, a sound recording, an acceleration value, a temperature, SPS coordinates, a barometric pressure, a humidity level, a compass direction, a gyroscopic value, a magnetic reading, a pressure value, an oscillation value, an ambient light reading, inertial readings, touch detections, finger placements, flex detections, some combination thereof, or so forth.

For certain example embodiments, a user interface 416 may enable one or more users to interact with user device 102. Interactions between a user and a user device may relate, by way of example but not limitation: to touch/tactile/feeling/haptic sensory (e.g., a user may shake, rotate, decline/incline, bend, twist, or move a user device which may be detected by a gyroscope, an accelerometer, a compass, or a combination thereof, etc.; a user may press a button, slide a switch, rotate a knob, etc.; a user may touch a touch-sensitive screen; a device may vibrate; some combination thereof; or so forth), to sound/hearing/speech sensory (e.g., a user may speak into a microphone, a device may generate sounds via a speaker, or a combination thereof, etc.), to sights/vision sensory (e.g., a device may activate one or more lights, modify an image presented on a display screen, or a combination thereof, etc.), some combination thereof, or so forth.

For certain example embodiments, a user interface 416 may comprise or include a user input interface 416a, a user output interface 416b, some combination thereof, or so forth. A user input interface 416a may comprise or include, by way of example but not limitation, a microphone, a button, a switch, a dial, a knob, a wheel, a trackball, a key, a keypad, a keyboard, a touch-sensitive screen, a touch-sensitive surface, a camera, a gyroscope, an accelerometer, a compass, a virtual button/slider/keyboard/etc. presented on a touch-sensitive screen, some combination thereof, or so forth. A user output interface 416b may comprise or include, by way of example but not limitation, a speaker, a screen (e.g., with or without touch-sensitivity), a vibrating haptic feature, some combination thereof, or so forth. Certain user interfaces 416 may enable both user input and user output. For example, a touch-sensitive screen may be capable of providing user output and accepting user input. Additionally or alternatively, a user interface 416 component (e.g., that may be integrated with or separate from a user device 102), such as a headset that has a microphone and a speaker, may enable both user input and user output.

However, claimed subject matter is not limited to any particular described embodiments, implementations, examples, or so forth. For instance, it should be understood that for certain example implementations components that are illustrated separately in FIG. 4 may not necessarily be separate or mutually exclusive. For example, a given component may provide multiple functionalities. By way of example only, a single component such as a USB connector may function as a wired communication interface 410b or a power source 414. Additionally or alternatively, a single component such as a display screen may function as a communication interface 410 with respect to a user, as a user input interface 416a, or as a user output interface 416b. Additionally or alternatively, one or more instructions 420 may function to realize at least part of a behavioral fingerprint 110 or at least one setting or parameter 422.

It should also be understood that for certain example implementations components that are illustrated in schematic diagram 400 or described herein may or may not be integral with or integrated into a user device 102. For example, a component may be removably connected to a user device 102, a component may be wirelessly coupled to a user device 102, some combination thereof, or so forth. By way of example only, instructions 420 may be stored on a removable card having at least one medium 404. Additionally or alternatively, a user interface 416 (e.g., a wired or wireless headset, a screen, a video camera, a keyboard, or a combination thereof, etc.) may be coupled to a user device 102 wirelessly or by wire. However, claimed subject matter is not limited to any particular described embodiments, implementations, examples, etc.

Figure 5:
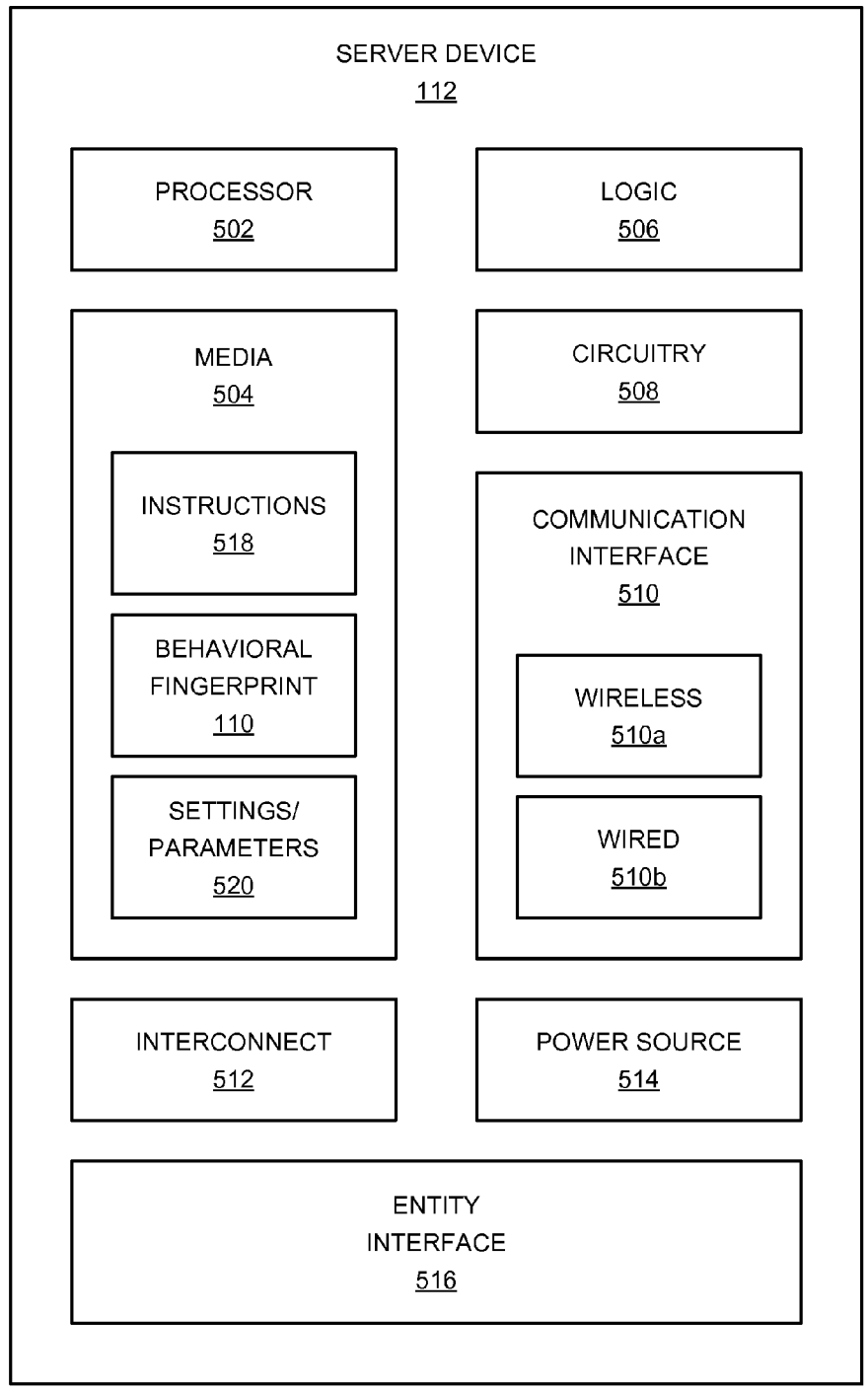
FIG. 5 is a schematic diagram of an example server device including one or more example components in accordance with certain example embodiments.

FIG. 5 is a schematic diagram 500 of an example server device including one or more example components in accordance with certain example embodiments. As shown in FIG. 5, a server device 112 may include one or more components such as: at least one processor 502, one or more media 504, logic 506, circuitry 508, at least one communication interface 510, at least one interconnect 512, at least one power source 514, at least one entity interface 516, some combination thereof, or so forth. Furthermore, as shown in schematic diagram 500, one or more media 504 may comprise or include one or more instructions 518, at least one behavioral fingerprint 110, one or more settings or parameters 520, some combination thereof, or so forth; or communication interface 510 may comprise or include at least one wireless communication interface 510a, at least one wired communication interface 510b, some combination thereof, or so forth. However, a server device 112 may alternatively include more, fewer, or different component(s) from those that are illustrated without departing from claimed subject matter.

For certain example embodiments, a server device 112 may include or comprise at least one processing or computing device or machine. Server device 112 may comprise or include, for example, a computing platform or any electronic device or devices having at least one processor or memory. Processor 502 may comprise or include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 504 may bear, store, contain, include, provide access to, or a combination thereof, etc. instructions 518, which may be executable by a processor 502; at least one behavioral fingerprint 110; one or more settings/parameters 520; some combination thereof; or so forth. Instructions 518 may comprise or include, by way of example but not limitation, a program, a module, an application or app (e.g., that is native, that runs in a browser, that runs within a virtual machine or server, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 504 may comprise or include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, at least one behavioral fingerprint, settings, parameters, some combination thereof, or so forth.

For certain example embodiments, execution of instructions 518 by one or more processors 502 may transform server device 112 into a special-purpose computing device, apparatus, platform, machine, some combination thereof, or so forth. Instructions 518 may comprise or include, for example, instructions that are capable of realizing at least a portion of one or more flow diagrams methods, processes, procedures, operations, functionality, technology, mechanisms, or a combination thereof, etc. that are described herein or illustrated in the accompanying drawings. Settings/parameters 520 may comprise or include, by way of example but not limitation, one or more settings or parameters that may be established by a user or other entity, one or more settings or parameters that may be determined by a server device 112, one or more settings or parameters that may be determined by a user or other entity, one or more settings or parameters that may be detected by a server device 112, one or more settings or parameters that may be received from another device that detected them, one or more settings or parameters that may determine at least partly how a server device 112 is to operate or respond to a situation or a behavioral fingerprint, one or more settings or parameters (e.g., values) that may be used to realize flow diagrams, methods, processes, procedures, operations, functionality, technology, mechanisms, or a combination thereof, etc. that are described herein or illustrated in the accompanying drawings. Settings/parameters 520 may control at least partially how at least one behavioral fingerprint 110 is configured, stored, shared, used, applied, some combination thereof, or so forth. Additionally or alternatively, at least a portion of settings/parameters 520 may be at least partially integrated with at least one behavioral fingerprint 110.

For certain example embodiments, logic 506 may comprise or include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 508 may comprise or include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 508 comprises or includes at least one physical or hardware component or aspect.

For certain example embodiments, one or more communication interfaces 510 may provide one or more interfaces between server device 112 and another device or a person/operator/entity directly or indirectly. A wireless communication interface 510a or a wired communication interface 510b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, a gateway, or a combination thereof, etc.), a physical or logical network adapter or port, a frequency converter, a baseband processor, an internet or telecommunications backbone connector, a fiber optic connector, a storage area network (SAN) connector, or a combination thereof, etc. to communicate wireless signals or wired signals via one or more wireless communication links or wired communication links, respectively, such as over one or more channels 108 (e.g., of FIGS. 1 and 2A). Communications with at least one communication interface 510 may enable transmitting, receiving, or initiating of transmissions, just to name a few examples.

For certain example embodiments, at least one interconnect 512 may enable signal communication between or among components of server device 112. Interconnect 512 may comprise or include, by way of example but not limitation, one or more buses, channels, switching fabrics, local area networks (LANs), storage area networks (SANs), some combination thereof, or so forth. Although not explicitly illustrated in FIG. 5, one or more components of server device 112 may be coupled to interconnect 512 via a discrete or integrated interface. By way of example only, one or more interfaces may couple a processor 502 or a medium 504 to at least one interconnect 512. For certain example embodiments, at least one power source 514 may provide power to one or more components of server device 112. Power source 514 may comprise or include, by way of example but not limitation, a power connector for accessing an electrical grid, a fuel cell, a solar power source, some combination thereof, or so forth.

For certain example embodiments, an entity interface 516 may enable one or more entities (e.g., another device, a person, a group, a robotic entity, or a combination thereof, etc.) to provide input to or receive output from server device 112. Interactions between an entity and a device may relate, by way of example but not limitation, to inputting or outputting instructions, commands, settings, parameters, indications or indicators, some combination thereof, or so forth. Certain entity interfaces 516 may enable both entity input and entity output at server device 112 or over at least one network link, such as one or more channels 108 (e.g., of FIGS. 1 and 2A).

However, claimed subject matter is not limited to any particular described embodiments, implementations, examples, or so forth. For instance, it should be understood that for certain example implementations components that are illustrated separately in FIG. 5 need not necessarily be separate or mutually exclusive. For example, a given component may provide multiple functionalities. By way of example only, hard-wired logic 506 may form circuitry 508. Additionally or alternatively, a single component such as a connector may function as a communication interface 510 or as an entity interface 516. Additionally or alternatively, one or more instructions 518 may function to realize at least one setting or parameter 520.

It should also be understood that for certain example implementations components that are illustrated in schematic diagram 500 or described herein may not be integral or integrated with a server device 112. For example, a component may be removably connected to a server device 112, a component may be wirelessly coupled to a server device 112, one or more components of a server device 112 may be geographically distributed or separated from one another, some combination thereof, or so forth. By way of example only, instructions 518 may be stored on one medium 504, and settings/parameters 520 (or another portion of instructions 518) may be stored on a different medium 504, which may comprise or include a same server or a part of a different server of, e.g., a server farm. Additionally or alternatively, respective processor-media sets may be physically realized on different or respective server blades or server containers. Multiple server blades, for instance, may be linked or interlinked to realize at least one server device 112. However, claimed subject matter is not limited to any particular described embodiments, implementations, examples, etc.

Figure 6A:
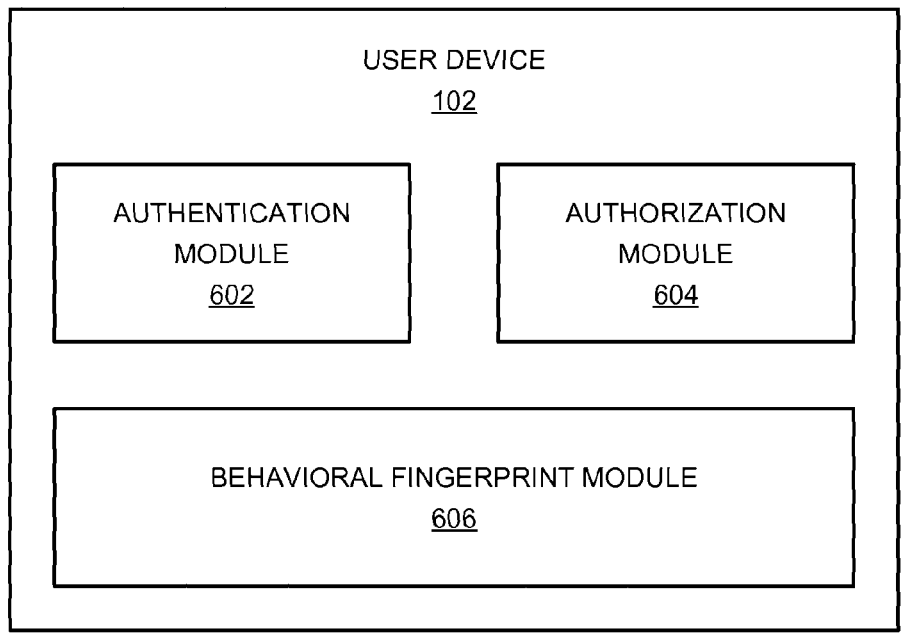
FIGS. 6A and 6B are schematic diagrams of an example user device and an example server device, respectively, that have one or more functional modules in accordance with certain example embodiments.
Figure 6B:
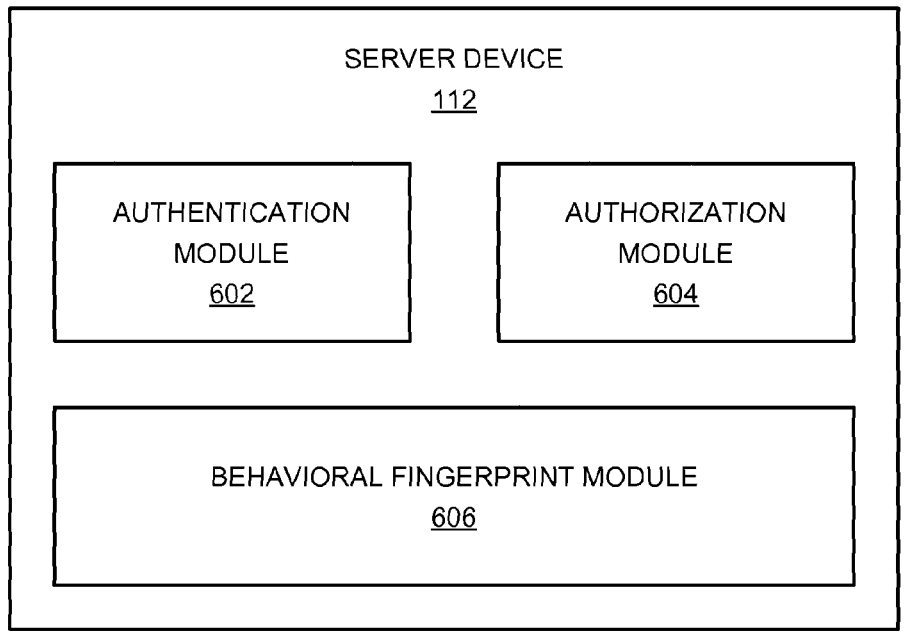

FIGS. 6A and 6B are schematic diagrams 600A and 600B of an example user device and an example server device, respectively, that have one or more functional modules in accordance with certain example embodiments. As shown in FIGS. 6A and 6B, by way of example but not limitation, schematic diagrams 600A and 600B may depict a user device 102 and a server device 112, respectively. As illustrated in schematic diagrams 600A and 600B, a user device 102 or a server device 112 may include, but are not limited to, at least one authentication module 602, at least one authorization module 604, at least one behavioral fingerprint module 606, a combination thereof, or so forth. However, a user device 102 or a server device 112 may alternatively include more, fewer, or different module(s) from those that are illustrated without departing from claimed subject matter.

For certain example embodiments, a module may be comprised of or may include at least one processor (e.g., a processor 402 of FIG. 4, a processor 502 of FIG. 5, or a combination thereof, etc.), one or more media (e.g., a medium 404 of FIG. 4, a media medium 504 of FIG. 5, or a combination thereof, etc.), instructions (e.g., processor-executable instructions, instructions 420 of FIG. 4, instructions 518 of FIG. 5, computer-implementable instructions, or a combination thereof, etc.), logic (e.g., logic 406 of FIG. 4, logic 506 of FIG. 5, or a combination thereof, etc.), circuitry (e.g., circuitry 408 of FIG. 4, circuitry 508 of FIG. 5, or a combination thereof, etc.), other described or illustrated component(s), some combination thereof, or so forth. For certain example implementations, one or more modules (e.g., an authentication module 602, an authorization module 604, a behavioral fingerprint module 606, or a combination thereof, etc.) of at least one user device 102 may function or interoperate with one or more modules of at least one server device 112. However, claimed subject matter is not limited to any particular described embodiments, implementations, examples, etc.

For certain example embodiments, an authentication module 602 may operate to authenticate a user of a device. For certain example implementations, a user of a device may be authenticated by determining to some (e.g., reasonable, acceptable, measurable, quantifiable, or a combination thereof, etc.) degree an identity of a user. By way of example but not limitation, an authentication module 602 may enable implementation of multiple degrees of authentication, with different degrees of authentication corresponding to different levels of certainty of an identity of a user. Example aspects related to authentication are described further herein (e.g., at least herein above with particular reference to FIG. 1). However, claimed subject matter is not limited to any particular described embodiments, implementations, examples, etc.

For certain example embodiments, an authorization module 604 may operate to permit or enable full or at least partial access to, use of, implementation of, execution of, or a combination thereof, etc. one or more features, applications, accounts, profiles, data, capabilities, or a combination thereof, etc. of at least one device, such as a user device 102 or a server device 112. For certain example implementations, authorization may be fully or at least partially granted, denied, withheld, or a combination thereof, etc. based at least partially on an authentication determination, a result from an authentication module 602, some combination thereof, or so forth. By way of example but not limitation, an authorization module 604 may provide for different levels of authorization, including but not limited to for a given authorized user, that correspond to different degrees of authentication, that correspond to different user identities, some combination thereof, or so forth. Example aspects related to authorization are described further herein (e.g., at least herein above with particular reference to FIG. 1). However, claimed subject matter is not limited to any particular described embodiments, implementations, examples, etc.

For certain example embodiments, a behavioral fingerprint module 606 may operate to implement, perform, facilitate performance of, or a combination thereof, etc. one or more flow diagrams, methods, processes, procedures, operations, functionality, technology, mechanisms, or a combination thereof, etc. that are described herein or illustrated in the accompanying drawings or that relate to at least one behavioral fingerprint. For certain example implementations, a behavioral fingerprint module 606 may provide information, monitored acts, likelihood values, determinations, comparisons, analyses, indications or indicators, predicted acts, or a combination thereof, etc. to an authentication module 602 on which it may at least partially base an authentication determination. Example aspects related to behavioral fingerprinting are described further herein above and below. However, claimed subject matter is not limited to any particular described embodiments, implementations, examples, etc.

Figure 7A:
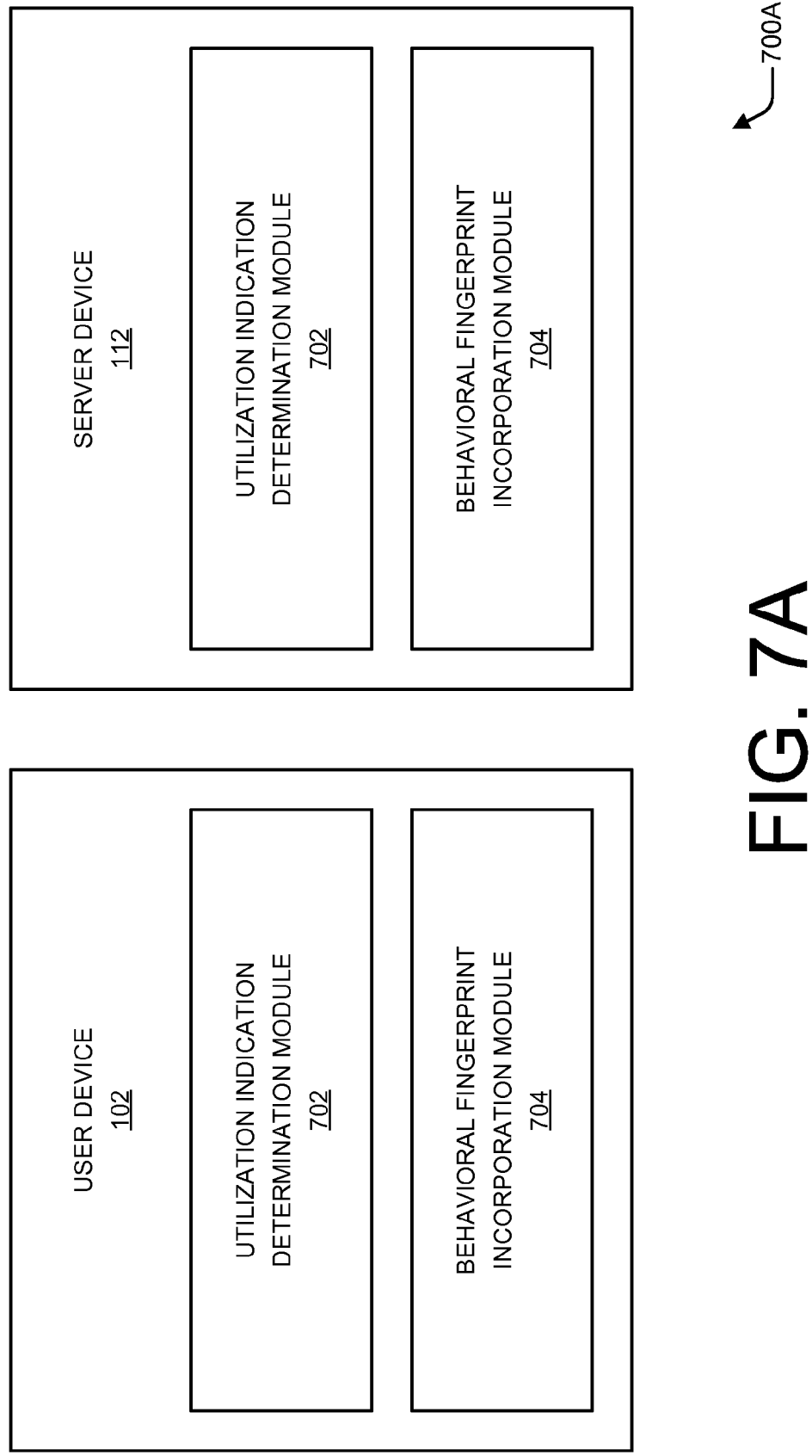
FIG. 7A is a schematic diagram that includes at least one example device that is capable of handling scenarios for behavioral fingerprinting with adaptive development in accordance with certain example embodiments.

FIG. 7A is a schematic diagram 700A that includes at least one example device that is capable of handling scenarios for behavioral fingerprinting with adaptive development in accordance with certain example embodiments. As shown in FIG. 7A, by way of example but not limitation, schematic diagram 700A includes at least one device that may include a utilization indication determination module 702 or a behavioral fingerprint incorporation module 704. More specifically, schematic diagram 700A may include a user device 102 or a server device 112. By way of example but not limitation, a utilization indication determination module 702 or a behavioral fingerprint incorporation module 704 may include or comprise or be realized with at least one processor that executes instructions (e.g., sequentially, in parallel, at least partially overlapping in a time-multiplexed fashion, at least partially across multiple cores, or a combination thereof, etc.) as at least one special-purpose computing component, or otherwise as described herein. However, claimed subject matter is not limited to any particular described embodiments, implementations, examples, etc.

For certain example embodiments, a utilization indication determination module 702 or a behavioral fingerprint incorporation module 704 may be implemented separately or at least partially jointly or in combination. A utilization indication determination module 702 may be configured to determine at least one indication of utilization for at least one authorized user via at least one user-device interaction. A behavioral fingerprint incorporation module 704 may be configured to incorporate at least one indication of utilization into at least one behavioral fingerprint that is associated with at least one authorized user, with the at least one behavioral fingerprint including one or more indicators of utilization of one or more user devices by the at least one authorized user. However, claimed subject matter is not limited to any particular described embodiments, implementations, examples, etc.

Figure 7B:
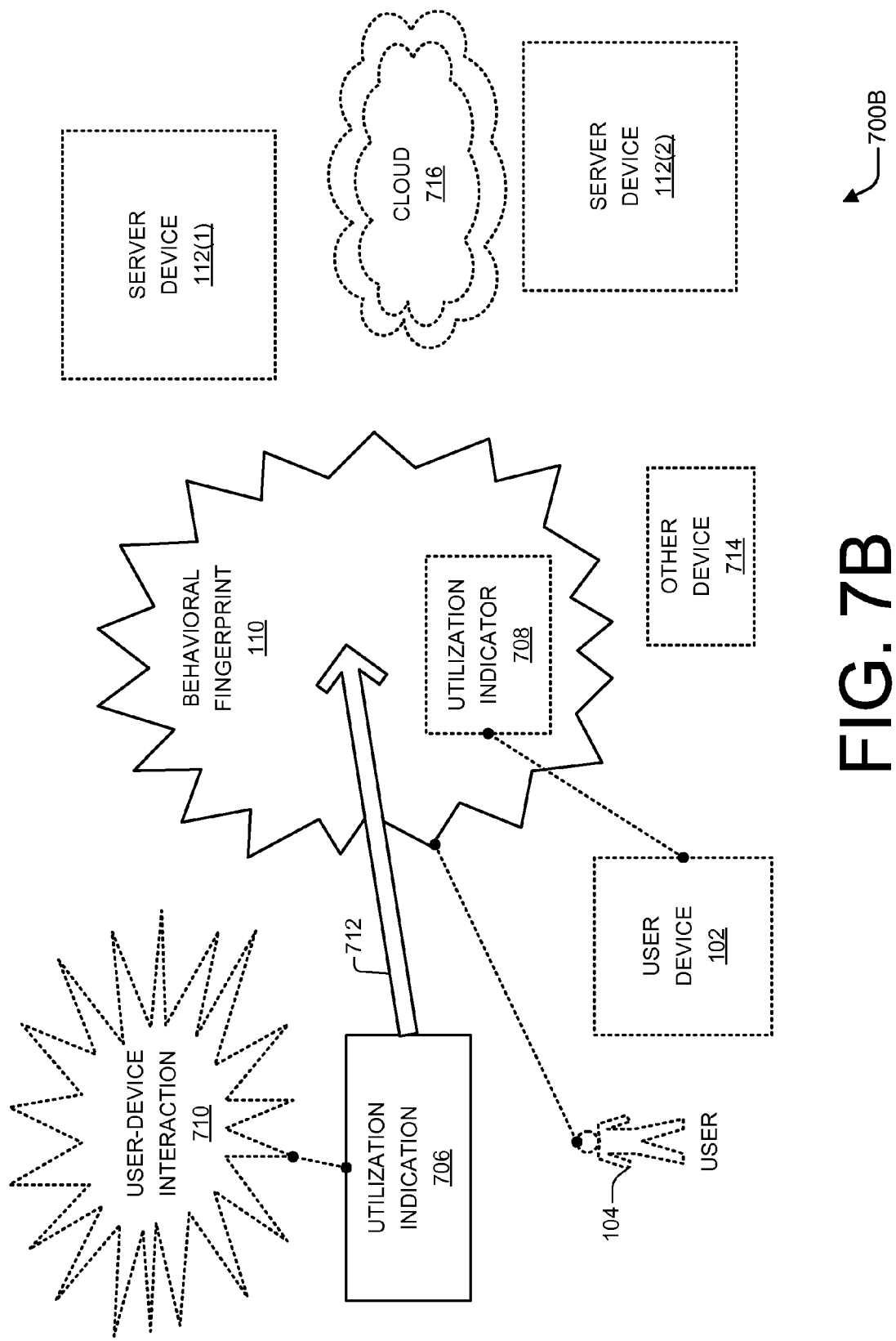
FIGS. 7B-7D are schematic diagrams that include at least one example device and that depict example scenarios for implementing behavioral fingerprinting with adaptive development in accordance with certain example embodiments.
Figure 7C:
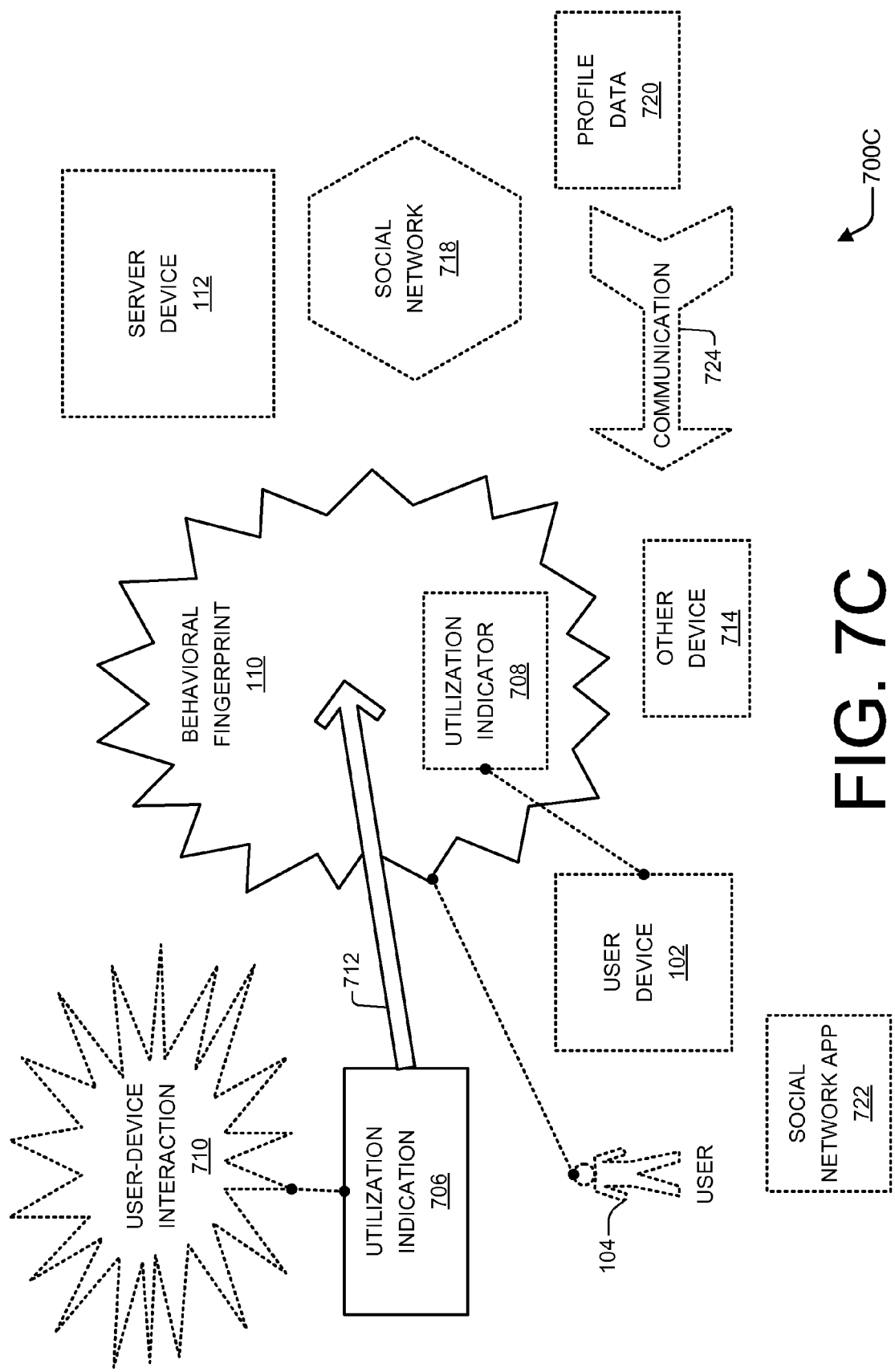
Figure 7D:
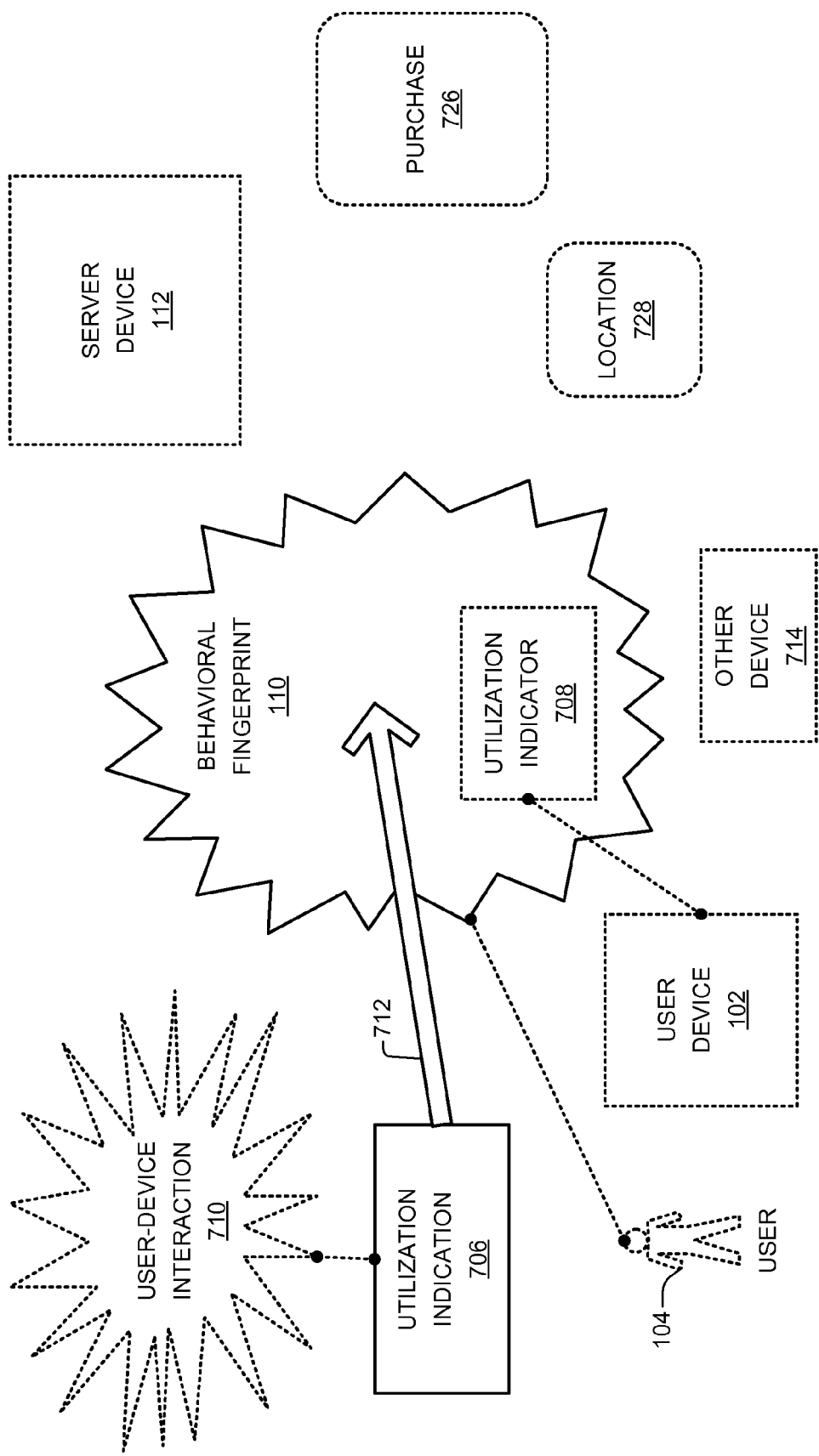

FIGS. 7B-7D are schematic diagrams 700B-700D that include at least one example device and that depict example scenarios for implementing behavioral fingerprinting with adaptive development in accordance with certain example embodiments. As shown in FIGS. 7B-7D, by way of example but not limitation, one or more of schematic diagrams 700B-700D may include at least one user device 102, at least one user 104, at least one behavioral fingerprint 110, at least one server device 112, at least one utilization indication 706, at least one utilization indicator 708, at least one user-device interaction 710, at least one incorporation 712, or at least one other device 714. Each of schematic diagrams 700B-700D may include alternative or additional depictions, which may relate to behavioral fingerprinting with adaptive development, as described herein. In addition to or in alternative to description herein below with specific reference to FIGS. 7B-7D, illustrated aspects of schematic diagrams 700B-700D may be relevant to example description with reference to FIGS. 8A-8D or 9A-9G. However, claimed subject matter is not limited to any particular described embodiments, implementations, examples, etc.

As shown in FIG. 7B, by way of example but not limitation, schematic diagram 700B may include at least one user device 102, at least one user 104, at least one behavioral fingerprint 110, at least one server device 112, at least one utilization indication 706, at least one utilization indicator 708, at least one user-device interaction 710, at least one incorporation 712, at least one other device 714, or at least one cloud 716. More specifically, schematic diagram 700B may include a user device 102 that may correspond to a user 104, which user may comprise or include an authorized user or an unauthorized user; a server 112(1) or a server 112(2); an indication of utilization 706; an indicator of utilization 708 of one or more user devices, such as a user device 102; or at least one user-device interaction 710, which may facilitate determination of at least one utilization indication 706. For certain example embodiments, at least one utilization indication 706 may include an indication of when, where, how, who, or a combination thereof, etc. a particular user has interacted with a device. With, upon, after, responsive at least partially to, based at least partly on, in conjunction with, or a combination thereof, etc. an incorporation 712 event or occurrence, an indication of utilization 706 (or utilization indication 706) may comprise, be transformed into, or include, by way of example but not limitation, at least one of any of indications 302-324 (e.g., of FIG. 3) or at least one utilization indicator 708 of a behavioral fingerprint 110. For certain example embodiments, a user-device interaction 710 may include a passive, an active, a receptive, an initiated, a monitoring, a participating, or a combination thereof, etc. type of interaction between at least one user and one or more devices (e.g., at least one user device 102, at least one server device 112, or a combination thereof, etc.). For certain example implementations, an incorporation 712 may include incorporating at least a portion of at least one utilization indication 706 into at least one behavioral fingerprint 110 (e.g., to create, modify, augment, extend, remove, update, or a combination thereof, etc. at least a portion of at least one utilization indicator 708). However, claimed subject matter is not limited to any particular described embodiments, implementations, examples, etc.

For certain example embodiments, at least one utilization indicator 708 of at least one behavioral fingerprint 110 may correspond to (e.g., be monitored, detected, observed, affected, at least partially stored, impactful, or a combination thereof, etc. at or by) a user device 102. An indicator of utilization 708 (or utilization indicator 708) of a behavioral fingerprint 110 may comprise or include, by way of example but not limitation, at least one indicator of any of indicators 302-324 (e.g., of FIG. 3). However, claimed subject matter is not limited to any particular described embodiments, implementations, examples, etc.

For certain example embodiments, a server device 112 (e.g., a server device 112(1) or a server device 112(2)) may be operated by or for a social network (e.g., a social network 718 of FIG. 7C) or third party service provider. A social network 718 may include, by way of example but not limitation, a network, a service, an internet location, a website, a computing infrastructure, an application, an interface, cloud computing, or a combination thereof, etc. that enables or facilitates interaction (e.g., via text, images, audio, video, or a combination thereof, etc.) between or among two or more members of the social network. The term "social" in social networks should not be interpreted to exclude networks designed or intended for professional or specific purposes. Examples of social networks may include, but are not limited to, Facebook, Google+, Twitter, LinkedIn, Myspace, Pinterest, Classmates[dot]com, Flickr, Foursquare, Friendster, Netlog, Orkut, Sina Weibo, Qzone, Habbo, Instagram, or so forth. For certain example embodiments, a server device 112 (e.g., a server device 112(1) or a server device 112(2)) may be operated by or for another entity, such as one that determines utilizations or incorporates utilization indications 706 into behavioral fingerprints 110. For certain example implementations, another entity that is affiliated with a server device 112 may comprise or include a provider or utilizer of a cloud service or cloud computing, as represented by cloud 716. However, claimed subject matter is not limited to any particular described embodiments, implementations, examples, etc.

For certain example embodiments, an other device 714 may be operated or owned by a user 104, may be operated or owned by a service provider, may be operated or owned by a social network, may be operated or owned by a proprietor of a commercial establishment, may be operated or owned by a third party, may be operated by one of the above and owned by another or vice versa, some combination thereof, or so forth. For certain example implementations, other device 714 may be communicatively coupled to a user device 102 or a server device 112. By way of example but not limitation, other device 714: may be integrated with user device 102, may be physically connected to user device 102, may be wirelessly coupled to user device 102, may be coupled by wire to user device 102, may be coupled to a server device 112, may be coupled to a machine such as a register of a proprietor, a combination thereof, or so forth. Other device 714 may additionally or alternatively be capable of bidirectional or unidirectional communication with a server 112(1) or a server 112(2) (e.g., via one or more channels 108 (e.g., of FIGS. 1 and 2A), which channel(s) may include at least one network, such as an internet). Other device 714 may comprise or include, by way of example but not limitation, a point-of-sale (POS) terminal, such as a register; an attachment augmenting a POS terminal; an attachment to a user device 102; a device that accepts credit, debit, or other payment cards and is coupled to a user device 102; a device that accepts or generates sensor readings and forwards them to a server 112; a device that forwards other data collected or produced at a user device 102 to a server 112; a device that accepts data from a server 112 and forwards it to a user device 102, a combination thereof; or so forth. Data (e.g., relating to behavioral fingerprinting, social networking, utilizations, or a combination thereof, etc.) may be collected at or by other device 714 or funneled through other device 714 between or among at least one user device 102 or one or more server devices 112. However, claimed subject matter is not limited to any particular described embodiments, implementations, examples, etc. Additional or alternative description that may be relevant to schematic diagram 700B is provided herein below with particular reference to one or more of any of FIGS. 8A-8D or FIGS. 9A-9G.

As shown in FIG. 7C, by way of example but not limitation, schematic diagram 700C may include at least one user device 102, at least one user 104, at least one behavioral fingerprint 110, at least one server device 112, at least one utilization indication 706, at least one utilization indicator 708, at least one user-device interaction 710, at least one incorporation 712, at least one other device 714, at least one social network 718, at least some profile data 720 (e.g., data that identifies, describes, corresponds to, relates to, characterizes, or a combination thereof, etc. a social network member or social network account), at least one social network app 722 (e.g., an application that executes at least partially on a user device to facilitate social network usage), or at least one communication 724. Additional or alternative description that may be relevant to schematic diagram 700C is provided herein below with particular reference to one or more of any of FIGS. 8A-8D or FIGS. 9A-9G.

As shown in FIG. 7D, by way of example but not limitation, schematic diagram 700D may include at least one user device 102, at least one user 104, at least one behavioral fingerprint 110, at least one server device 112, at least one utilization indication 706, at least one utilization indicator 708, at least one user-device interaction 710, at least one incorporation 712, at least one other device 714, at least one purchase 726, or at least one location 728. Additional or alternative description that may be relevant to schematic diagram 700D is provided herein below with particular reference to one or more of any of FIGS. 8A-8D or FIGS. 9A-9G.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 8A:
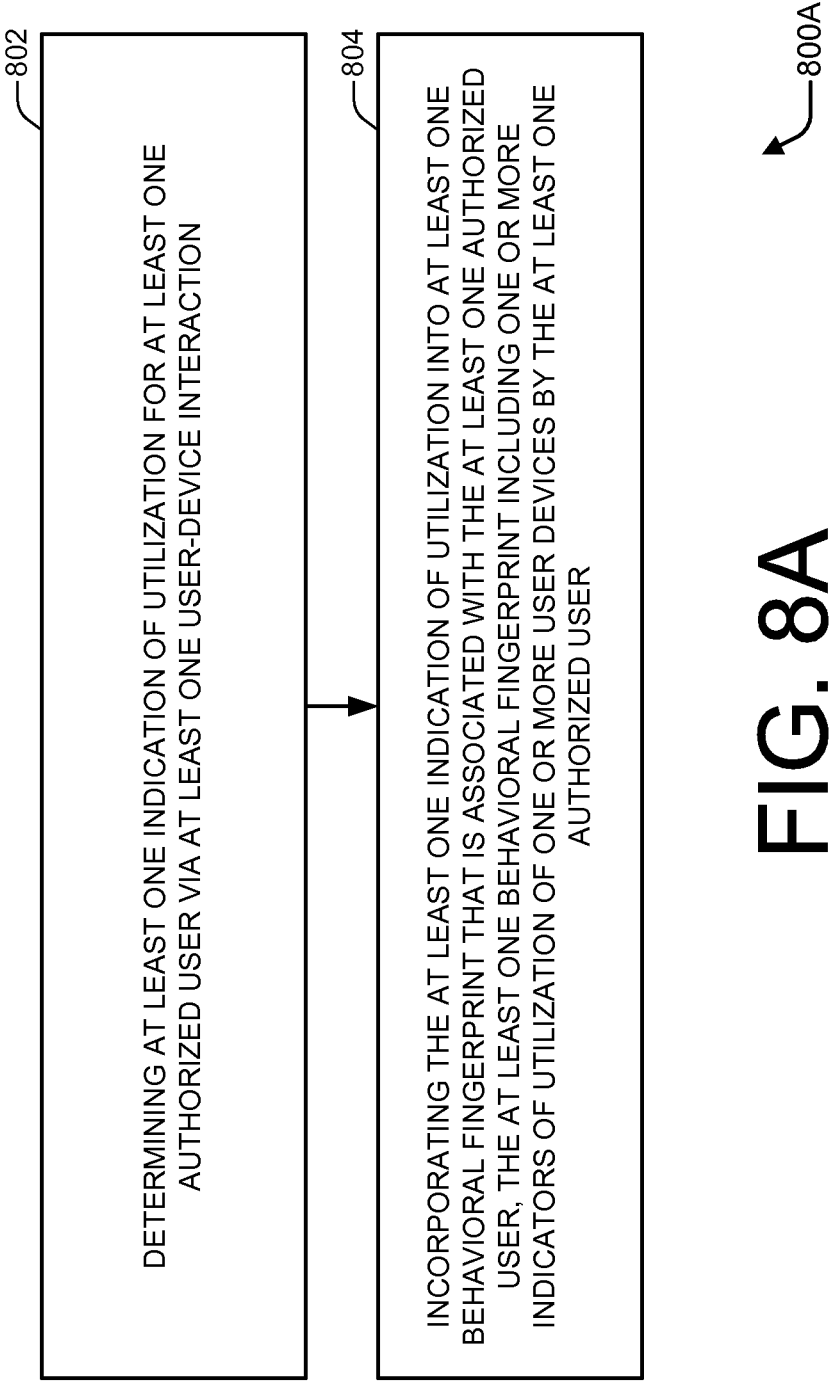
FIG. 8A is a flow diagram illustrating an example method for at least one device with regard to behavioral fingerprinting with adaptive development in accordance with certain example embodiments.

FIG. 8A is a flow diagram 800A illustrating an example method for at least one device with regard to behavioral fingerprinting with adaptive development in accordance with certain example embodiments. As illustrated, flow diagram 800A may include any of operations 802-804. Although operations 802-804 are shown or described in a particular order, it should be understood that methods may be performed in alternative manners without departing from claimed subject matter, including, but not limited to, with a different order or number of operations or with a different relationship between or among operations. Also, at least some operation(s) of flow diagram 800A may be performed so as to be fully or partially overlapping with other operation(s). For certain example embodiments, one or more operations of flow diagram 800A may be performed by at least one server device (e.g., a server device 112). Alternatively, one or more operations of flow diagram 800A may be performed by at least one user device (e.g., a user device 102).

For certain example embodiments, a method for behavioral fingerprinting with adaptive development, which method may be at least partially implemented using hardware (e.g., circuitry, at least one processor, processor-accessible memory, or a combination thereof, etc.), may include an operation 802 or an operation 804. An operation 802 may be directed at least partially to determining at least one indication of utilization for at least one authorized user via at least one user-device interaction. For certain example implementations, at least one device (e.g., a server device 112) may determine (e.g., ascertain, deduce, derive, conclude an existence of, glean, surmise, obtain evidence to produce, discover, or a combination thereof, etc.) at least one indication of utilization 706 (e.g., one or more indications representing one or more user interface actions, user movements, locations visited, social network interactions, communication modes employed, entity interactions, applications employed, transactions conducted, user statuses, other acts, predicted acts, or some combination thereof, etc.) for at least one authorized user (e.g., a user 104 that is authorized to use a given user device 102 to at least some extent, a user 104 that is associated with a behavioral fingerprint 110 corresponding to a given user device 102, or a combination thereof, etc.) via at least one user-device interaction 710 (e.g., at least one interaction (e.g., a user inputting or sending data or information respectively into or to a device, a user selecting from between or among options provided or offered by a device, a user submitting a request to a device, a user responding to an inquiry from a device, a user viewing or otherwise visiting one or more internet locations via a device, a user entering one or more search terms via a device or receiving search results from a device, a user making one or more purchases via a device, a user visiting one or more physical locations with a user device, or a combination thereof, etc.) between or among at least one user (e.g., an authorized user, an unauthorized user, a user that is authorized by designation, or a combination thereof, etc.) and one or more devices (e.g., at least one user device 102, at least one server device 112, or a combination thereof, etc.)). By way of example but not limitation, a service provider (e.g., a server of an authentication service provider that is operating at least partially via a cloud computing service or a web infrastructure, such as Apple's iCloud, ebay's PayPal, or TrendMicro's security suite) may determine (e.g., deduce based at least partly on (i) a user response to a device inquiry or (ii) a user submission of a request or an order to a device) at least one indication (e.g., a label, a categorization, a code, a tag, an assignment, a designation, one or more words, a description, or a combination thereof, etc.) of utilization (e.g., a purchase is made, an application is launched, a social network stream is accessed, or a combination thereof, etc.) for at least one authorized user (e.g., an owner or permitted operator of an Apple iPhone) via at least one user-device interaction (e.g., a user ordering a good or service, an email program being started or activated by a user, a user causing a Facebook newsfeed to be visible on a screen, a user visiting a location, or a combination thereof, etc.). However, claimed subject matter is not limited to any particular described embodiments, implementations, examples, etc.

For certain example embodiments, an operation 804 may be directed at least partially to incorporating the at least one indication of utilization into at least one behavioral fingerprint that is associated with the at least one authorized user, the at least one behavioral fingerprint including one or more indicators of utilization of one or more user devices by the at least one authorized user. For certain example implementations, at least one device (e.g., a server device 112) may incorporate 712 (e.g., add, integrate, supplement with, update using, augment with, replace with, modify using, adapt using, delete at least a portion of, change statistics using, create at least one new predicted act based at least partially on, alter at least one existing predicted act based at least partially on, increase or decrease a likelihood based at least partially on, or a combination thereof, etc.) at least one indication 706 of (e.g., a label, a categorization, a code, a tag, an assignment, a designation, one or more words, a description, an association, or a combination thereof, etc. communicating, implying, representing, or a combination thereof, etc. a) utilization into at least one behavioral fingerprint 110 that is associated with at least one authorized user, with at least one behavioral fingerprint 110 including one or more indicators 302-322 (e.g., one or more of any of indicators 302-322 of FIG. 3 as described herein above, including but not limited to predicted acts 322) of utilization 708 (e.g., accessing, using, interacting with, carrying, moving from place to place, providing input to, receiving output from, communicating with, running apps on, requesting or completing or effecting transactions via, directing operation of, or a combination thereof, etc.) of one or more user devices 102 (e.g., a smartphone, a laptop, a desktop, a tablet computer, a feature phone, a vehicle, a slate computer, a mobile phone, a netbook, a mobile entertainment device, a set-top box, or a combination thereof, etc.) by at least one authorized user 104. By way of example but not limitation, a service provider (e.g., a server of an authentication service provider operating at least partially via the Internet, such as a Google web service) may incorporate (e.g., add at least one piece of datum of, modify at least one entry based on, or a combination thereof, etc.) at least one indication of utilization (e.g., a categorization of a family-related usage of Facebook) into at least one behavioral fingerprint (e.g., a collection of observed or predicted acts or characteristics) that is associated with (e.g., that are inferred from, that are attributable to, that correspond to, that have indications resulting from observed actions of, or a combination thereof, etc.) at least one authorized user (e.g., an owner or registered account-holder of an Android-based smart phone), with the at least one behavioral fingerprint including one or more indicators of utilization (e.g., one or more stored representations of how a user operates a user interface of an Android device, an identification of one or more entities interacted with via the Android device, a listing of one or more purchases made with the Android device, or an enumeration of one or more locations visited using the Android device) of one or more user devices (e.g., an Android-based mobile device such as a Samsung Galaxy smart phone) by the at least one authorized user. However, claimed subject matter is not limited to any particular described embodiments, implementations, examples, etc.

Figure 8B:
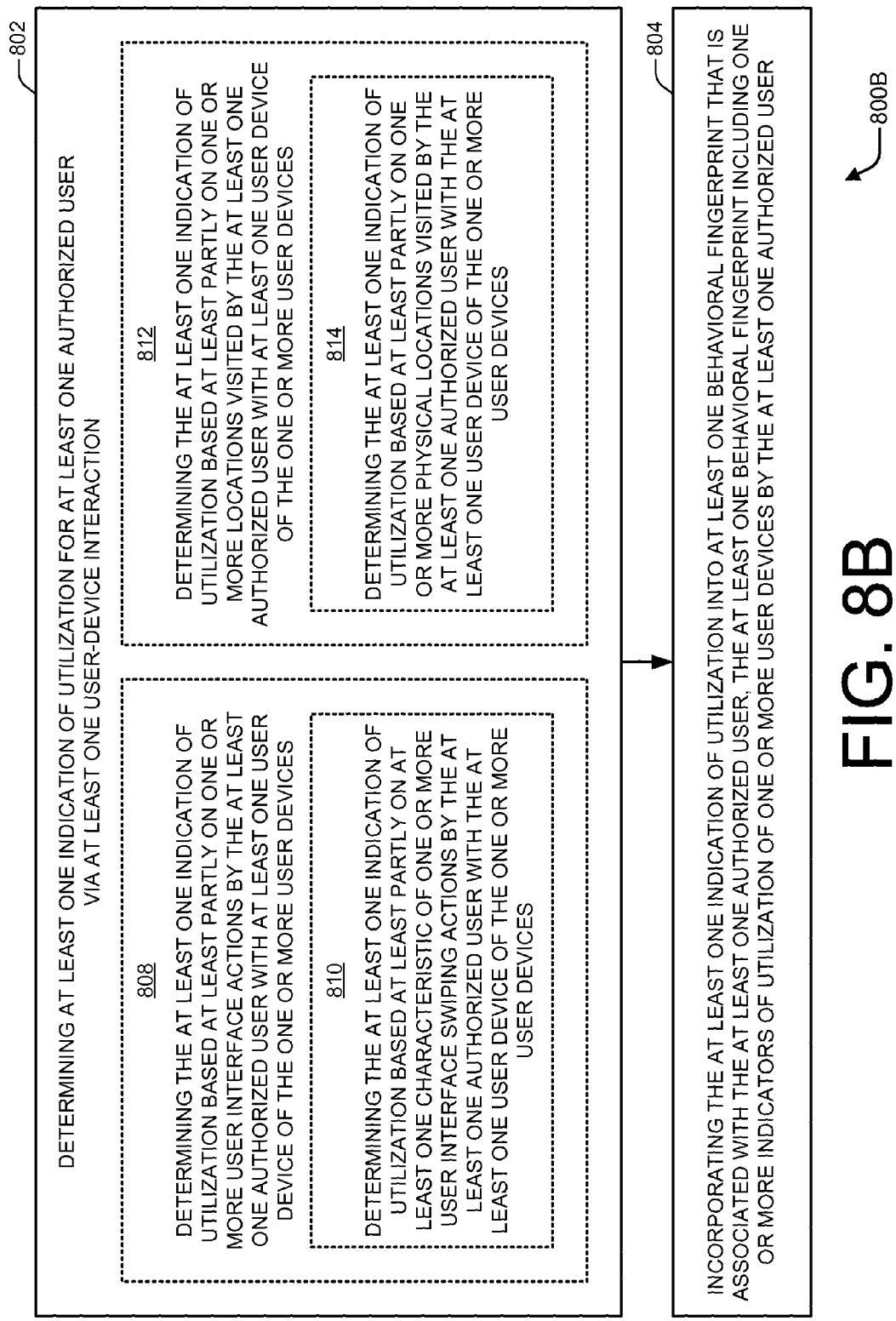
Figure 8D:
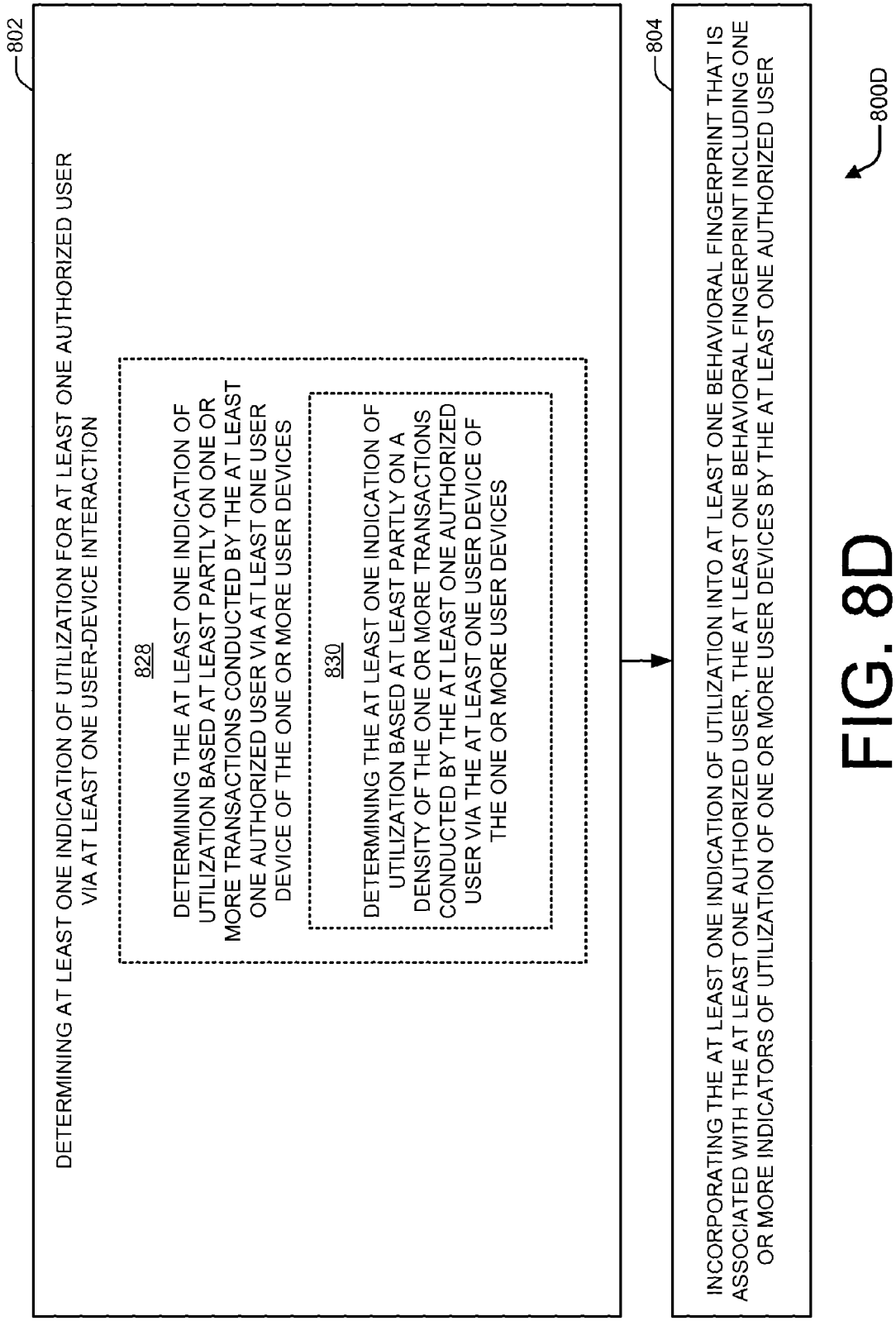

FIGS. 8B-8D depict example additions or alternatives for a flow diagram of FIG. 8A in accordance with certain example embodiments. As illustrated, flow diagrams of FIGS. 8B-8D may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed at least partially independently). Also, at least some operation(s) of flow diagrams 800B-800D of FIGS. 8B-8D may be performed so as to be fully or partially overlapping with other operation(s).

FIG. 8B illustrates a flow diagram 800B having example operations 808, 810, 812, or 814. For certain example embodiments, an operation 808 may be directed at least partially to wherein the determining at least one indication of utilization for at least one authorized user via at least one user-device interaction (of operation 802) includes determining the at least one indication of utilization based at least partly on one or more user interface actions by the at least one authorized user with at least one user device of the one or more user devices. For certain example implementations, at least one device may determine at least one indication of utilization 706 based at least partly on one or more user interface actions (e.g., as described herein above with reference to at least user interface actions 302 (e.g., of FIG. 3), including but not limited to a type of user interaction such as a keyboard or a touch screen, a speed of user interaction such as a speech rate or scrolling speed, a user input apparatus such as a built-in microphone or a virtual keyboard, a position of user interaction such as a location of touch for a touch-sensitive screen having a keyboard/button/swipe area or a location of a swipe, a user output apparatus, or a combination thereof, etc.) by at least one authorized user 104 with at least one user device of one or more user devices 102. By way of example but not limitation, a server may determine the at least one indication of utilization based at least partly on one or more user interface actions by the at least one authorized user with at least one user device of the one or more user devices (e.g., a Google server may identify a speech utilization indication when an authorized user is interacting with a Samsung Galaxy Android smartphone if the Google server receives digitized speech representing one or more spoken search terms). However, claimed subject matter is not limited to any particular described embodiments, implementations, examples, etc.

For certain example embodiments, an operation 810 may be directed at least partially to wherein the determining the at least one indication of utilization based at least partly on one or more user interface actions by the at least one authorized user with at least one user device of the one or more user devices (of operation 808) includes determining the at least one indication of utilization based at least partly on at least one characteristic of one or more user interface swiping actions by the at least one authorized user with the at least one user device of the one or more user devices. For certain example implementations, at least one device may determine at least one indication of utilization 706 based at least partly on at least one characteristic (e.g., a length, a width, a number of fingers, an inclination, a declination, a location, a start position, an offset from a displayed finger-swiping guide path, a speed of movement, or a combination thereof, etc.) of one or more user interface swiping actions (e.g., moving finger(s) across a display screen, moving finger(s) across a touch pad, moving a hand or fingers in the air, unlocking a device, moving between pages, scrolling, backing up screens or pages or apps, returning to a screen or a page or an app, switching between/among apps, or a combination thereof, etc.) by at least one authorized user with at least one user device of one or more user devices 102. By way of example but not limitation, a tablet computer may determine the at least one indication of utilization based at least partly on at least one characteristic of one or more user interface swiping actions by the at least one authorized user with the at least one user device of the one or more user devices (e.g., an iPad, which also performs operation(s) 802, 804, and 808, may ascertain that a particular user moves between pages with swipes that are three to four inches long and at an inclination of between 8 and 13 degrees from left to right). However, claimed subject matter is not limited to any particular described embodiments, implementations, examples, etc.

For certain example embodiments, an operation 812 may be directed at least partially to wherein the determining at least one indication of utilization for at least one authorized user via at least one user-device interaction (of operation 802) includes determining the at least one indication of utilization based at least partly on one or more locations visited by the at least one authorized user with at least one user device of the one or more user devices. For certain example implementations, at least one device may determine at least one indication of utilization 706 based at least partly on one or more locations 728 visited (e.g., as described herein above with reference to at least locations visited 306 (e.g., of FIG. 3), including but not limited to physical locations that a user carries, sends, places, travels with, or a combination thereof, etc. a user device; virtual locations that a user directs software to acquire data from or send data to; a geographic address; a neighborhood name; GPS coordinates; a URL; a social network; an internet address that an app communicates with; or some combination thereof; etc.) by at least one authorized user with at least one user device of one or more user devices 102. By way of example but not limitation, a server may determine the at least one indication of utilization based at least partly on one or more locations visited by the at least one authorized user with at least one user device of the one or more user devices (e.g., a Visa server may create an entry indicating that a Nokia Windows Phone has been used to visit walmart[dot]com with a browser and target[dot]com with an app). However, claimed subject matter is not limited to any particular described embodiments, implementations, examples, etc.

For certain example embodiments, an operation 814 may be directed at least partially to wherein the determining the at least one indication of utilization based at least partly on one or more locations visited by the at least one authorized user with at least one user device of the one or more user devices (of operation 812) includes determining the at least one indication of utilization based at least partly on one or more physical locations visited by the at least one authorized user with the at least one user device of the one or more user devices. For certain example implementations, at least one device may determine at least one indication of utilization 706 based at least partly on one or more physical locations (e.g., a street address, a room, a store, a building, a neighborhood, a city, a state, a country, one or more satellite positioning system (SPS) coordinates, a check-in location, a business, one or more geographical (e.g., cardinal) coordinates, a geographical zone (e.g., coordinates or approximate position in conjunction with a distance or range), or a combination thereof, etc.) visited by at least one authorized user with at least one user device of one or more user devices 102. By way of example but not limitation, a server may determine the at least one indication of utilization based at least partly on one or more physical locations visited by the at least one authorized user with the at least one user device of the one or more user devices (e.g., a Google server may log locations navigated to using a navigation app of an iPhone that is transported by an authorized user thereof). However, claimed subject matter is not limited to any particular described embodiments, implementations, examples, etc.

FIG. 8C illustrates a flow diagram 800C having example operations 818, 820, 822, or 824. For certain example embodiments, an operation 818 may be directed at least partially to wherein the determining at least one indication of utilization for at least one authorized user via at least one user-device interaction (of operation 802) includes determining the at least one indication of utilization based at least partly on one or more social network interactions by the at least one authorized user via at least one user device of the one or more user devices. For certain example implementations, at least one device may determine at least one indication of utilization 706 based at least partly on one or more social network 718 interactions (e.g., as described herein above with reference to at least social network interactions 308 (e.g., of FIG. 3), including but not limited to accessing a social network, identifying connected social network members, reading a communication from one or more social network members, sending a communication to one or more social network members, changing profile or account information for a social network, viewing publicly-available social network information, viewing private social network information, searching for entities on a social network, playing games via a social network, experiencing entertainment or media via a social network, a listing of which social network(s) are accessed, an order of which social networks are accessed, a day or time of accessing particular social network(s), or a combination thereof, etc.) by at least one authorized user via at least one user device of one or more user devices 102. By way of example but not limitation, a server may determine the at least one indication of utilization based at least partly on one or more social network interactions by the at least one authorized user via at least one user device of the one or more user devices (e.g., a Facebook server may establish an entry in a database identifying the first three walls of Facebook friends that a Facebook member views first each morning). However, claimed subject matter is not limited to any particular described embodiments, implementations, examples, etc.

For certain example embodiments, an operation 820 may be directed at least partially to wherein the determining the at least one indication of utilization based at least partly on one or more social network interactions by the at least one authorized user via at least one user device of the one or more user devices (of operation 818) includes determining the at least one indication of utilization based at least partly on one or more social network communications received or sent by the at least one authorized user via the at least one user device of the one or more user devices. For certain example implementations, at least one device may determine at least one indication of utilization 706 based at least partly on one or more social network communications, such as a communication 724 that relates to social networking, (e.g., a message, a posting, a pinning, a tweet, a public message, a private message, or a combination thereof, etc. that is sent from a social network member, received by a social network member, received or transmitted with a social network app 722, viewed or sent using a social network website, propagated via social network infrastructure, or a combination thereof, etc.) received or sent by at least one authorized user via at least one user device of one or more user devices 102. By way of example but not limitation, a user device may determine the at least one indication of utilization based at least partly on one or more social network messages received or sent by the at least one authorized user via the at least one user device of the one or more user devices (e.g., a client-side McAfee security program that contributes to maintaining at least part of a behavioral fingerprint on an Android phone may determine that a user has an upcoming trip to Europe based at least partly on Facebook postings describing itinerary plans). However, claimed subject matter is not limited to any particular described embodiments, implementations, examples, etc.

For certain example embodiments, an operation 822 may be directed at least partially to wherein the determining at least one indication of utilization for at least one authorized user via at least one user-device interaction (of operation 802) includes determining the at least one indication of utilization based at least partly on one or more applications employed by the at least one authorized user via at least one user device of the one or more user devices. For certain example implementations, at least one device may determine at least one indication of utilization 706 based at least partly on one or more applications employed (e.g., as described herein above with reference to at least apps employed 314 (e.g., of FIG. 3), including but not limited to games, communication programs, social network apps, productivity programs, or a combination thereof, etc. that are launched, used, manipulated, viewed, or a combination thereof, etc.) by at least one authorized user via at least one user device of one or more user devices 102. By way of example but not limitation, a server may determine the at least one indication of utilization based at least partly on one or more applications employed by the at least one authorized user via at least one user device of the one or more user devices (e.g., an Apple server, based at least partly on usage reports received from a user's iPad, may store a list of codes representing applications that have been launched or manipulated on the user's iPad over the preceding seven days). However, claimed subject matter is not limited to any particular described embodiments, implementations, examples, etc.

For certain example embodiments, an operation 824 may be directed at least partially to wherein the determining the at least one indication of utilization based at least partly on one or more applications employed by the at least one authorized user via at least one user device of the one or more user devices (of operation 822) includes determining the at least one indication of utilization based at least partly on an order of usage for the one or more applications employed by the at least one authorized user via the at least one user device of the one or more user devices. For certain example implementations, at least one device may determine at least one indication of utilization 706 based at least partly on an order of usage (e.g., a temporal ranking that apps are launched in each time a device is restarted; a physical layout that windows, tiles, panes, or a combination thereof, etc. of apps are placed on a display screen; an order in which apps are interacted with each time a lock screen is unlocked; an order in which apps are brought to the front of a screen for manipulation each morning; or some combination thereof; etc.) for one or more applications employed by at least one authorized user via at least one user device of one or more user devices. By way of example but not limitation, a mobile phone may determine the at least one indication of utilization based at least partly on an order of usage for the one or more applications employed by the at least one authorized user via the at least one user device of the one or more user devices (e.g., an operating system function of an Android smartphone, which smartphone also performs operations 802, 804, and 822, may record an order in which a user elects to access apps each morning after an alarm goes off, such as a calendar program first, then a social network app, and subsequently a browser). However, claimed subject matter is not limited to any particular described embodiments, implementations, examples, etc.

FIG. 8D illustrates a flow diagram 800D having example operations 828 or 830. For certain example embodiments, an operation 828 may be directed at least partially to wherein the determining at least one indication of utilization for at least one authorized user via at least one user-device interaction (of operation 802) includes determining the at least one indication of utilization based at least partly on one or more transactions conducted by the at least one authorized user via at least one user device of the one or more user devices. For certain example implementations, at least one device may determine at least one indication of utilization 706 based at least partly on one or more transactions conducted (e.g., as described herein above with reference to at least transactions conducted 316 (e.g., of FIG. 3), including but not limited to transaction identification, transaction listing, transaction days/times, item(s) that are the object of transactions, or a combination thereof, etc. directed to purchases 726, orders, exchanges of consideration, downloads, or a combination thereof, etc.) by at least one authorized user via at least one user device of one or more user devices 102. By way of example but not limitation, a server may determine the at least one indication of utilization based at least partly on one or more transactions conducted by the at least one authorized user via at least one user device of the one or more user devices (e.g., an Amazon server may catalog items purchased by a Kindle Fire for physical delivery or digital download to evidence how the Kindle Fire is being utilized). However, claimed subject matter is not limited to any particular described embodiments, implementations, examples, etc.

For certain example embodiments, an operation 830 may be directed at least partially to wherein the determining the at least one indication of utilization based at least partly on one or more transactions conducted by the at least one authorized user via at least one user device of the one or more user devices (of operation 828) includes determining the at least one indication of utilization based at least partly on a density of the one or more transactions conducted by the at least one authorized user via the at least one user device of the one or more user devices. For certain example implementations, at least one device may determine at least one indication of utilization 706 based at least partly on a density (e.g., a temporal density, a spatial density, or a combination thereof, etc.) of one or more transactions (e.g., a frequency of transactions, a number of transactions within a given period of time, a geographic proximity of multiple transactions, a geographic location of multiple transactions in a particular period of time, or a combination thereof, etc.) conducted by at least one authorized user via at least one user device of one or more user devices. By way of example but not limitation, a server may determine the at least one indication of utilization based at least partly on a density of the one or more transactions conducted by the at least one authorized user via the at least one user device of the one or more user devices (e.g., an Apple server supporting Passbook payment services for an iPhone may produce at least a portion of a file that shows that an authorized user has not made more than three Passbook transactions within an hour at any single mall). However, claimed subject matter is not limited to any particular described embodiments, implementations, examples, etc.

FIGS. 9A-9G depict example additions or alternatives for a flow diagram of FIG. 8A in accordance with certain example embodiments. As illustrated, flow diagrams of FIGS. 9A-9G may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed at least partially independently). Also, at least some operation(s) of flow diagrams 900A-900G of FIGS. 9A-9G may be performed so as to be fully or partially overlapping with other operation(s).

Figure 9A:
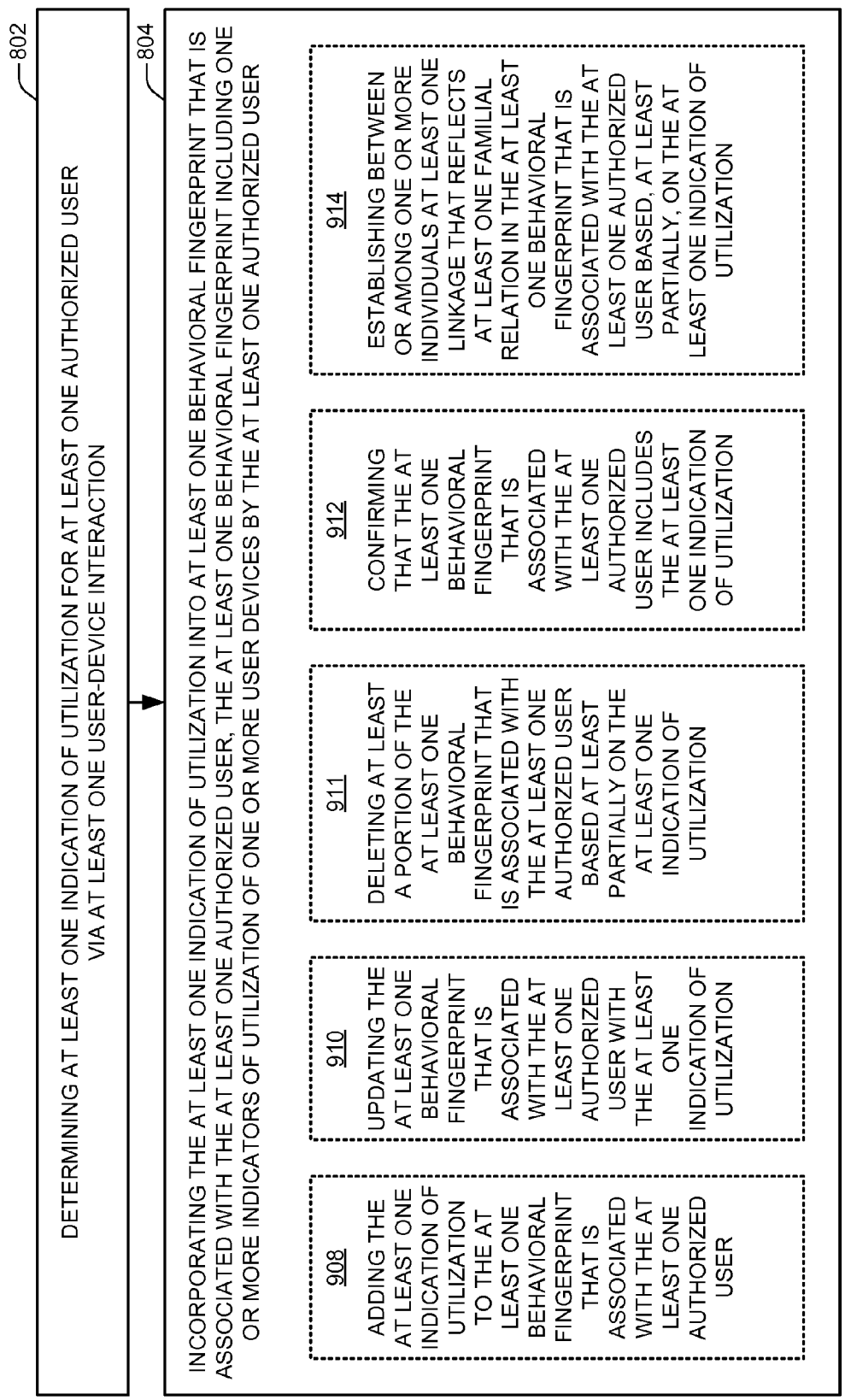

FIG. 9A illustrates a flow diagram 900A having example operations 908, 910, 911, 912, or 914. For certain example embodiments, an operation 908 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes adding the at least one indication of utilization to the at least one behavioral fingerprint that is associated with the at least one authorized user. For certain example implementations, at least one device may add (e.g., augment, insert, include, supplement, append, join together, or a combination thereof, etc.) at least one indication of utilization 706 to at least one behavioral fingerprint 110 that is associated with at least one authorized user. By way of example but not limitation, an internet or cloud-based security service may add at least one indication of utilization (e.g., an Apple iCloud server may insert an identification of songs played) to at least one behavioral fingerprint that is associated with at least one authorized user (e.g., a behavioral fingerprint portion of an Apple ID profile stored at an Apple server farm). However, claimed subject matter is not limited to any particular described embodiments, implementations, examples, etc.

For certain example embodiments, an operation 910 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes updating the at least one behavioral fingerprint that is associated with the at least one authorized user with the at least one indication of utilization. For certain example implementations, at least one device may update (e.g., replace a previous entry of, modify a previous entry of, remove at least part of a previous entry of, connect or affix to an existing indicator of, or a combination thereof, etc.) at least one behavioral fingerprint 110 that is associated with at least one authorized user with at least one indication 706 of utilization. By way of example but not limitation, an internet or cloud-based security service may update (e.g., an Apple iCloud server may change an order of social network members contacted included as part of) at least one behavioral fingerprint that is associated with at least one authorized user (e.g., a behavioral fingerprint portion of an Apple ID profile stored at a user's iPhone) with at least one indication of utilization (e.g., an indication that Sally's and Jessie's social network sites are now viewed before Mom's and Aunt Karen's sites). However, claimed subject matter is not limited to any particular described embodiments, implementations, examples, etc.

For certain example embodiments, an operation 911 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes deleting at least a portion of the at least one behavioral fingerprint that is associated with the at least one authorized user based at least partially on the at least one indication of utilization. For certain example implementations, at least one device may delete (e.g., remove, excise, write over, replace with something new, or a combination thereof, etc.) at least a portion of at least one behavioral fingerprint 110 that is associated with at least one authorized user based at least partially on at least one indication of utilization 706. By way of example but not limitation, an internet or cloud-based service may delete (e.g., a Microsoft-Azure based cloud service may remove) at least a portion of at least one behavioral fingerprint that is associated with at least one authorized user based at least partially on the at least one indication of utilization (e.g., may remove an inclusion of "21 Dresses" when an HTC Windows Phone has not been used to buy from "21 Dresses" in over year). However, claimed subject matter is not limited to any particular described embodiments, implementations, examples, etc.

For certain example embodiments, an operation 912 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes confirming that the at least one behavioral fingerprint that is associated with the at least one authorized user includes the at least one indication of utilization. For certain example implementations, at least one device may confirm (e.g., compare at least one newly-received utilization evidence to one or more existing utilization designations) that at least one behavioral fingerprint 110 that is associated with at least one authorized user includes at least one indication of utilization 706. By way of example but not limitation, a cloud-type service (e.g., a Google service such as Google Wallet) may confirm that at least one behavioral fingerprint that is associated with at least one authorized user includes at least one indication of utilization (e.g., verify that obtained evidence of app employment usage already exists or matches a current app employment usage indicator in a Google Wallet security profile). However, claimed subject matter is not limited to any particular described embodiments, implementations, examples, etc.

For certain example embodiments, an operation 914 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes establishing between or among one or more individuals at least one linkage that reflects at least one familial relation in the at least one behavioral fingerprint that is associated with the at least one authorized user based, at least partially, on the at least one indication of utilization. For certain example implementations, at least one device may establish (e.g., set-up, create, organize, provide, set-forth, or a combination thereof, etc.) between or among one or more individuals (e.g., people, persons, social network members, other entities, or a combination thereof, etc.) at least one linkage (e.g., a reference, a vector, an arrow, a family tree indicator, a pointer, or a combination thereof, etc.) that reflects (e.g., represents, indicates, defines, explains, or a combination thereof, etc.) at least one familial relation in at least one behavioral fingerprint 110 that is associated with at least one authorized user based, at least partially, on at least one indication of utilization 706. By way of example but not limitation, an operating system feature (e.g., a function of a Google Android OS of an LG smartphone, which is capable of performing operations 802 and 804) may establish between or among one or more individuals at least one linkage that reflects at least one familial relation (e.g., may create a reference between a user and another individual with the reference representing a parental relationship) in at least one behavioral fingerprint (e.g., in a security or other user-related file on the LG smartphone) that is associated with at least one authorized user based, at least partially, on at least one indication of utilization (e.g., sending of a "Happy Mother's Day" text to another phone from the LG smartphone). However, claimed subject matter is not limited to any particular described embodiments, implementations, examples, etc.

FIG. 9B illustrates a flow diagram 900B having example operations 918, 920, or 922. For certain example embodiments, an operation 918 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes incorporating the at least one indication of utilization into at least one behavioral fingerprint that is associated with the at least one authorized user, the at least one behavioral fingerprint including one or more indicators of accessing one or more user devices by the at least one authorized user. For certain example implementations, at least one device may incorporate at least one indication of utilization 706 into at least one behavioral fingerprint 110 that is associated with at least one authorized user, with at least one behavioral fingerprint 110 including one or more indicators 708 of accessing (e.g., changing settings, entering a password, executing apps, using OS features, communicating with, or a combination thereof, etc.) one or more user devices 102 by the at least one authorized user. By way of example but not limitation, an app on a user device (e.g., an app on a RIM Blackberry) (e.g., that also performs operations 802 and 804) may incorporate at least one indication of utilization into at least one behavioral fingerprint that is associated with the at least one authorized user, with the at least one behavioral fingerprint including one or more indicators of accessing one or more user devices by the at least one authorized user (e.g., indicator(s) that a particular user has executed a particular app or has regularly changed brightness settings). However, claimed subject matter is not limited to any particular described embodiments, implementations, examples, etc.

For certain example embodiments, an operation 920 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes incorporating the at least one indication of utilization into at least one behavioral fingerprint that is associated with the at least one authorized user, the at least one behavioral fingerprint including one or more indicators of interacting with one or more user devices by the at least one authorized user. For certain example implementations, at least one device may incorporate at least one indication 706 of utilization into at least one behavioral fingerprint 110 that is associated with at least one authorized user, with at least one behavioral fingerprint 110 including one or more indicators 708 of interacting with (e.g., manipulating, controlling I/O functions, working a user interface (UI), playing games, creating files, producing documents, or a combination thereof, etc.) one or more user devices 102 by the at least one authorized user. By way of example but not limitation, a shell on a smartphone (e.g., an HTC Sense UI or Touch Sense UI) (e.g., that also performs operations 802 and 804) may incorporate at least one indication of utilization (e.g., an indication that a user purchases cheap flowers and costume jewelry over the internet several times a month) into at least one behavioral fingerprint that is associated with at least one authorized user, with the at least one behavioral fingerprint including one or more indicators of interacting with one or more user devices by the at least one authorized user (e.g., one or more indicators that a user has played certain games on a user device). However, claimed subject matter is not limited to any particular described embodiments, implementations, examples, etc.

For certain example embodiments, an operation 922 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes incorporating the at least one indication of utilization into at least one behavioral fingerprint that is associated with the at least one authorized user, the at least one behavioral fingerprint including one or more indicators of movement of one or more user devices by the at least one authorized user. For certain example implementations, at least one device may incorporate at least one indication of utilization 706 into at least one behavioral fingerprint 110 that is associated with at least one authorized user, with at least one behavioral fingerprint 110 including one or more indicators 708 of movement (e.g., shaking movements, movements resulting from being carried from place to place, movements while being carried from place to place, movements while a person walks or runs, movement while a person rides on a form of transportation such as a car or train, or a combination thereof, etc.) of one or more user devices 102 by the at least one authorized user. By way of example but not limitation, an app that enables point of sale purchases (e.g., a Dunkin Donuts app) (e.g., that also performs operations 802 and 804) may incorporate at least one indication of utilization into at least one behavioral fingerprint that is associated with at least one authorized user, with the at least one behavioral fingerprint including one or more indicators of movement of one or more user devices by the at least one authorized user (e.g., a Dunkin Donuts app may include indicators of which Dunkin Donut locations a user patronizes or what form of transportation—such as on foot or on a bus—a user relies on to reach a given location). However, claimed subject matter is not limited to any particular described embodiments, implementations, examples, etc.

FIG. 9C illustrates a flow diagram 900C having example operations 924, 926, or 928. For certain example embodiments, an operation 924 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes incorporating the at least one indication of utilization into at least one behavioral fingerprint that is associated with the at least one authorized user, the at least one behavioral fingerprint including one or more indicators of providing input to one or more user devices by the at least one authorized user. For certain example implementations, at least one device may incorporate at least one indication of utilization 706 into at least one behavioral fingerprint 110 that is associated with at least one authorized user, with at least one behavioral fingerprint 110 including one or more indicators 708 of providing input (e.g., controlling a device via a UI, speaking into a microphone, touching a screen with at least one finger, swiping a screen with one or more fingers, pressing buttons, or a combination thereof etc.) to one or more user devices 102 by the at least one authorized user. By way of example but not limitation, a retailer with a web presence (e.g., Walmart) may incorporate at least one indication of utilization into at least one behavioral fingerprint that is associated with at least one authorized user, with the at least one behavioral fingerprint including one or more indicators of providing input to one or more user devices by the at least one authorized user (e.g., a Walmart server—such as after an app that is produced by Walmart and executes on a user device sends at least one transaction conducted indication to the Walmart server—may incorporate the at least one transaction conducted indication into a behavioral fingerprint that includes at least one user input characteristic, such as an indication of how a user swipes between pages of a virtual shopping cart or other visual screens on a user device). However, claimed subject matter is not limited to any particular described embodiments, implementations, examples, etc.

For certain example embodiments, an operation 926 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes incorporating the at least one indication of utilization into at least one behavioral fingerprint that is associated with the at least one authorized user, the at least one behavioral fingerprint including one or more indicators of receiving output from one or more user devices by the at least one authorized user. For certain example implementations, at least one device may incorporate at least one indication of utilization 706 into at least one behavioral fingerprint 110 that is associated with at least one authorized user, with at least one behavioral fingerprint 110 including one or more indicators 708 of receiving output from (e.g., images displayed on a device screen, sounds played from a speaker, or a combination thereof, etc.) one or more user devices 102 by the at least one authorized user. By way of example but not limitation, a cloud server (e.g., a virtual server of a payment services company that leases server resources from a computing resources wholesaler, such as Amazon's Elastic Compute Cloud (ECC)) may incorporate at least one indication of utilization (e.g., such as whether a user relies on physical or virtual volume controls) into at least one behavioral fingerprint that is associated with at least one authorized user, with the at least one behavioral fingerprint including one or more indicators of receiving output from one or more user devices by the at least one authorized user (e.g., a virtual server of a payment services company may incorporate at least one utilization indication into a behavioral fingerprint that includes at least one user output characteristic, such as volume levels used for phone calls and internet videos by a user). However, claimed subject matter is not limited to any particular described embodiments, implementations, examples, etc.

For certain example embodiments, an operation 928 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes incorporating the at least one indication of utilization into at least one behavioral fingerprint that is associated with the at least one authorized user, the at least one behavioral fingerprint including one or more indicators of communicating via one or more user devices by the at least one authorized user. For certain example implementations, at least one device may incorporate at least one indication 706 of utilization into at least one behavioral fingerprint 110 that is associated with at least one authorized user, with at least one behavioral fingerprint 110 including one or more indicators 708 of communicating (e.g., indicators of how a user communicates—such as via text messaging, phone, email, a special app such as iMessage or Facetime, or video calling; indicators of to whom a user communicates—such as people or groups; indicators of when a user communicates; or a combination thereof; etc.) via one or more user devices 102 by the at least one authorized user. By way of example but not limitation, a cloud security service that monitors a user device (e.g., a Trend Micro security suite that monitors device usage at least partially from a location remote from the user device) may incorporate at least one indication of utilization (e.g., what times and days of week a user calls his father) into at least one behavioral fingerprint that is associated with at least one authorized user, with the at least one behavioral fingerprint including one or more indicators of communicating via one or more user devices by the at least one authorized user (e.g., a Trend Micro server may incorporate what times and days of week a user calls his father into a behavioral fingerprint that already includes an indicator of what times and days of week a user calls his mother). However, claimed subject matter is not limited to any particular described embodiments, implementations, examples, etc.

Figure 9D:
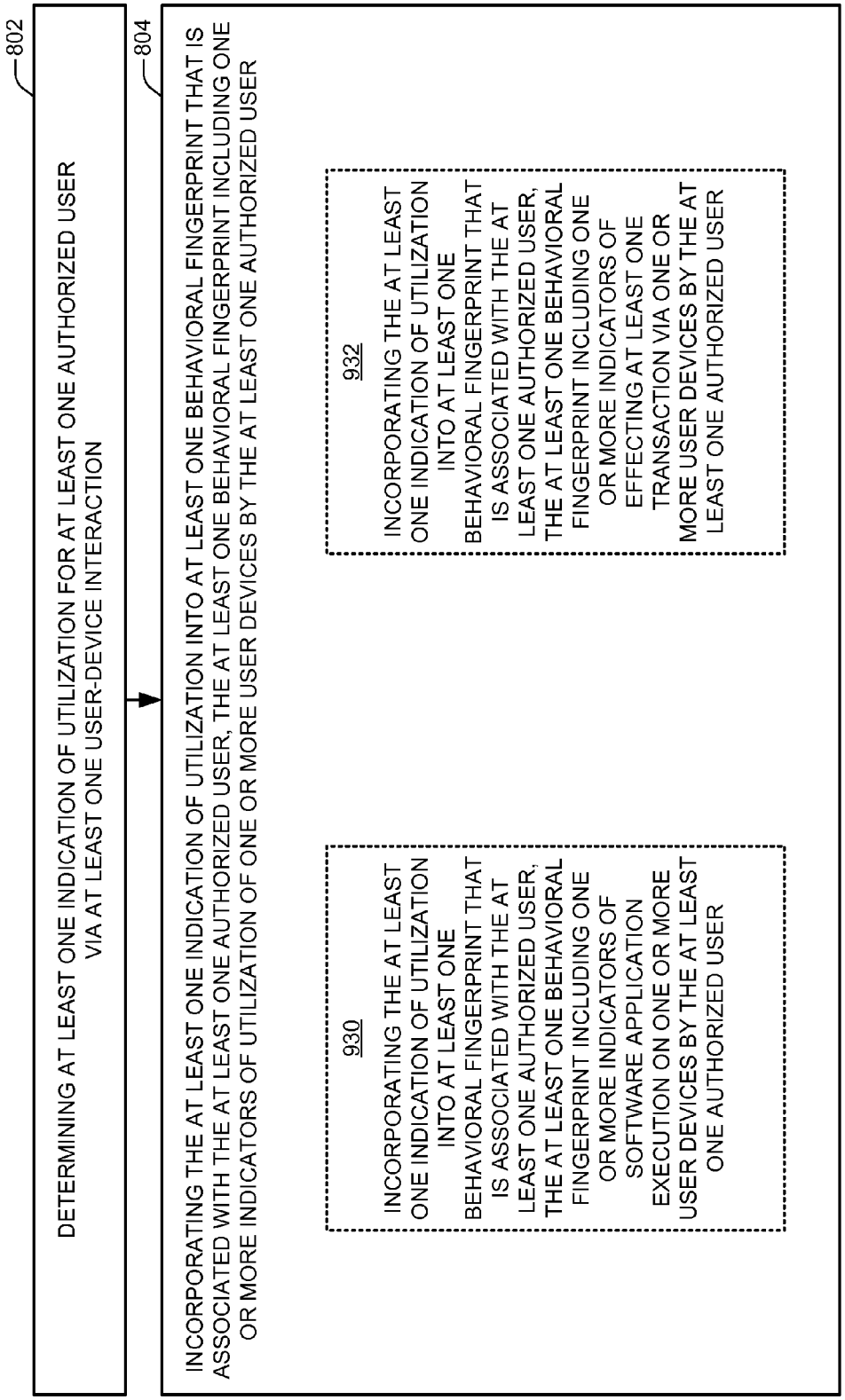

FIG. 9D illustrates a flow diagram 900D having example operations 930 or 932. For certain example embodiments, an operation 930 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes incorporating the at least one indication of utilization into at least one behavioral fingerprint that is associated with the at least one authorized user, the at least one behavioral fingerprint including one or more indicators of software application execution on one or more user devices by the at least one authorized user. For certain example implementations, at least one device may incorporate at least one indication of utilization 706 into at least one behavioral fingerprint 110 that is associated with at least one authorized user, with at least one behavioral fingerprint 110 including one or more indicators 708 of software application (e.g., app, program, code, application, or a combination thereof, etc.) execution (e.g., at least one indicator of which apps are launched or run, how long apps are interacted with, a placement of app windows on a display screen, when apps are launched during a given day, when apps are launched with respect to other contemporaneous usage of a particular user device, or a combination thereof, etc.) on one or more user devices 102 by the at least one authorized user. By way of example but not limitation, an app or feature with near-field communication (NFC) capabilities (e.g., an app or iOS feature on an Apple iPhone that has access to NFC capabilities) (e.g., that also performs operations 802 and 804) may incorporate at least one indication of utilization (e.g., an indication of historical geographical locations for using NFC for payment purposes) into at least one behavioral fingerprint that is associated with at least one authorized user, with the at least one behavioral fingerprint including one or more indicators of software application execution on one or more user devices by the at least one authorized user (e.g., an app or iOS feature of an iPhone may incorporate at least one utilization indication into a behavioral fingerprint that includes at least one app execution characteristic, such as how often a user accesses a Safari browser). However, claimed subject matter is not limited to any particular described embodiments, implementations, examples, etc.

For certain example embodiments, an operation 932 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes incorporating the at least one indication of utilization into at least one behavioral fingerprint that is associated with the at least one authorized user, the at least one behavioral fingerprint including one or more indicators of effecting at least one transaction via one or more user devices by the at least one authorized user. For certain example implementations, at least one device may incorporate at least one indication of utilization 706 into at least one behavioral fingerprint 110 that is associated with at least one authorized user, with at least one behavioral fingerprint 110 including one or more indicators 708 of effecting at least one transaction (e.g., conducting, initiating, concluding, providing authorization, providing a source of funds, or a combination thereof, etc. at least one purchase, order, procurement, exchange of consideration, or a combination thereof, etc.) via one or more user devices 102 by the at least one authorized user. By way of example but not limitation, a cloud component of a payment service (e.g., at least one server operated by or for PayPal) may incorporate at least one indication of utilization (e.g., at least one categorization of items, such as sporting goods or classic car parts, that have been bid on previously) into at least one behavioral fingerprint that is associated with at least one authorized user, with the at least one behavioral fingerprint including one or more indicators of effecting at least one transaction via one or more user devices (e.g., a server of PayPal may incorporate at least one utilization indication into a behavioral fingerprint that includes at least one transaction characteristic, such as a vendor—e.g., Home Depot—that has been used before or an item category—e.g., ski equipment—that has been purchased from before) by the at least one authorized user. However, claimed subject matter is not limited to any particular described embodiments, implementations, examples, etc.

FIG. 9E illustrates a flow diagram 900E having example operations 938 or 940. For certain example embodiments, an operation 938 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes incorporating the at least one indication of utilization into at least one behavioral fingerprint that is associated with the at least one authorized user, the at least one behavioral fingerprint including one or more indicators of at least one user habit with respect to one or more user devices by the at least one authorized user. For certain example implementations, at least one device may incorporate at least one indication of utilization 706 into at least one behavioral fingerprint 110 that is associated with at least one authorized user, with at least one behavioral fingerprint 110 including one or more indicators 708 of at least one user habit (e.g., at least one act that is repeated at certain times of the day, on certain days of the week, in a certain manner, at a certain location, or a combination thereof, etc.) with respect to one or more user devices 102 by the at least one authorized user. By way of example but not limitation, a retail app (e.g., an app by McDonald's) (e.g., that may also perform operation 802 or operation 804 in conjunction with other abilities of a user device) may incorporate at least one indication of utilization (e.g., which affiliated user device(s) are usually proximate when making a purchase with a particular user device) into at least one behavioral fingerprint that is associated with at least one authorized user, with the at least one behavioral fingerprint including one or more indicators of at least one user habit (e.g., an app executing on a user device may incorporate at least one utilization indication into a behavioral fingerprint—which behavioral fingerprint may be located on a user device or at a remote server device—that includes at least one indicator of (i) an act—e.g., a purchase of a Big Mac with cheese and a small fry and soft drink—that occurs every Tuesday and Thursday or (ii) an act—e.g., texting a spouse—that occurs every weekday between 10 and 10:30 am) with respect to one or more user devices (e.g., a Nokia Lumia phone is executing an app that enables purchases at McDonald's using the phone) by the at least one authorized user. However, claimed subject matter is not limited to any particular described embodiments, implementations, examples, etc.

For certain example embodiments, an operation 940 may be directed at least partially to wherein the incorporating the at least one indication of utilization into at least one behavioral fingerprint that is associated with the at least one authorized user, the at least one behavioral fingerprint including one or more indicators of at least one user habit with respect to one or more user devices by the at least one authorized user, (of operation 938) includes incorporating the at least one indication of utilization into at least one behavioral fingerprint that is associated with the at least one authorized user, the at least one behavioral fingerprint including one or more indicators of at least one user act that is repeated with respect to one or more user devices by the at least one authorized user. For certain example implementations, at least one device may incorporate at least one indication 706 of utilization into at least one behavioral fingerprint 110 that is associated with at least one authorized user, with at least one behavioral fingerprint 110 including one or more indicators 708 of at least one user act (e.g., viewing a series of three websites every Saturday and Sunday starting between 9:00 and 9:30 am) that is repeated with respect to one or more user devices 102 by the at least one authorized user. By way of example but not limitation, an OS of a mobile device (e.g., an Apple iOS) (e.g., that also performs operations 802, 804, and 938) may incorporate at least one indication of utilization (e.g., social network member(s) that are sent one or more private messages at least once each day 80% of the days) into at least one behavioral fingerprint that is associated with at least one authorized user, with the at least one behavioral fingerprint including one or more indicators of at least one user act that is repeated (e.g., an iPhone or iPad may incorporate at least one utilization indication into a behavioral fingerprint that includes at least one repeated user act, such as using an iOS device to navigate to a lunch location each weekday starting at 11:00 am) with respect to one or more user devices by the at least one authorized user. However, claimed subject matter is not limited to any particular described embodiments, implementations, examples, etc.

Figure 9F:
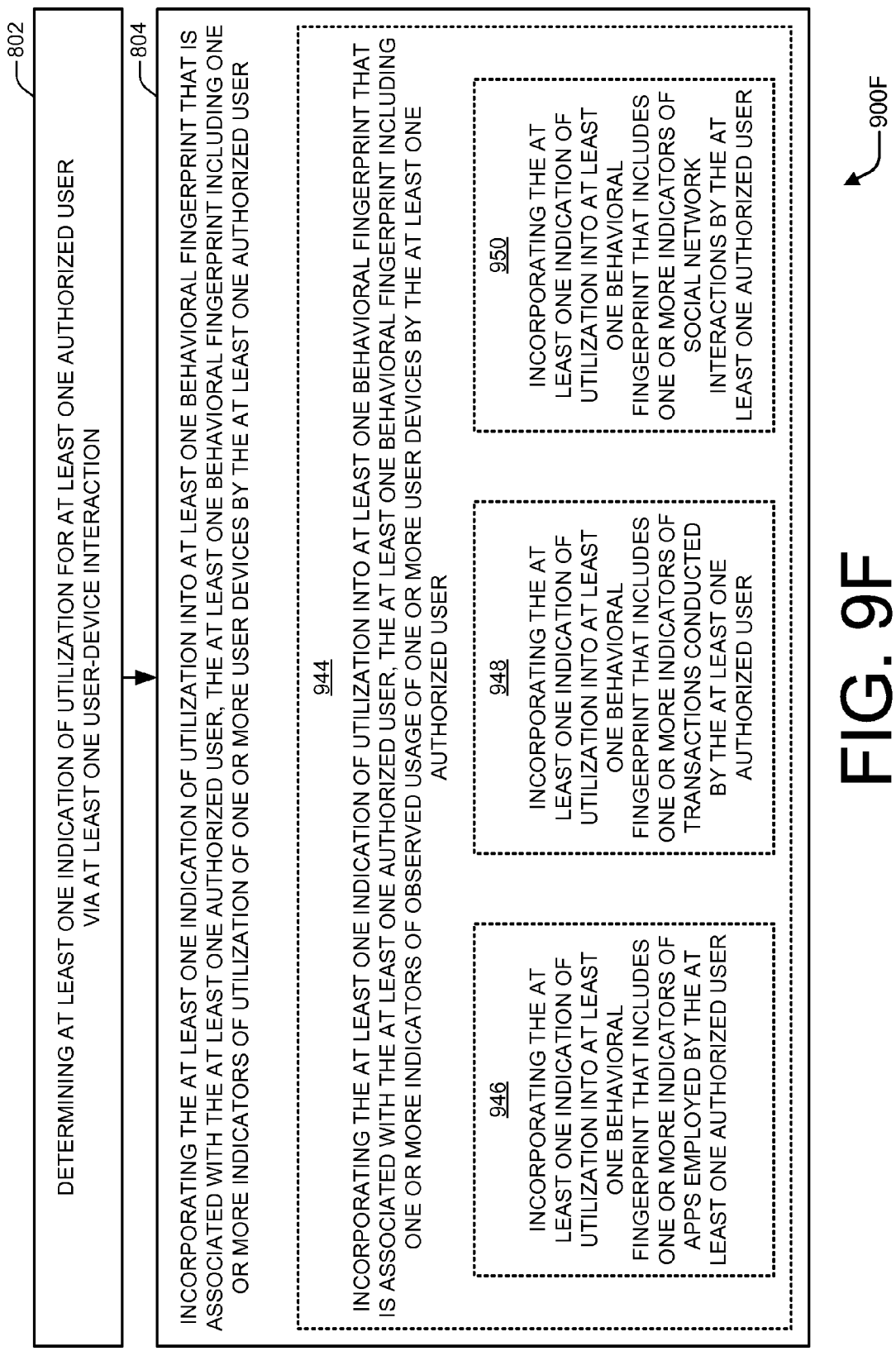

FIG. 9F illustrates a flow diagram 900F having example operations 944, 946, 948, or 950. For certain example embodiments, an operation 944 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes incorporating the at least one indication of utilization into at least one behavioral fingerprint that is associated with the at least one authorized user, the at least one behavioral fingerprint including one or more indicators of observed usage of one or more user devices by the at least one authorized user. For certain example implementations, at least one device may incorporate at least one indication of utilization 706 into at least one behavioral fingerprint 110 that is associated with at least one authorized user, with at least one behavioral fingerprint 110 including one or more indicators 708 of observed usage (e.g., user interaction with, communication modes employed, apps employed, transactions conducted, social network interactions carried out, or a combination thereof, etc.) of one or more user devices 102 by the at least one authorized user. By way of example but not limitation, a security app on a user device (e.g., a Symantec mobile security app) (e.g., that also performs operations 802 and 804) may incorporate at least one indication of utilization (e.g., that phone calls are used for two particular contacts and text messaging is used for three other particular contacts) into at least one behavioral fingerprint that is associated with at least one authorized user, with the at least one behavioral fingerprint including one or more indicators of observed usage of one or more user devices by the at least one authorized user (e.g., a mobile device executing a Symantec mobile security app may incorporate at least one utilization indication, such as communication modes employed per particular contact, into a behavioral fingerprint that includes at least one user act, such as a list of social network members contacted via at least one social network with the mobile device). However, claimed subject matter is not limited to any particular described embodiments, implementations, examples, etc.

For certain example embodiments, an operation 946 may be directed at least partially to wherein the incorporating the at least one indication of utilization into at least one behavioral fingerprint that is associated with the at least one authorized user, the at least one behavioral fingerprint including one or more indicators of observed usage of one or more user devices by the at least one authorized user, (of operation 944) includes incorporating the at least one indication of utilization into at least one behavioral fingerprint that includes one or more indicators of apps employed by the at least one authorized user. For certain example implementations, at least one device may incorporate at least one indication of utilization 706 into at least one behavioral fingerprint 110 that includes one or more indicators 708 of apps employed (e.g., an identification of an app, a chronological listing of apps used each day, a duration of interaction for each app, a number of uses per day for certain apps, a quality of play for a given app such as a game, features utilized for a particular app, a list of people contacted with a particular app, how an app is used such as what movie types are watched, or a combination thereof, etc.) by at least one authorized user. By way of example but not limitation, a desktop user device (e.g., an Apple iMac or a Lenovo personal computer (PC)) (e.g., that also performs operations 802, 804, and 944) may incorporate at least one indication of utilization (e.g., when particular apps are open) into at least one behavioral fingerprint that includes one or more indicators of apps employed by at least one authorized user (e.g., an OS feature of an iMac, such as a feature of OS X, or of a Lenovo PC, such as a feature of Microsoft Windows 8, may incorporate at least one utilization indication into a behavioral fingerprint that indicates that Microsoft Office is open or running each day from about 8:00 am to 3:00 pm). However, claimed subject matter is not limited to any particular described embodiments, implementations, examples, etc.

For certain example embodiments, an operation 948 may be directed at least partially to wherein the incorporating the at least one indication of utilization into at least one behavioral fingerprint that is associated with the at least one authorized user, the at least one behavioral fingerprint including one or more indicators of observed usage of one or more user devices by the at least one authorized user, (of operation 944) includes incorporating the at least one indication of utilization into at least one behavioral fingerprint that includes one or more indicators of transactions conducted by the at least one authorized user. For certain example implementations, at least one device may incorporate at least one indication of utilization 706 into at least one behavioral fingerprint 110 that includes one or more indicators 708 of transactions conducted (e.g., a purchase, an order, a procurement, an exchange of consideration, or a combination thereof, etc. that is initiated, concluded, authorized, financed, consummated, or a combination thereof, etc.) by at least one authorized user. By way of example but not limitation, a payment authorization cloud service (e.g., an Amazon cloud service for authorizing payments for purchases made through Amazon or traditional brick-and-mortar retailers via a user device) may incorporate at least one indication of utilization (e.g., how often a user backspaces or relies on autocorrect when typing with a virtual keyboard on a display screen) into at least one behavioral fingerprint that includes one or more indicators of transactions conducted by the at least one authorized user (e.g., an Android user device that is in communication with an Amazon server may incorporate at least one utilization indication into a behavioral fingerprint that includes a list of previous transactions made through Amazon or made with the Android user device). However, claimed subject matter is not limited to any particular described embodiments, implementations, examples, etc.

For certain example embodiments, an operation 950 may be directed at least partially to wherein the incorporating the at least one indication of utilization into at least one behavioral fingerprint that is associated with the at least one authorized user, the at least one behavioral fingerprint including one or more indicators of observed usage of one or more user devices by the at least one authorized user, (of operation 944) includes incorporating the at least one indication of utilization into at least one behavioral fingerprint that includes one or more indicators of social network interactions by the at least one authorized user. For certain example implementations, at least one device may incorporate at least one indication of utilization 706 into at least one behavioral fingerprint 110 that includes one or more indicators 708 of social network interactions (e.g., social networks logged into or otherwise accessed, social network members contacted, types of social network communication modes employed, times of social network use, social network apps used, games played via a social network, or a combination thereof, etc.) by at least one authorized user. By way of example but not limitation, a payment authorization service (e.g., a bank debit card service) that is realized at least partially in a cloud environment may incorporate at least one indication of utilization (e.g., an average time between receiving a Facebook message and respond to the message) into at least one behavioral fingerprint that includes one or more indicators of social network interactions by at least one authorized user (e.g., a Bank of America service that monitors social network interactions of an authorized user may incorporate an average Facebook message response time into a behavioral fingerprint that indicates that the authorized user frequently posts to a particular neighbor's Facebook wall each day between lunch and dinner). However, claimed subject matter is not limited to any particular described embodiments, implementations, examples, etc.

Figure 9G:
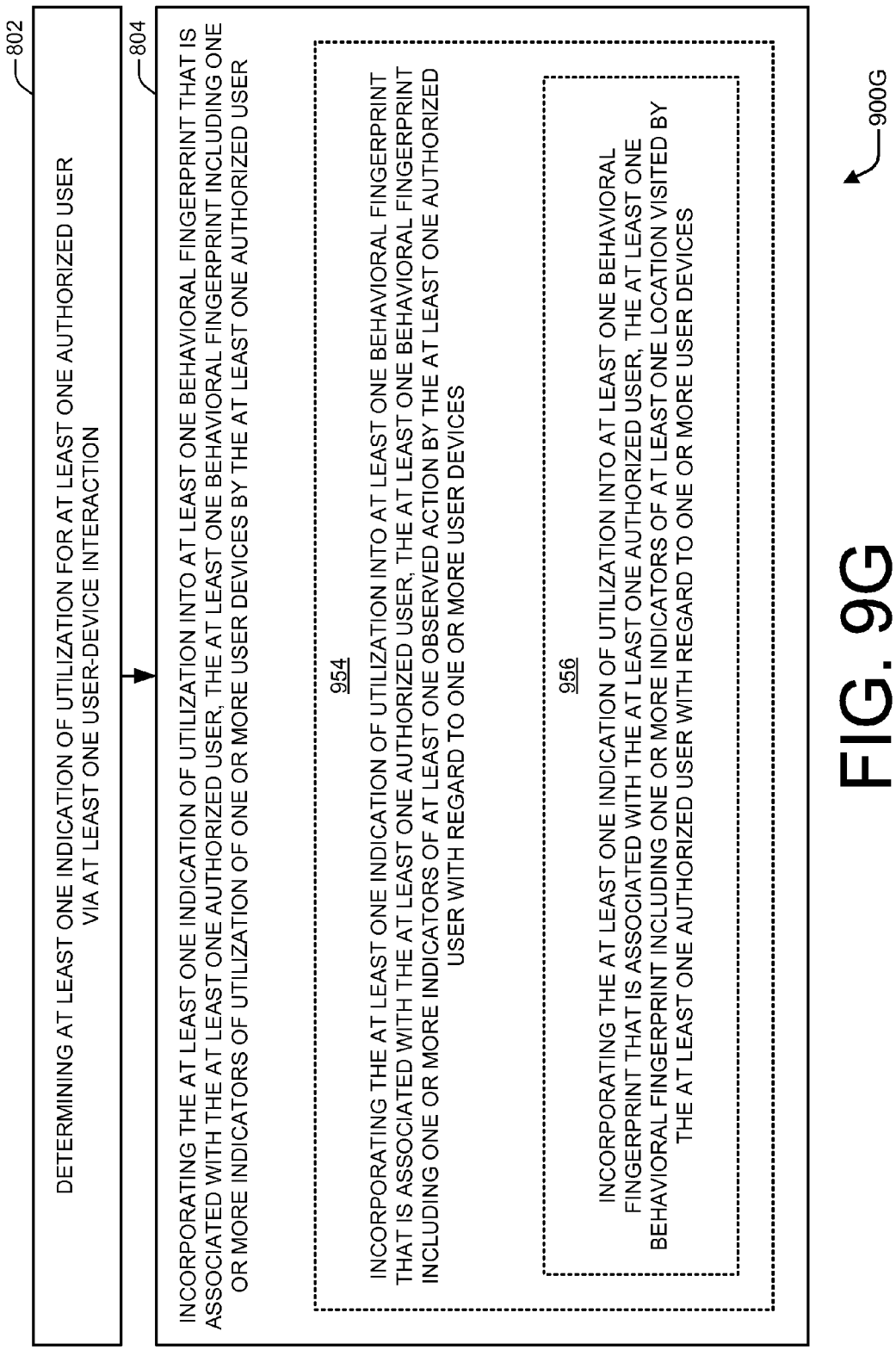

FIG. 9G illustrates a flow diagram 900G having example operations 954 or 956. For certain example embodiments, an operation 954 may be directed at least partially to wherein the incorporating the at least one indication of utilization into at least one behavioral fingerprint that is associated with the at least one authorized user, the at least one behavioral fingerprint including one or more indicators of utilization of one or more user devices by the at least one authorized user, (of operation 804) includes incorporating the at least one indication of utilization into at least one behavioral fingerprint that is associated with the at least one authorized user, the at least one behavioral fingerprint including one or more indicators of at least one observed action by the at least one authorized user with regard to one or more user devices. For certain example implementations, at least one device may incorporate at least one indication of utilization 706 into at least one behavioral fingerprint 110 that is associated with at least one authorized user, with at least one behavioral fingerprint 110 including one or more indicators 708 of at least one observed action by the at least one authorized user (e.g., a UI action, a user movement, a location visited by a user, a user status alert, an interaction with an online entity or internet location (e.g., playing an online game, engaging in an online betting activity, contacting a social-networking entity, streaming a movie, or a combination thereof, etc.), or a combination thereof, etc.) with regard to one or more user devices 102. By way of example but not limitation, an app for a user device (e.g., that also performs operations 802 and 804) that enables at least semi-automatic unlocking of real-world objects (e.g., a car or house door based at least partially on proximity of the user device) may incorporate at least one indication of utilization (e.g., an indication of which installed apps are rarely if ever used because an authorized user prefers to access a company's services over the web via a browser) into at least one behavioral fingerprint that is associated with at least one authorized user, with the at least one behavioral fingerprint including one or more indicators of at least one observed action by the at least one authorized user with regard to one or more user devices (e.g., one or more of the user devices may be executing a locking/unlocking app that may incorporate at least one utilization indication into a behavioral fingerprint that includes at least one indicator of how a user navigates between apps or at least one indicator of how long a user keeps a user device in motion before a particular door is to be unlocked). However, claimed subject matter is not limited to any particular described embodiments, implementations, examples, etc.

For certain example embodiments, an operation 956 may be directed at least partially to wherein the incorporating the at least one indication of utilization into at least one behavioral fingerprint that is associated with the at least one authorized user, the at least one behavioral fingerprint including one or more indicators of at least one observed action by the at least one authorized user with regard to one or more user devices, (of operation 954) includes incorporating the at least one indication of utilization into at least one behavioral fingerprint that is associated with the at least one authorized user, the at least one behavioral fingerprint including one or more indicators of at least one location visited by the at least one authorized user with regard to one or more user devices. For certain example implementations, at least one device may incorporate at least one indication of utilization 706 into at least one behavioral fingerprint 110 that is associated with at least one authorized user, with at least one behavioral fingerprint 110 including one or more indicators 708 of at least one location visited (e.g., a virtual location—such as a website or virtual world or location thereof; a physical location—such as an address, coordinates, or an identifiable place like a neighborhood or friend's home; or a combination thereof; etc.) by the at least one authorized user with regard to one or more user devices. By way of example but not limitation, a server affiliated with an OEM for a smartphone (e.g., a Nokia server) may incorporate at least one indication of utilization (e.g., an entity that is interacted with) into at least one behavioral fingerprint that is associated with at least one authorized user, with the at least one behavioral fingerprint including one or more indicators of at least one location visited by the at least one authorized user with regard to one or more user devices (e.g., an OEM having a server that offers security features to owners of their manufactured smartphones, which server may expose an authentication API to the smartphones, may incorporate at least one utilization indication into a behavioral fingerprint that includes a list of a person's daily destinations to which a smartphone is typically or is scheduled to be carried). However, claimed subject matter is not limited to any particular described embodiments, implementations, examples, etc.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation)

may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Modules, logic, circuitry, hardware and software combinations, firmware, or so forth may be realized or implemented as one or more general-purpose processors, one or more processing cores, one or more special-purpose processors, one or more microprocessors, at least one Application-Specific Integrated Circuit (ASIC), at least one Field Programmable Gate Array (FPGA), at least one digital signal processor (DSP), some combination thereof, or so forth that is executing or is configured to execute instructions, a special-purpose program, an application, software, code, some combination thereof, or so forth as at least one special-purpose computing apparatus or specific computing component. One or more modules, logic, or circuitry, etc. may, by way of example but not limitation, be implemented using one processor or multiple processors that are configured to execute instructions (e.g., sequentially, in parallel, at least partially overlapping in a time-multiplexed fashion, at least partially overlapping across multiple cores, or a combination thereof, etc.) to perform a method or realize a particular computing machine. For example, a first module may be embodied by a given processor executing a first set of instructions at or during a first time, and a second module may be embodied by the same given processor executing a second set of instructions at or during a second time. Moreover, the first and second times may be at least partially interleaved or overlapping, such as in a multi-threading, pipelined, or predictive processing environment. As an alternative example, a first module may be embodied by a first processor executing a first set of instructions, and a second module may be embodied by a second processor executing a second set of instructions. As another alternative example, a particular module may be embodied partially by a first processor executing at least a portion of a particular set of instructions and embodied partially by a second processor executing at least a portion of the particular set of instructions. Other combinations of instructions, a program, an application, software, or code, etc. in conjunction with at least one processor or other execution machinery may be utilized to realize one or more modules, logic, or circuitry, etc. to implement any of the processing algorithms described herein.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

This application may make reference to one or more trademarks, e.g., a word, letter, symbol, or device adopted by one manufacturer or merchant and used to identify and distinguish his or her product from those of others. Trademark names used herein are set forth in such language that makes clear their identity, that distinguishes them from common descriptive nouns, that have fixed and definite meanings, and, in many if not all cases, are accompanied by other specific identification using terms not covered by trademark. In addition, trademark names used herein have meanings that are well-known and defined in the literature, and do not refer to products or compounds protected by trade secrets in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or [trade], even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system, comprising:
   circuitry configured for determining at least one indication of utilization for at least one authorized user via at least one user-device interaction;
   circuitry configured for incorporating the at least one indication of utilization into at least one behavioral fingerprint associated with the at least one authorized user, the at least one behavioral fingerprint including at least one or more indicators of utilization of one or more user devices by the at least one authorized user;
   circuitry configured for determining via at least one user device that at least one user has made a request for performance of at least one task;
   circuitry configured for determining at least one degree of authentication associated with identity of the at least one user via the at least one user device at least partially based on the at least one behavioral fingerprint;
   circuitry configured for determining at least one level of authorization corresponding to the determined at least one degree of authentication associated with identity of the at least one user; and circuitry configured for performing the at least one task as a function of the determined at least one level of authorization corresponding to the determined at least one degree of authentication associated with identity of the at least one user.

2. The system of claim 1, wherein circuitry configured for determining at least one indication of utilization for at least one authorized user via at least one user-device interaction comprises:
    circuitry configured for determining the at least one indication of utilization based at least partly on one or more user interface actions by the at least one authorized user with at least one user device of the one or more user devices.

3. The system of claim 2, wherein circuitry configured for determining the at least one indication of utilization based at least partly on one or more user interface actions by the at least one authorized user with at least one user device of the one or more user devices comprises:
    circuitry configured for determining the at least one indication of utilization based at least partly on at least one characteristic of one or more user interface swiping actions by the at least one authorized user with the at least one user device of the one or more user devices.

4. The system of claim 1, wherein circuitry configured for determining at least one indication of utilization for at least one authorized user via at least one user-device interaction comprises:
    circuitry configured for determining the at least one indication of utilization based at least partly on one or more locations visited by the at least one authorized user with at least one user device of the one or more user devices.

5. The system of claim 4, wherein circuitry configured for determining the at least one indication of utilization based at least partly on one or more locations visited by the at least one authorized user with at least one user device of the one or more user devices comprises:
    circuitry configured for determining the at least one indication of utilization based at least partly on one or more physical locations visited by the at least one authorized user with the at least one user device of the one or more user devices.

6. The system of claim 1, wherein circuitry configured for determining at least one indication of utilization for at least one authorized user via at least one user-device interaction comprises:
    circuitry configured for determining the at least one indication of utilization based at least partly on one or more social network interactions by the at least one authorized user via at least one user device of the one or more user devices.

7. The system of claim 6, wherein circuitry configured for determining the at least one indication of utilization based at least partly on one or more social network interactions by the at least one authorized user via at least one user device of the one or more user devices comprises:
    circuitry configured for determining the at least one indication of utilization based at least partly on one or more social network communications received or sent by the at least one authorized user via the at least one user device of the one or more user devices.

8. The system of claim 1, wherein circuitry configured for the determining at least one indication of utilization for at least one authorized user via at least one user-device interaction comprises:
    circuitry configured for determining the at least one indication of utilization based at least partly on one or more applications employed by the at least one authorized user via at least one user device of the one or more user devices.

9. The system of claim 8, wherein circuitry configured for the determining the at least one indication of utilization based at least partly on one or more applications employed by the at least one authorized user via at least one user device of the one or more user devices comprises:
    circuitry configured for determining the at least one indication of utilization based at least partly on an order of usage for the one or more applications employed by the at least one authorized user via the at least one user device of the one or more user devices.

10. The system of claim 1, wherein circuitry configured for determining at least one indication of utilization for at least one authorized user via at least one user-device interaction comprises:
    circuitry configured for determining the at least one indication of utilization based at least partly on one or more transactions conducted by the at least one authorized user via at least one user device of the one or more user devices.

11. The system of claim 10, wherein circuitry configured for determining the at least one indication of utilization based at least partly on one or more transactions conducted by the at least one authorized user via at least one user device of the one or more user devices comprises:
    circuitry configured for determining the at least one indication of utilization based at least partly on a density of the one or more transactions conducted by the at least one authorized user via the at least one user device of the one or more user devices, including at least determining the at least one indication of utilization based at least partly on determining an indication of geographic proximity of the one or more transactions conducted in a particular period of time by the at least one authorized user via the at least one user device of the one or more user devices.

12. The system of claim 1, wherein circuitry configured for incorporating the at least one indication of utilization into at least one behavioral fingerprint associated with the at least one authorized user, the at least one behavioral fingerprint including at least one or more indicators of utilization of one or more user devices by the at least one authorized user, comprises:
    circuitry configured for adding the at least one indication of utilization to the at least one behavioral fingerprint associated with the at least one authorized user, including at least adding at least one identification of one or more songs played via the one or more user devices to the at least one behavioral fingerprint associated with the at least one authorized user.

13. The system of claim 1, wherein circuitry configured for incorporating the at least one indication of utilization into at least one behavioral fingerprint associated with the at least one authorized user, the at least one behavioral fingerprint including at least one or more indicators of utilization of one or more user devices by the at least one authorized user, comprises:
    circuitry configured for updating the at least one behavioral fingerprint associated with the at least one authorized user with the at least one indication of utilization.

14. The system of claim 1, wherein circuitry configured for incorporating the at least one indication of utilization into at least one behavioral fingerprint associated with the at least one authorized user, the at least one behavioral fingerprint including at least one or more indicators of utilization of one or more user devices by the at least one authorized user, comprises:
  circuitry configured for deleting at least a portion of the at least one behavioral fingerprint associated with the at least one authorized user based at least partially on the at least one indication of utilization.

15. The system of claim 1, wherein circuitry configured for incorporating the at least one indication of utilization into at least one behavioral fingerprint associated with the at least one authorized user, the at least one behavioral fingerprint including at least one or more indicators of utilization of one or more user devices by the at least one authorized user, comprises:
  circuitry configured for confirming that the at least one behavioral fingerprint associated with the at least one authorized user includes at least the at least one indication of utilization.

16. The system of claim 1, wherein circuitry configured for incorporating the at least one indication of utilization into at least one behavioral fingerprint associated with the at least one authorized user, the at least one behavioral fingerprint including at least one or more indicators of utilization of one or more user devices by the at least one authorized user, comprises:
  circuitry configured for incorporating the at least one indication of utilization into at least one behavioral fingerprint associated with the at least one authorized user, the at least one behavioral fingerprint including at least one or more indicators of accessing one or more user devices by the at least one authorized user.

17. The system of claim 1, wherein circuitry configured for incorporating the at least one indication of utilization into at least one behavioral fingerprint associated with the at least one authorized user, the at least one behavioral fingerprint including at least one or more indicators of utilization of one or more user devices by the at least one authorized user, comprises:
  circuitry configured for incorporating the at least one indication of utilization into at least one behavioral fingerprint associated with the at least one authorized user, the at least one behavioral fingerprint including at least one or more indicators of interacting with one or more user devices by the at least one authorized user.

18. The system of claim 1, wherein circuitry configured for incorporating the at least one indication of utilization into at least one behavioral fingerprint associated with the at least one authorized user, the at least one behavioral fingerprint including at least one or more indicators of utilization of one or more user devices by the at least one authorized user, comprises:
  circuitry configured for incorporating the at least one indication of utilization into at least one behavioral fingerprint associated with the at least one authorized user, the at least one behavioral fingerprint including at least one or more indicators of movement of one or more user devices by the at least one authorized user.

19. The system of claim 1, wherein circuitry configured for incorporating the at least one indication of utilization into at least one behavioral fingerprint associated with the at least one authorized user, the at least one behavioral fingerprint including at least one or more indicators of utilization of the one or more user devices by the at least one authorized user, comprises:
  circuitry configured for incorporating at least one or more indicators of providing input to one or more user devices by the at least one authorized user into the at least one behavioral fingerprint associated with the at least one authorized user, including at least incorporating at least one indication of how the at least one user swipes between two or more screens of the one or more user devices as the at least one indication of utilization into the at least one behavioral fingerprint associated with the at least one authorized user; and
  wherein circuitry configured for determining at least one degree of authentication associated with identity of the at least one user via the at least one user device at least partially based on the at least one behavioral fingerprint includes at least:
    circuitry configured for determining that the at least one user is not the at least one authorized user at least partially based on ascertaining that a most recent pattern of swipes between two or more screens of the user device does not match the incorporated at least one indication of how the at least one user swipes between two or more screens of the one or more user devices in the at least one behavioral fingerprint associated with the at least one authorized user.

20. The system of claim 1, wherein circuitry configured for incorporating the at least one indication of utilization into at least one behavioral fingerprint associated with the at least one authorized user, the at least one behavioral fingerprint including at least one or more indicators of utilization of one or more user devices by the at least one authorized user, comprises:
  circuitry configured for incorporating the at least one indication of utilization into at least one behavioral fingerprint associated with the at least one authorized user, the at least one behavioral fingerprint including at least one or more indicators of at least one of (a) receiving output from one or more user devices by the at least one authorized user, (b) communicating via one or more user devices by the at least one authorized user, (c) software application execution on one or more user devices by the at least one authorized user, or (d) effecting at least one transaction via one or more user devices by the at least one authorized user.

21. The system of claim 1, wherein circuitry configured for incorporating the at least one indication of utilization into at least one behavioral fingerprint associated with the at least one authorized user, the at least one behavioral fingerprint including at least one or more indicators of utilization of one or more user devices by the at least one authorized user, comprises:
  circuitry configured for incorporating the at least one indication of utilization into at least one behavioral fingerprint associated with the at least one authorized user, the at least one behavioral fingerprint including at least one or more indicators of at least one user habit with respect to one or more user devices by the at least one authorized user.

22. The system of claim 21, wherein circuitry configured for incorporating the at least one indication of utilization into at least one behavioral fingerprint associated with the at least one authorized user, the at least one behavioral fingerprint including at least one or more indicators of at least one user habit with respect to one or more user devices by the at least one authorized user, comprises:
  circuitry configured for incorporating the at least one indication of utilization into at least one behavioral fingerprint associated with the at least one authorized user, the at least one behavioral fingerprint including at least one or more indicators of at least one user act repeated at particular times with respect to one or more user devices by the at least one authorized user.

23. The system of claim 1, wherein circuitry configured for incorporating the at least one indication of utilization into at least one behavioral fingerprint associated with the at least one authorized user, the at least one behavioral fingerprint including at least one or more indicators of utilization of one or more user devices by the at least one authorized user, comprises:
circuitry configured for incorporating the at least one indication of utilization into at least one behavioral fingerprint associated with the at least one authorized user, the at least one behavioral fingerprint including at least one or more indicators of observed usage of one or more user devices by the at least one authorized user.

24. The system of claim 23, wherein circuitry configured for incorporating the at least one indication of utilization into at least one behavioral fingerprint associated with the at least one authorized user, the at least one behavioral fingerprint including at least one or more indicators of observed usage of one or more user devices by the at least one authorized user, comprises:
circuitry configured for incorporating the at least one indication of utilization into at least one behavioral fingerprint that includes at least one of one or more indicators of apps employed by the at least one authorized user, one or more indicators of transactions conducted by the at least one authorized user, or one or more indicators of social network interactions by the at least one authorized user.

25. The system of claim 1, wherein circuitry configured for incorporating the at least one indication of utilization into at least one behavioral fingerprint associated with the at least one authorized user, the at least one behavioral fingerprint including at least one or more indicators of utilization of one or more user devices by the at least one authorized user, comprises:
circuitry configured for incorporating at least one indication of how long the at least one authorized user keeps a user device in motion before a particular door is to be unlocked into the at least one behavioral fingerprint associated with the at least one authorized user.

26. The system of claim 25, wherein circuitry configured for incorporating at least one indication of how long the at least one authorized user keeps a user device in motion before a particular door is to be unlocked into the at least one behavioral fingerprint associated with the at least one authorized user, comprises:
circuitry configured for incorporating at least one indication of at least one particular car door or at least one particular house door to be unlocked at least partially based on how long the at least one authorized user keeps the user device in motion into the at least one behavioral fingerprint associated with the at least one authorized user.

27. A method, comprising:
determining at least one indication of utilization for at least one authorized user via at least one user-device interaction;
incorporating the at least one indication of utilization into at least one behavioral fingerprint associated with the at least one authorized user, the at least one behavioral fingerprint including at least one or more indicators of utilization of one or more user devices by the at least one authorized user;
determining via at least one user device that at least one user has made a request for performance of at least one task;
determining at least one degree of authentication associated with identity of the at least one user via the at least one user device at least partially based on the at least one behavioral fingerprint;
determining at least one level of authorization corresponding to the determined at least one degree of authentication associated with identity of the at least one user; and
performing the at least one task as a function of the determined at least one level of authorization corresponding to the determined at least one degree of authentication associated with identity of the at least one user.

28. A computer program product, comprising:
at least one non-transitory computer-readable medium including at least:
one or more instructions for determining at least one indication of utilization for at least one authorized user via at least one user-device interaction;
one or more instructions for incorporating the at least one indication of utilization into at least one behavioral fingerprint associated with the at least one authorized user, the at least one behavioral fingerprint including at least one or more indicators of utilization of one or more user devices by the at least one authorized user;
one or more instructions for determining via at least one user device that at least one user has made a request for performance of at least one task;
one or more instructions for determining at least one degree of authentication associated with identity of the at least one user via the at least one user device at least partially based on the at least one behavioral fingerprint;
one or more instructions for determining at least one level of authorization corresponding to the determined at least one degree of authentication associated with identity of the at least one user; and
one or more instructions for performing the at least one task as a function of the determined at least one level of authorization corresponding to the determined at least one degree of authentication associated with identity of the at least one user.

29. The system of claim 1, wherein circuitry configured for determining via at least one user device that at least one user has made a request for performance of at least one task comprises:
circuitry configured for receiving, via at least one user interface of the at least one user device, at least one indication that the at least one user has made a request to open at least one other device using the at least one user device.

30. The system of claim 1, wherein circuitry configured for determining at least one degree of authentication associated with identity of the at least one user via the at least one user device at least partially based on the at least one behavioral fingerprint comprises:
circuitry configured for detecting one or more manners for swiping input on the at least one user device to determine a pattern of use associated with the at least one user; and
circuitry configured for lowering the at least one level of authentication of the at least one user if the pattern of use includes an anomalous pattern of use at least partially based on the at least one behavioral fingerprint.

31. The system of claim 1, wherein circuitry configured for performing the at least one task as a function of the determined at least one level of authorization corresponding to the determined at least one degree of authentication associated with identity of the at least one user comprises:
   circuitry configured for causing the opening of at least one door at least partially based on at least one minimum degree of authentication associated with the at least one user indicated by comparing a detected image of the at least one user obtainable by a camera accessible by the at least one user device with at least one image of the at least one authorized user incorporated into the at least one behavioral fingerprint to determine that the at least one user has sufficient authorization for the opening of the at least one door.

32. The system of claim 1, wherein circuitry configured for determining at least one degree of authentication associated with identity of the at least one user via the at least one user device at least partially based on the at least one behavioral fingerprint comprises:
   circuitry configured for determining at least one degree of authentication corresponding to at least one level of certainty of identity of the at least one user via the at least one user device at least partially based on the at least one behavioral fingerprint.

33. The system of claim 32, wherein circuitry configured for determining at least one degree of authentication corresponding to at least one level of certainty of identity of the at least one user via the at least one user device at least partially based on the at least one behavioral fingerprint comprises:
   circuitry configured for ascertaining at least one level of certainty of identity of the at least one user at least partially based on at least one user response received via the at least one user device, including at least determining an average number of correct user responses to at least one verification inquiry received via the at least one user device.

34. The system of claim 1, wherein circuitry configured for determining at least one level of authorization corresponding to the determined at least one degree of authentication associated with identity of the at least one user comprises:
   circuitry configured for electing to grant full authorization, grant partial authorization, or deny authorization at least partially based on the determined at least one degree of authentication associated with identity of the at least one user.

* * * * *